(12) United States Patent
Mizutani et al.

(10) Patent No.: US 7,927,744 B2
(45) Date of Patent: Apr. 19, 2011

(54) ANODE ACTIVE MATERIAL AND BATTERY USING THE SAME

(75) Inventors: Satoshi Mizutani, Fukushima (JP); Hiroshi Inoue, Fukushima (JP); Akira Yamaguchi, Fukushima (JP); Akinori Kita, Fukushima (JP)

(73) Assignee: Sony Corporation, Tokyo (JP)

( * ) Notice: Subject to any disclaimer, the term of this patent is extended or adjusted under 35 U.S.C. 154(b) by 747 days.

(21) Appl. No.: 11/225,540

(22) Filed: Sep. 13, 2005

(65) Prior Publication Data

US 2006/0068292 A1    Mar. 30, 2006

(30) Foreign Application Priority Data

Sep. 30, 2004  (JP) ................................ P2004-289410
Sep. 30, 2004  (JP) ................................ P2004-289413

(51) Int. Cl.
*H01M 4/58*    (2010.01)
(52) U.S. Cl. .................. 429/231.8; 429/221; 429/218.1; 429/226; 429/231.5; 429/325
(58) Field of Classification Search ............... 429/231.8, 429/221, 325, 218.1, 231.5, 226
See application file for complete search history.

(56) References Cited

U.S. PATENT DOCUMENTS

| | | | |
|---|---|---|---|
| 6,881,518 B2 * | 4/2005 | Kaminaka et al. ......... | 429/218.1 |
| 2002/0015889 A1 * | 2/2002 | Yamamoto et al. ....... | 429/231.95 |
| 2003/0180626 A1 * | 9/2003 | Shima et al. .................. | 429/326 |
| 2005/0079414 A1 * | 4/2005 | Yamamoto et al. ........ | 429/218.1 |
| 2005/0208378 A1 | 9/2005 | Mizutani et al. | |
| 2005/0250008 A1 | 11/2005 | Mizutani et al. | |

FOREIGN PATENT DOCUMENTS

| | | | |
|---|---|---|---|
| EP | 1039568 | 9/2000 | |
| JP | 2000-311681 | * 11/2000 | ......................... 4/38 |
| JP | 2000-313609 | 11/2000 | |
| JP | 2003-197188 | 7/2003 | |
| JP | 2004-111150 | 4/2004 | |
| WO | WO2004/100291 | 11/2004 | |

OTHER PUBLICATIONS http://www.merriam-webster.com/dictionary/alloy.*
Japanese Office Action issued on Sep. 9, 2007.

* cited by examiner

*Primary Examiner* — Patrick Ryan
*Assistant Examiner* — Ben Lewis
(74) *Attorney, Agent, or Firm* — SNR Denton US LLP

(57) ABSTRACT

A battery with a high capacity and superior cycle characteristics and an anode active material used in the battery are provided. An anode includes an anode active material capable of reacting with lithium. The anode active material includes at least tin, cobalt and carbon as elements, and the carbon content is within a range from 9.9 wt % to 29.7 wt % inclusive, and the ratio of cobalt to the total of tin and cobalt is within a range from 30 wt % to 70 wt % inclusive. Thereby, while a high capacity is maintained, cycle characteristics can be improved.

19 Claims, 30 Drawing Sheets

ANODE ACTIVE MATERIAL AND BATTERY USING THE SAME

BACKGROUND OF THE INVENTION

1. Field of the Invention

The present invention relates to an anode active material including tin (Sn), cobalt (Co) and carbon (C) as elements, and a battery using the anode active material.

2. Description of the Related Art

In recent years, a large number of portable electronic devices such as camcorders, cellular phones and laptop computers have been emerged, and an attempt to reduce the size and the weight of them have been made. Research and development aimed at improving the energy densities of batteries used as portable power sources of the electronic devices, specifically secondary batteries as a key device have been actively promoted. Among the batteries, a nonaqueous electrolyte secondary battery (for example, a lithium-ion secondary battery) can obtain a high energy density, compared to an aqueous electrolyte secondary battery in a related art such as a lead-acid battery and a nickel cadmium battery, so the improvement of the battery has been studied in all quarters.

As an anode active material used in the lithium-ion secondary battery, a carbon material having a relatively high capacity and superior cycle characteristics such as non-graphitizable carbon or graphite is broadly used. However, in consideration of a recent demand for a higher capacity, a further increase in the capacity of the carbon material presents a challenge.

In such a background, a technique of achieving a higher capacity of a carbon material through selecting a material to be carbonized and forming conditions has been developed (for example, refer to Japanese Unexamined Patent Application Publication No. Hei 8-315825). However, when such a carbon material is used, an anode has a discharge potential vs. lithium (Li) of 0.8 V to 1.0 V, and when a battery includes the carbon material, the discharge voltage of the battery is reduced, so a significant improvement in the energy density of the battery can be hardly expected. Moreover, there is a disadvantage that the hysteresis in the shape of a charge-discharge curve is large, thereby energy efficiency in each charge-discharge cycle is low.

On the other hand, as an anode with a higher capacity than the carbon material, an alloy material which is formed through electrochemically alloying some kind of metal with lithium and has a property of being reversibly produced and decomposed has been researched. For example, an anode with a high capacity using a Li—Al alloy or a Sn alloy has been developed, and an anode with a high capacity including a Si alloy has been developed (for example, refer to U.S. Pat. No. 4,950,566).

However, the Li—Al alloy, the Sn alloy or the Si alloy has a big disadvantage that the cycle characteristics are extremely poor, because the alloy expands or shrinks according to charge and discharge, so every time a charge-discharge cycle is repeated, the anode is pulverized.

Therefore, in order to improve the cycle characteristics, a technique of forming an alloy including tin or silicon (Si) so as to prevent the expansion of the alloy has been considered (for example, refer to "Journal of The Electrochemical Society", 1999, No. 146, p. 414). Moreover, $Mg_2Si$ or the like has been proposed (for example, refer to "Journal of The Electrochemical Society", 1999, No. 146, p. 4401).

SUMMARY OF THE INVENTION

However, even if these techniques are used, an effect of improving the cycle characteristics are not sufficient, so the fact is that advantages of the anode with a high capacity including the alloy material are not fully used.

In view of the foregoing, it is desirable to provide a battery with a high capacity and superior cycle characteristics and an anode active material used in the battery.

According to an embodiment of the present invention, there is provided an anode active material including at least tin, cobalt and carbon as elements, wherein the carbon content is within a range from 9.9 wt % to 29.7 wt % inclusive, and the ratio of cobalt to the total of tin and cobalt is within a range from 30 wt % to 70 wt % inclusive.

According to an embodiment of the present invention, there is provided a battery including a cathode, an anode and an electrolyte, wherein the anode includes an anode active material which includes at least tin, cobalt and carbon as elements, and the carbon content in the anode active material is within a range from 9.9 wt % to 29.7 wt % inclusive, and the ratio of cobalt to the total of tin and cobalt is within a range from 30 wt % to 70 wt % inclusive.

In the anode active material according to the embodiment of the invention, as an element, tin is included, so a high capacity can be obtained. Moreover, as an element, cobalt is included, and the ratio of cobalt to the total of tin and cobalt is within a range from 30 wt % to 70 wt % inclusive, so while a high capacity is maintained, cycle characteristics can be improved. Further, as an element, carbon is included, and the carbon content is within a range from 9.9 wt % to 29.7 wt % inclusive, so the cycle characteristics can be further improved. Therefore, in the battery according to the embodiment of the invention which uses the anode active material, a high capacity can be obtained, and superior cycle characteristics can be obtained.

Moreover, when silicon is included in the anode active material as an element, a higher capacity can be obtained.

Further, when at least one kind selected from the group consisting of indium (In), niobium (Nb), germanium (Ge), titanium (Ti), molybdenum (Mo), aluminum (Al), phosphorus (P), gallium (Ga) and bismuth (Bi) is further included in the anode active material as an element, and the content of them is 14.9 wt % or less, the cycle characteristics can be further improved, and more specifically, when the content is 2.4 wt % or more, a higher effect can be obtained.

Moreover, when iron is further included in the anode active material as an element, and the iron content is within a range from 0.3 wt % to 5.9 wt % inclusive, the capacity and the cycle characteristics can be further improved.

In addition, when a derivative of a cyclic carbonate including a halogen atom is included in the electrolyte, the decomposition reaction of a solvent in the anode can be prevented, so the cycle characteristics can be further improved.

Other and further objects, features and advantages of the invention will appear more fully from the following description.

DETAILED DESCRIPTION OF THE PREFERRED EMBODIMENTS

Figure 1:
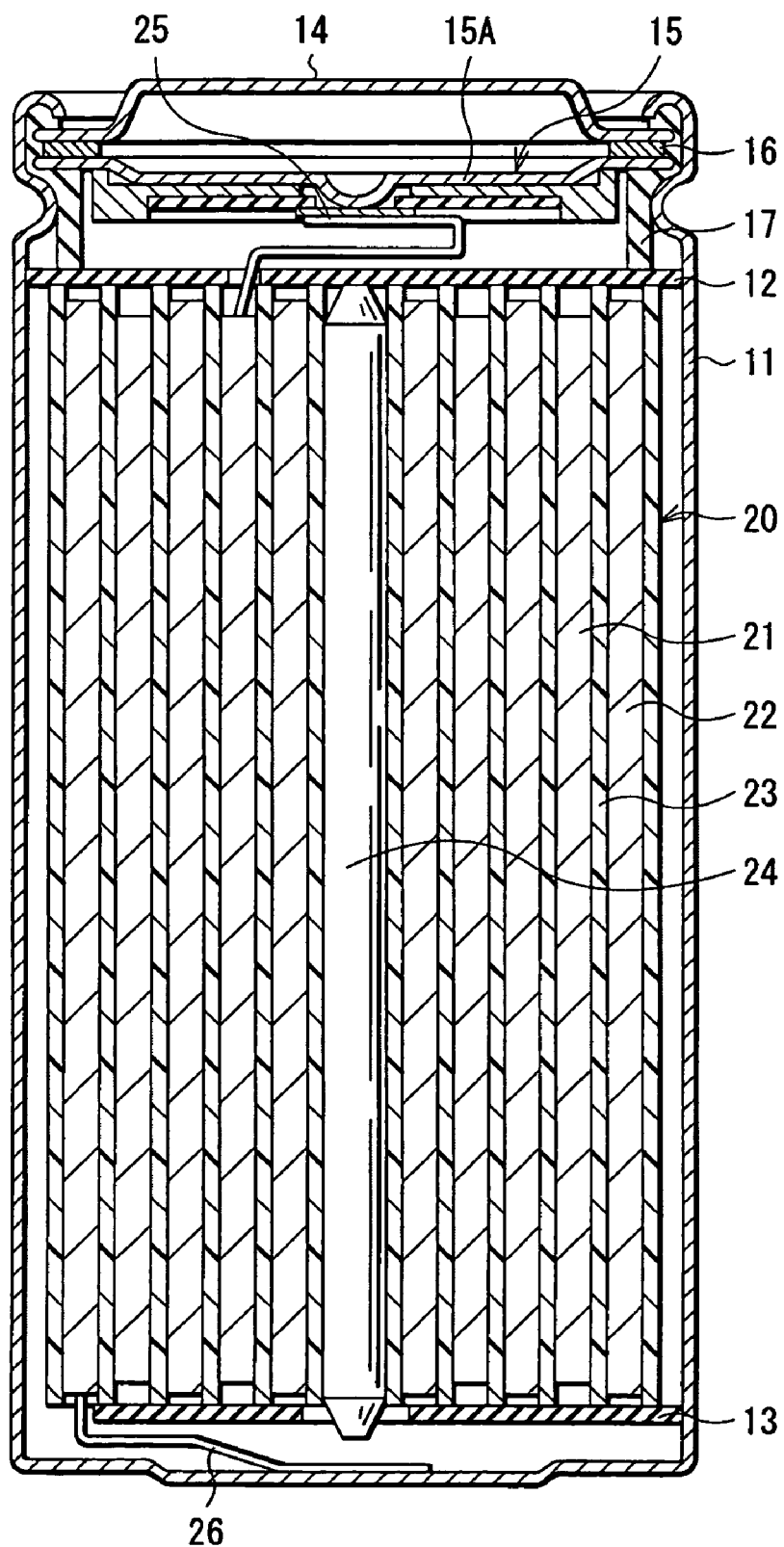
FIG. 1 is a sectional view of a secondary battery according to an embodiment of the invention.

Preferred embodiments will be described in detail below referring to the accompanying drawings.

First Embodiment

An anode active material according to a first embodiment of the invention can react with lithium or the like, and includes tin and cobalt as elements. It is because the amount of reaction of tin with lithium per unit mass is high, so a high capacity can be obtained. Moreover, it is because when only tin is included, it is difficult to obtain sufficient cycle characteristics; however, when cobalt is also included, cycle characteristics can be improved.

The cobalt content is preferably within a range from 30 wt % to 70 wt % inclusive in a ratio of cobalt to the total of tin and cobalt, and more preferably within a range from 30 wt % to 60 wt % inclusive. When the ratio is lower, the cobalt content declines, thereby it is difficult to obtain sufficient cycle characteristics. On the other hand, when the ratio is higher, the tin content declines, thereby it is difficult to obtain a higher capacity than that of an anode material in a related art, for example, a carbon material.

The anode active material includes carbon as an element in addition to tin and cobalt, because when carbon is included, the cycle characteristics can be further improved. The carbon content is preferably within a range from 9.9 wt % to 29.7 wt % inclusive, more preferably within a range from 14.9 wt % to 29.7 wt % inclusive, and more preferably within a range from 16.8 wt % to 24.8 wt % inclusive, because a higher effect can be obtained within the range.

In some cases, the anode active material preferably includes silicon as an element in addition to the above elements, because the amount of reaction of silicon with lithium per unit mass is high, and the capacity can be further improved. The silicon content is preferably within a range from 0.5 wt % to 7.9 wt % inclusive, because when the content is lower, an effect of improving the capacity is not sufficient, and when the content is higher, the anode active material is pulverized according to charge and discharge, thereby the cycle characteristics decline.

In some cases, the anode active material preferably further includes at least one kind selected from the group consisting of indium, niobium, germanium, titanium, molybdenum, aluminum, phosphorus, gallium and bismuth as an element, because the cycle characteristics can be further improved. The content of the elements is preferably within a range of 14.9 wt % or less, more preferably within a range from 2.4 wt % to 14.9 wt % inclusive, and more preferably within a range from 4.0 wt % to 12.9 wt % inclusive, because when the content is lower, it is difficult to obtain a sufficient effect, and when the content is higher, the tin content declines, thereby it is difficult to obtain a sufficient capacity, and the cycle characteristics decline.

Moreover, the anode active material has a low crystalline phase or an amorphous phase. The phase is a reactive phase which can react with lithium or the like, and by the reactive phase, superior cycle characteristics can be obtained. The half-width of a diffraction peak of the phase obtained by X-ray diffraction is preferably 1.0° or more at a diffraction angle of 2θ in the case where a CuKα ray is used as a specific X ray and the sweep rate is 1°/min. It is because lithium or the like can be smoothly inserted or extracted, and the reactivity with an electrolyte can be further reduced.

Whether the diffraction peak obtained by X-ray diffraction corresponds to a reactive phase capable of reacting with lithium or the like or not can be easily determined through comparing between X-ray diffraction charts before and after an electrochemical reaction with lithium or the like. For example, when the position of the diffraction peak before the electrochemical reaction with lithium or the like is different from the position of the diffraction peak after the electrochemical reaction, the diffraction peak corresponds to a reactive phase capable of reacting with lithium or the like. In the anode active material, the diffraction peak of a low crystalline reactive phase or an amorphous reactive phase can be detected within a range of, for example, 2θ=20° to 50°. The low crystalline reactive phase or the amorphous reactive phase includes, for example, each of the above-described elements, and it is considered that the reactive phase is changed to be low crystalline or amorphous mainly by carbon.

The anode active material may have a phase including the simple substance or a part of each element in addition to the low crystalline phase or the amorphous phase.

Moreover, in the anode active material, at least a part of carbon which is an element is preferably coupled to a metal element or a metalloid element which is another element. It is considered that a decline in the cycle characteristics results from aggregation or crystallization of tin or the like; however, when carbon is coupled to another element, such aggregation or crystallization can be prevented.

As a measuring method which checks the coupling state of an element, for example, X-ray photoelectron spectroscopy (XPS) is used. The XPS is a method which determines the composition of the element and the coupling state of the element in an area a few nm away from a surface of a test sample through applying a soft X ray (in a commercially available apparatus, an Al—Kα ray or a Mg—Kα ray is used) to the surface of the test sample to measure the kinetic energy of a photoelectron emitted from the surface of the test sample.

The binding energy of an inner orbital electron of an element is changed in relation to a charge density on the element in a first order approximation. For example, when the charge density of a carbon element is reduced due to an interaction with an element near the carbon element, outer electrons such as 2p electrons are reduced, so is electrons of the carbon element are strongly bound by a shell. In other words, when the charge density of the element is reduced, the binding energy increases. In the XPS, when the binding energy increases, the peak is shifted to a higher energy region.

In the XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. Moreover, in the case of surface contamination carbon, the peak is observed at 284.8 eV. On the other hand, in the case where the charge density of the carbon element increases, for example, in the case where carbon is coupled to a metal element or a metalloid element, the peak of C1s is observed in a region lower than 284.5 eV. In other words, in the case where the peak of the composite wave of C1s obtained in the anode active material is observed in a region lower than 284.5 eV, at least a part of carbon included in the anode active material is coupled to the metal element or the metalloid element which is another element.

In the XPS measurement on the anode active material, in the case where the surface of the anode active material is covered with surface contamination carbon, it is preferable to lightly sputter the surface with an argon ion gun attached to an XPS apparatus. Moreover, in the case where the anode active material to be measured is placed in an anode of a battery as will be described later, after the battery is disassembled to take out the anode, the anode may be cleaned with a volatile solvent such as dimethyl carbonate so that a low volatile solvent and an electrolyte salt on the surface of the anode can be removed. Such sampling is preferably performed in an inert atmosphere.

Moreover, in the XPS measurement, for example, the peak of C1s is used to correct the energy axis of a spectrum. In general, surface contamination carbon exists on a material surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the anode active material, so the peak of the surface contamination carbon and the peak of the carbon in the anode active material are separated through analyzing the waveform through the use of, for example, commercially available software. In the analysis of the waveform, the position of a main peak existing on a lowest binding energy side is used as an energy reference (284.8 eV).

The anode active material can be formed, for example, through mixing the materials of all elements to form a mixture, melting the mixture in an electric furnace, a high-frequency induction furnace, an arc furnace or the like, and then solidifying the mixture, or through various atomization methods such as gas atomization or water atomization, various roll methods, or methods using a mechanochemical reaction such as a mechanical alloying method or a mechanical milling method. The anode active material is preferably formed through the method using a mechanochemical reaction among them, because the anode active material can have a low crystalline structure or an amorphous structure. In this method, for example, a planetary ball mill can be used.

As the material, a mixture of the simple substances of elements may be used; however, an alloy of a part of the elements except for carbon is preferably used. It is because when carbon is added to such an alloy to synthesize the anode active material through a mechanical alloying method, the anode active material can have a low crystalline structure or an amorphous structure, and a reaction time can be reduced. The form of the material may be powder or a lump.

As carbon used as a material, one kind or two or more kinds of carbon materials such as non-graphitizable carbon, graphitizable carbon, graphite, kinds of pyrolytic carbon, kinds of coke, kinds of glass-like carbon, a fired high molecular weight organic compound body, activated carbon, and carbon black can be used. Among them, kinds of coke include pitch coke, needle coke, petroleum coke and so on, and the sintered high molecular weight organic compound body is a high molecular weight compound such as a phenolic resin, a furan resin or the like which is carbonized through firing at an adequate temperature. The carbon materials may have a fiber form, a spherical form, a particle form or a scale form.

For example, the anode active material is used in a secondary battery as will be described below.

(First Battery)

FIG. 1 shows a sectional view of a fist secondary battery. The secondary battery is a so-called cylindrical type, and comprises a spirally wound electrode body 20 including a strip-shaped cathode 21 and a strip-shaped anode 22 which are laminated and spirally wound with a separator 23 in between in a substantially hollow cylindrical-shaped battery can 11. The battery can 11 is made of, for example, nickel-plated iron. An end portion of the battery can 11 is closed, and the other end portion thereof is opened. An electrolyte solution which is a liquid electrolyte is injected into the battery can 11 to impregnate the separator 23 with the electrolyte solution. Moreover, a pair of insulating plates 12 and 13 are disposed so that the spirally wound electrode body 20 is sandwiched therebetween in a direction perpendicular to a peripheral winding surface.

In the opened end portion of the battery can 11, a battery cover 14 and, a safety valve mechanism 15 and a PTC device (positive temperature coefficient device) 16 disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to higher than a certain extent due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance, thereby resulting in preventing abnormal heat generation by a large current. The gasket 17 is made of, for example, an insulating material, and its surface is coated with asphalt.

For example, a center pin 24 is inserted into the center of the spirally wound electrode body 20. A cathode lead 25 made of aluminum or the like is connected to the cathode 21 of the spirally wound electrode body 20, and an anode lead 26 made of nickel (Ni) or the like is connected to the anode 22. The cathode lead 25 is welded to the safety valve mechanism 15 so as to be electrically connected to the battery cover 14, and the anode lead 26 is welded and electrically connected to the battery can 11.

Figure 2:
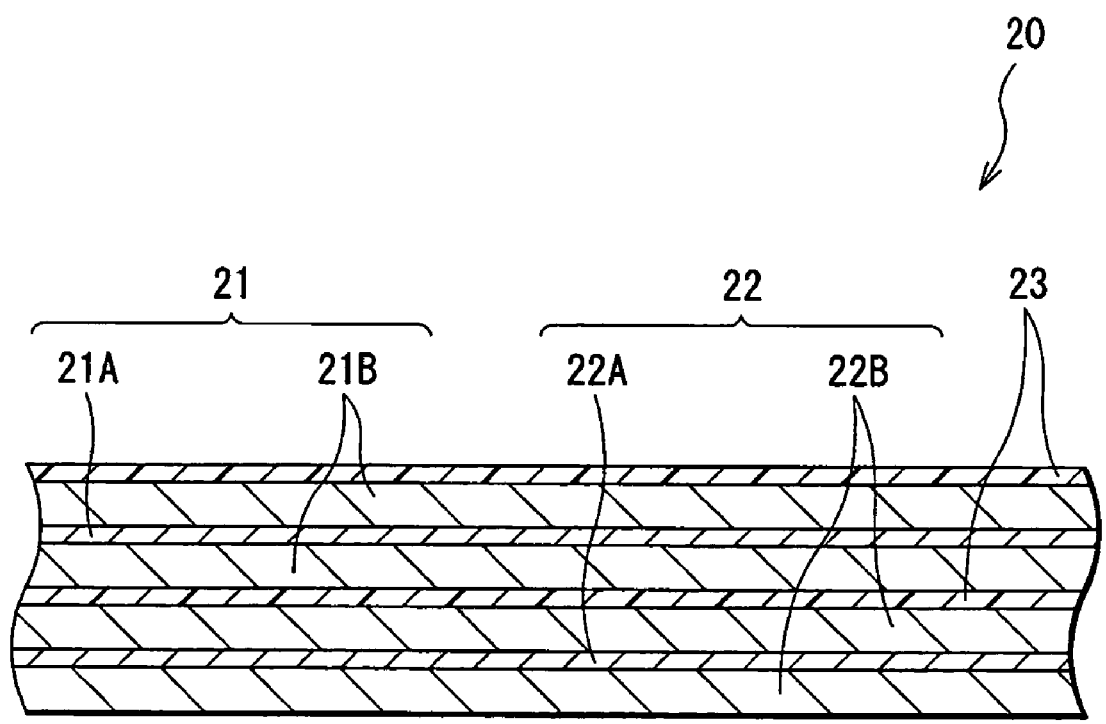
FIG. 2 is a partially enlarged sectional view of a spirally wound electrode body in the secondary battery shown in FIG. 1.

FIG. 2 shows an enlarged view of a part of the spirally wound electrode body 20 shown in FIG. 1. The cathode 21 includes, for example, a cathode current collector 21A having a pair of surfaces facing each other and a cathode active material layer 21B which is disposed on either side or both sides of the cathode current collector 21A. The cathode current collector 21A is made of, for example, metal foil such as aluminum foil. The cathode active material layer 21B includes, for example, one kind or two or more kinds of cathode active materials capable of inserting and extracting lithium, and if necessary, an electrical conductor such as a carbon material and a binder such as polyvinylidene fluoride.

As the cathode active material capable of inserting and extracting lithium, for example, a metal sulfide or a metal oxide including no lithium such as titanium sulfide ($TiS_2$), molybdenum sulfide ($MoS_2$), niobium selenide ($NbSe_2$) or vanadium oxide ($V_2O_5$) is used. Moreover, a lithium complex oxide including $Li_xMO_2$ (where M indicates one or more kinds of transition metals, and the value of x depends upon a charge-discharge state of the battery, and is generally within a range of $0.05 \leq x \leq 1.10$) as a main component is used. As a transition metal M of the lithium complex oxide, cobalt, nickel or manganese (Mn) is preferable. Specific examples of such a lithium complex oxide include $LiCoO_2$, $LiNiO_2$, $Li_xNi_yCo_{1-y}O_2$ (where the values of x and y depend upon a charge-discharge state of the battery, and are generally within a range of $0<x<1$ and $0<y<1.0$, respectively), a lithium-manganese complex oxide having a spinel structure and the like.

The anode 22 includes, for example, an anode current collector 22A having a pair of surfaces facing each other and an anode active material layer 22B which is disposed on either side or both sides of the anode current collector 22A as in the case of the cathode 21. The anode current collector 22A is made of, for example, metal foil such as copper foil.

The anode active material layer 22B includes, for example, the anode active material according to the embodiment, and if necessary, a binder such as polyvinylidene fluoride. When the anode active material according to the embodiment is included in the secondary battery, the secondary battery can obtain a high capacity, and the cycle characteristics of the secondary battery can be improved. The anode active material layer 22B may include another anode active material or another material such as an electrical conductor in addition to the anode active material according to the embodiment. As another anode active material, for example, a carbon material capable of inserting and extracting lithium is cited. The carbon material is preferable, because charge-discharge cycle characteristics can be improved, and the carbon material also functions as an electrical conductor. As the carbon material, for example, the same material used when the anode active material is formed is cited.

The ratio of the carbon material to the anode active material according to the embodiment is preferably within a range from 1 wt % to 95 wt % inclusive. It is because when the ratio of the carbon material is lower than the range, the conductivity of the anode 22 declines, and when the ratio of the carbon material is higher than the range, a battery capacity declines.

The separator 23 isolates between the cathode 21 and the anode 22 so as to pass lithium ions through while preventing a short circuit of a current due to contact between the cathode 21 and the anode 22. The separator 23 is made of, for example, a porous film of a synthetic resin such as polytetrafluoroethylene, polypropylene or polyethylene, or a porous film of ceramic, and the separator 23 may have a structure in which two or more kinds of the porous films are laminated.

The electrolyte solution with which the separator 23 is impregnated includes a solvent and an electrolyte salt dissolved in the solvent. As the solvent, propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetate, butyrate, propionate or the like is cited. As the solvent, one kind or a mixture of two or more kinds selected from them may be used.

The solvent more preferably includes a derivative of a cyclic carbonate including a halogen atom. It is because the decomposition reaction of the solvent in the anode 22 can be prevented, and the cycle characteristics can be improved. Specific examples of the derivative of the cyclic carbonate include 4-fluoro-1,3-dioxolane-2-one shown in Chemical Formula 1, 4-difluoro-1,3-dioxolane-2-one shown in Chemical Formula 2, 4,5-difluoro-1,3-dioxolane-2-one shown in Chemical Formula 3, 4-difluoro-5-fluoro-1,3-dioxolane-2-one shown in Chemical Formula 4, 4-chloro-1,3-dioxolane-2-one shown in Chemical Formula 5, 4,5-dichloro-1,3-dioxolane-2-one shown in Chemical Formula 6, 4-bromo-1,3-dioxolane-2-one shown in Chemical Formula 7, 4-iodo-1,3-dioxolane-2-one shown in Chemical Formula 8, 4-fluoromethyl-1,3-dioxolane-2-one shown in Chemical Formula 9, 4-trifluoromethyl-1,3-dioxolane-2-one shown in Chemical Formula 10 and the like, and among them, 4-fluoro-1,3-dioxolane-2-one is preferable, because a higher effect can be obtained.

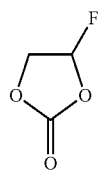
[Chemical Formula 1]

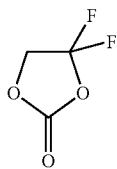
[Chemical Formula 2]

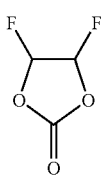
[Chemical Formula 3]

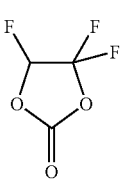
[Chemical Formula 4]

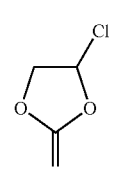
[Chemical Formula 5]

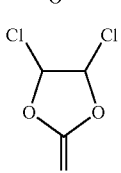
[Chemical Formula 6]

-continued

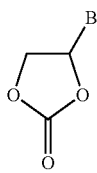
[Chemical Formula 7]

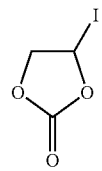
[Chemical Formula 8]

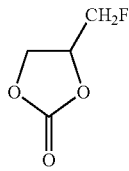
[Chemical Formula 9]

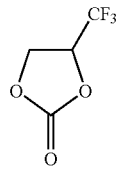
[Chemical Formula 10]

The solvent may include only the derivative of the carbonate; however, as the solvent, a mixture of the derivative of the carbonate and a low-boiling solvent of which the boiling point is 150° C. or less under atmospheric pressure ($1.01325 \times 10^5$ Pa) is preferably used. It is because the ion conductivity can be improved. The content of the derivative of the carbonate in the whole solvent is preferably within a range from 0.1 wt % to 80 wt % inclusive. When the content is lower than the range, an effect of preventing the decomposition reaction of the solvent in the anode 22 is not sufficient, and when the content is higher, the viscosity increases and the ion conductivity declines.

As the electrolyte salt, for example, a lithium salt is used, and one kind or a mixture of two or more kinds of lithium salts can be used. Examples of the lithium salts include $LiClO_4$, $LiAsF_6$, $LiPF_6$, $LiBF_4$, $LiB(C_6H_5)_4$, $CH_3SO_3Li$, $CF_3SO_3Li$, LiCl, LiBr and the like. As the electrolyte salt, the lithium salt is preferably used; however, the electrolyte salt is not specifically limited to the lithium salt. It is because when lithium ions are supplied from the cathode 21 or the like, sufficient lithium ions contributing to charge and discharge can be obtained.

The secondary battery can be formed through the following steps, for example.

At first, for example, the cathode active material and if necessary, the electrical conductor and the binder are mixed to prepare a cathode mixture, and then the cathode mixture is dispersed in a mixed solvent such as N-methyl-2-pyrrolidone to form cathode mixture slurry. Next, after the cathode mixture slurry is applied to the cathode current collector 21A, and the solvent is dried, the cathode active material layer 21B is formed through compression so as to form the cathode 21. Next, the cathode lead 25 is welded to the cathode 21.

Moreover, for example, the anode active material according to the embodiment and if necessary, another anode active material and the binder are mixed to prepare a anode mixture, and then the anode mixture is dispersed in a mixed solvent such as N-methyl-2-pyrrolidone to form anode mixture slurry. Next, after the cathode mixture slurry is applied to the anode current collector 22A, and the solvent is dried, the anode active material layer 22B is formed through compression so as to form the anode 22. Next, the anode lead 26 is welded to the anode 22.

After that, for example, a laminate including the cathode 21 and the anode 22 with the separator 23 in between is spirally wound, and an end portion of the cathode lead 25 is welded to the safety valve mechanism 15, and an end portion of the anode lead 26 is welded to the battery can 11. Then, the spirally wound laminate including the cathode 21 and the anode 22 is sandwiched between a pair of insulating plates 12 and 13, and then the spirally wound laminate is contained in the battery can 11. Then, the electrolyte solution is injected into the battery can 11. After that, the battery cover 14, the safety valve mechanism 15 and the PTC device 16 are fixed in an opened end portion of the battery can 11 through caulking by the gasket 17. Thereby, the secondary battery shown in FIG. 1 is completed.

In the secondary battery, when charge is carried out, lithium ions are extracted from the cathode 21, and are inserted into the anode 22 through the electrolyte. When discharge is carried out, the lithium ions are extracted from the anode 22 and are inserted into the cathode 21 through the electrolyte. In this case, the anode 22 includes the anode active material including tin, cobalt and carbon at the above-described ratio, so while a high capacity is maintained, the cycle characteristics can be improved.

Thus, in the anode active material according to the embodiment, as an element of the anode active material, tin is included, so a high capacity can be obtained. Moreover, as an element of the anode active material, cobalt is included, and the ratio of cobalt to the total of tin and cobalt is within a range from 30 wt % to 70 wt % inclusive, so while a high capacity is maintained, the cycle characteristics can be improved. Further, as an element of the anode active material, carbon is included, and the carbon content is within a range from 9.9 wt % to 29.7 wt % inclusive, so the cycle characteristics can be further improved. Therefore, in the battery according to the embodiment, the anode active material is used, so a high capacity and superior cycle characteristics can be obtained.

Moreover, when silicon is included in the anode active material as an element, a higher capacity can be obtained.

Further, when at least one kind selected from the group consisting of indium, niobium, germanium, titanium, molybdenum, aluminum, phosphorus, gallium and bismuth is included in the anode active material as an element, and the content of them is within a range of 14.9 wt % or less, the cycle characteristics can be further improved, and more specifically, when the content is within a range of 2.4 wt % or more, a higher effect can be obtained.

In addition, when the derivative of the cyclic carbonate including a halogen atom is included in the electrolyte, the decomposition reaction of the solvent in the anode 22 can be prevented, and the cycle characteristics can be further improved.

(Second Battery)

Figure 3:
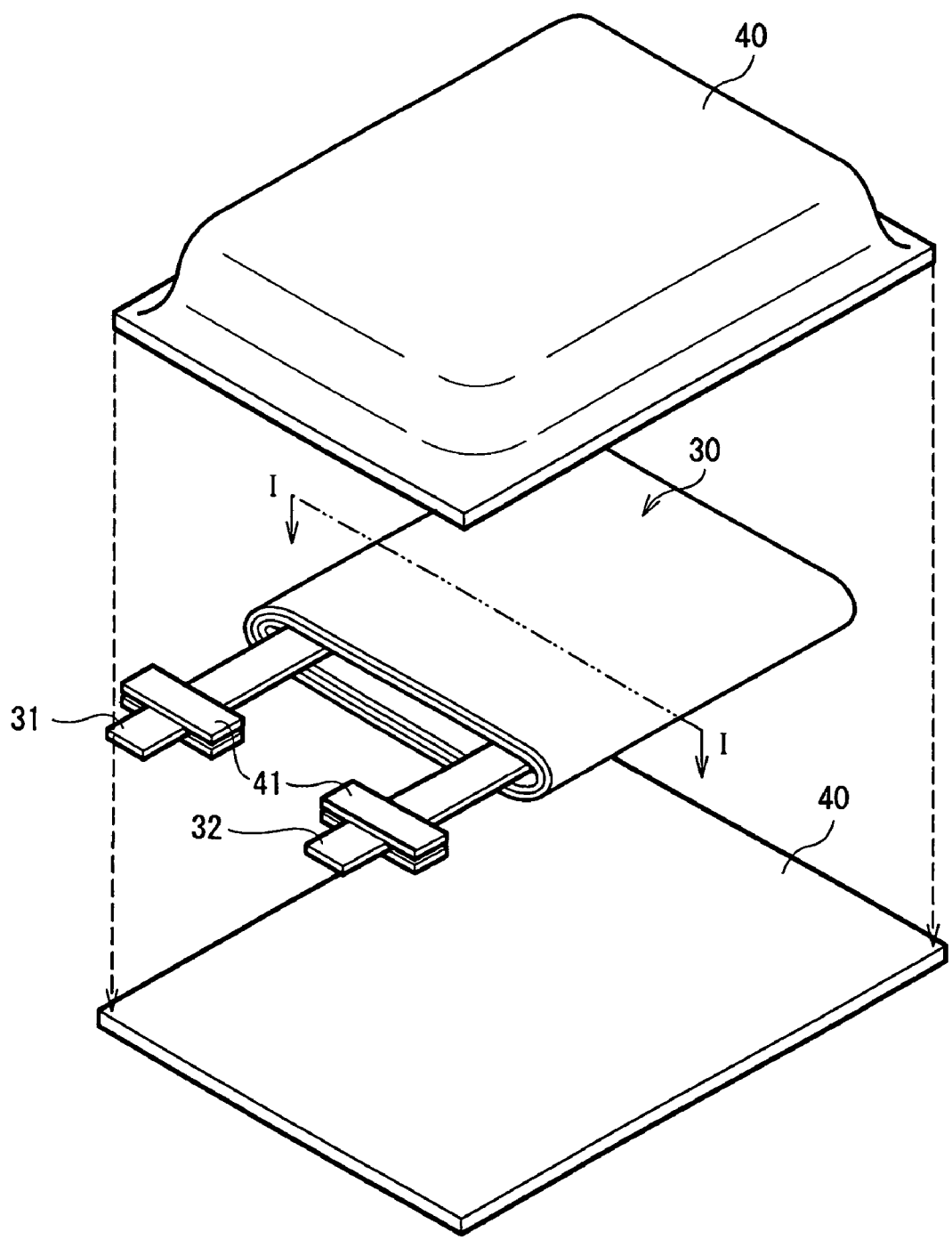
FIG. 3 is an exploded perspective view of another secondary battery according to the embodiment of the invention.

FIG. 3 shows the structure of a second secondary battery. In the secondary battery, a spirally wound electrode body 30 to which a cathode lead 31 and an anode lead 32 are attached is contained in film-shaped package members 40, and the size, the weight and the profile of the secondary battery can be reduced.

The cathode lead 31 and the anode lead 32 are drawn from the interior of the package members 40 to outside, for example, in the same direction. The cathode lead 31 and the anode lead 32 are made of, for example, a metal material such as aluminum, copper, nickel or stainless, and have a thin plate form or a mesh form.

The package members 40 are made of, for example, a rectangular aluminum laminate film including a nylon film, aluminum foil and a polyethylene film laminated in this order. The package members 40 are disposed so that the polyethylene films of the package members 40 face the spirally wound electrode body 30, and edge portions of the package members 40 are adhered to each other by fusion bonding or an adhesive. An adhesive film 41 for preventing the entry of outside air is inserted between the package members 40, the cathode lead 31 and the anode lead 32. The adhesive film 41 is made of, for example, a material having adhesion to the cathode leads 31 and the anode lead 32, for example, a polyolefin resin such as polyethylene, polypropylene, modified polyethylene or modified polypropylene.

The package members 40 may be made of a laminate film with any other structure, a high molecular weight film such as polypropylene or a metal film instead of the above-described aluminum laminate film.

Figure 4:
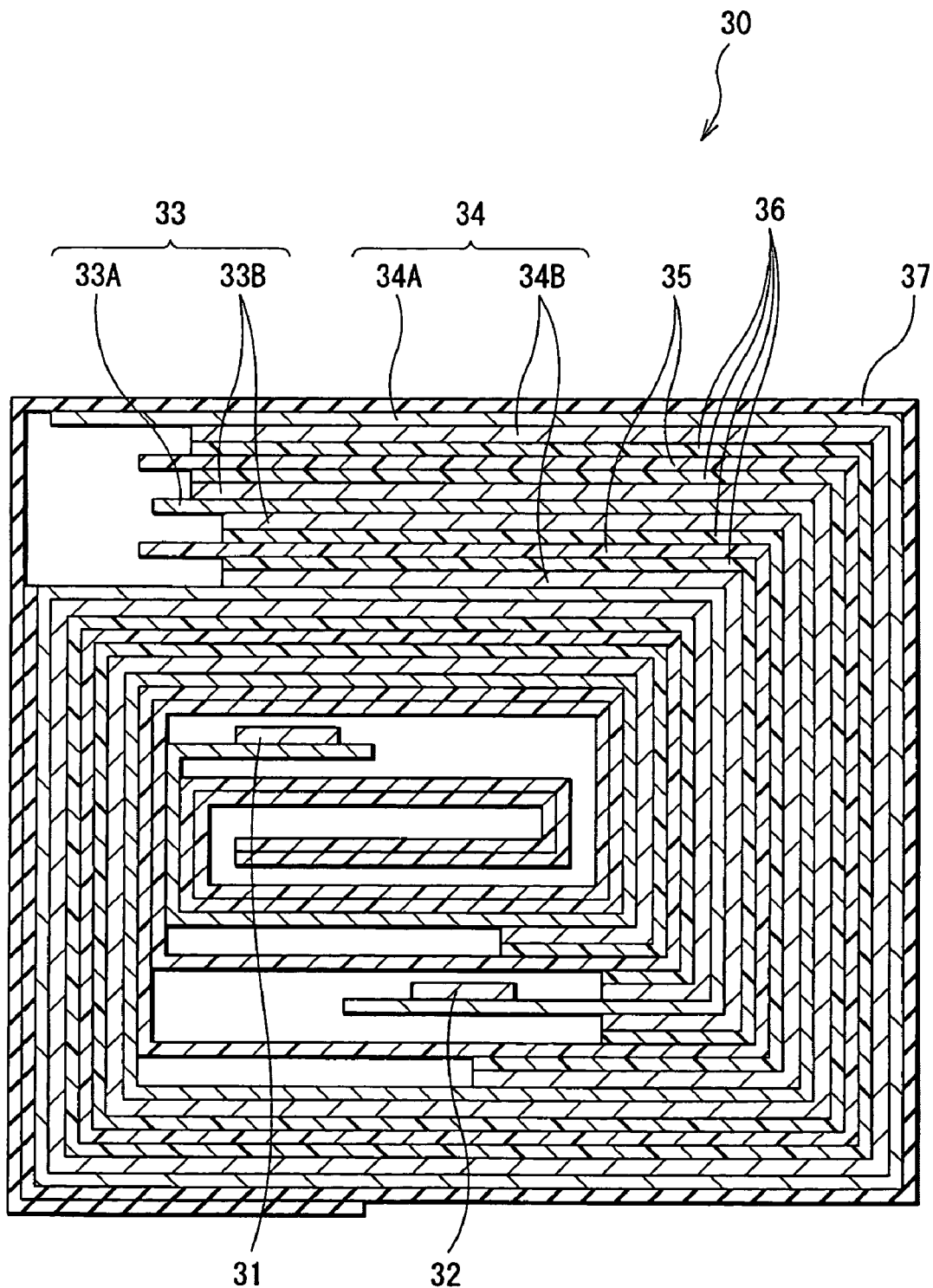
FIG. 4 is a sectional view of a spirally wound electrode body taken along a line I-I of FIG. 3.

FIG. 4 shows a sectional view of the spirally wound electrode body 30 taken along a line I-I of FIG. 3. The spirally wound electrode body 30 is a spirally wound laminate including a cathode 33 and an anode 34 with a separator 35 and an electrolyte layer 36 in between, and an outermost portion of the spirally wound electrode body 30 is protected with a protective tape 37.

The cathode 33 has a structure in which a cathode active material layer 33B is disposed on one side or both sides of a cathode current collector 33A. The anode 34 has a structure in which an anode active material layer 34B is disposed on one side or both sides of an anode current collector 34A, and the anode 34 is disposed so that the anode active material layer 34B faces the cathode active material layer 33B. The structures of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23, respectively.

The electrolyte layer 36 includes an electrolyte solution and a high molecular weight compound as a holding body holding the electrolyte solution, and is a so-called gel electrolyte. The gel electrolyte is preferable, because the gel electrolyte can obtain high ion conductivity, and can prevent leakage of the battery. The structure of the electrolyte solution (that is, a solvent and an electrolyte salt) is the same as that in the cylindrical type secondary battery shown in FIG. 1. Examples of the high molecular weight compound include a fluorine-based high molecular weight compound such as polyvinylidene fluoride, or a copolymer of vinylidene fluoride and hexafluoropropylene, an ether-based high molecular weight compound such as polyethylene oxide or a cross-link including polyethylene oxide, polyacrylonitrile, and the like. More specifically, in terms of stability of oxidation-reduction, the fluorine-based high molecular weight compound is preferable.

For example, the secondary battery can be formed through the following steps.

At first, a precursor solution including the solvent, the electrolyte salt, the high molecular weight compound and a mixed solvent is applied to the cathode 33 and the anode 34, and the mixed solvent is volatilized to form the electrolyte layer 36. After that, the cathode lead 31 is attached to an end portion of the cathode current collector 33A through welding, and the anode lead 32 is attached to an end portion of the anode current collector 34A through welding. Next, after the cathode 33 on which the electrolyte layer 36 is formed and the anode 34 on which the electrolyte layer 36 is formed are laminated with the separator 35 in between to form a laminate, the laminate is spirally wound in a longitudinal direction, and the protective tape 37 is adhered to an outermost portion of the laminate so as to form the spirally wound electrode body 30. Finally, for example, the spirally wound electrode body 30 is sandwiched between the package members 40, and edge portions of the package members 40 are adhered to each other through thermal fusion bonding or the like to seal the spirally wound electrode body 30 in the package members 40. At this time, the adhesive film 41 is inserted between the cathode lead 31, the anode lead 32 and the package members 40. Thereby, the secondary battery shown in FIGS. 3 and 4 is completed.

Moreover, the secondary battery may be formed through the following steps. At first, as described above, the cathode 33 and the anode 34 are formed, and after the cathode lead 31 and the anode lead 32 are attached to the cathode 33 and the anode 34, the cathode 33 and the anode 34 are laminated with the separator 35 in between to form a laminate, and the laminate is spirally wound, and the protective tape 37 is adhered to an outermost portion of the laminate so as to form a spirally wound body as a precursor body of the spirally wound electrode body 30. Next, the spirally wound body is sandwiched between the package members 40, and the edge portions except for one side are adhered through thermal fusion bonding to form a bag shape. Then, the spirally wound body is contained in the package members 40. Next, a composite for an electrolyte including the solvent, the electrolyte salt, monomers as the materials of the high molecular weight compound and a polymerization initiator, and if necessary, another material such as a polymerization inhibitor is prepared, and the composite is injected into the interior of the package members 40.

After the composite for an electrolyte is injected, an opening of the package members 40 is sealed through thermal fusion bonding in a vacuum atmosphere. Next, the monomer is polymerized through applying heat to form a high molecular weight compound, thereby the gel electrolyte layer 36 is formed, and the secondary battery shown in FIG. 3 is assembled.

The secondary battery can function as in the case of the first secondary battery, and can have the same effects as those of the first secondary battery.
(Third battery)

Figure 5:
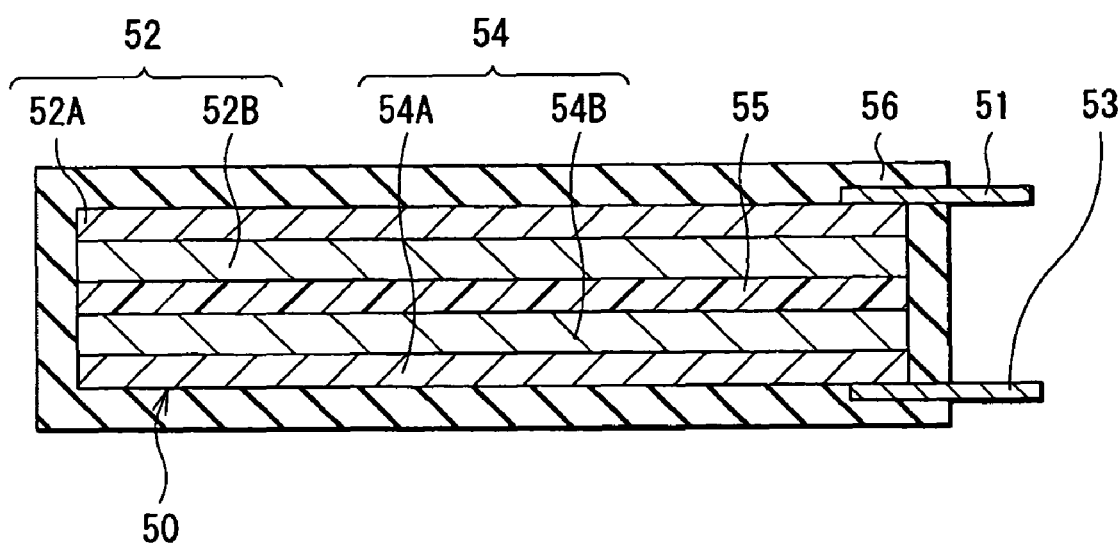
FIG. 5 is a sectional view of still another secondary battery according to the embodiment of the invention.

FIG. 5 shows a sectional view of a third secondary battery. In the secondary battery, a plate-shaped electrode body 50 including a cathode 52 to which an cathode lead 51 is attached and an anode 54 to which an anode lead 53 is attached so that the cathode 52 and the anode 54 face each other with an electrolyte layer 55 in between is contained in a film-shaped package member 56. The structure of the package member 56 is the same as that of the above-described package member 40.

The cathode 52 has a structure in which a cathode active material layer 52B is disposed on a cathode current collector 52A. The anode 54 has a structure in which an anode active material layer 54B is disposed on an anode current collector 54A, and the anode 54 is disposed so that the anode active material layer 54B faces the cathode active material layer 52B. The structures of the cathode current collector 52A, the cathode active material layer 52B, the anode current collector 54A and the anode active material layer 54B are the same as those of the cathode current collector 21A, the cathode active material layer 21B, the anode current collector 22A and anode active material layer 22B, respectively.

The electrolyte layer 55 is made of, for example, a solid electrolyte. As the solid electrolyte, for example, as long as the solid electrolyte is a material with lithium ion conductivity, either an inorganic solid electrolyte or a solid high molecular weight electrolyte can be used. As the inorganic solid electrolyte, an electrolyte including lithium nitride, lithium iodide or the like is cited. The solid high molecular weight electrolyte is mainly made of an electrolyte salt and a high molecular weight compound in which the electrolyte salt is dissolved. As the high molecular weight compound of the solid high molecular weight electrolyte, for example, an ether-based high molecular weight compound such as polyethylene oxide or a cross-link including polyethylene oxide, an ester-based high molecular weight compound such as polymethacrylate or an acrylate-based high molecular weight compound, or a mixture or a copolymer thereof can be used.

The solid high molecular weight electrolyte can be formed, for example, through mixing the high molecular weight compound, the electrolyte salt and a mixed solvent, and then volatilizing the mixed solvent. Moreover, after the electrolyte salt, monomers as materials of the high molecular weight compound and the polymerization initiator, and if necessary, another material such as the polymerization inhibitor are dissolved in the mixed solvent, and the mixed solvent is volatilized, the monomers are polymerized through applying heat to form the high molecular weight compound, thereby the solid high molecular weight electrolyte can be formed.

The inorganic electrolyte can be formed, for example, through a vapor phase method such as a sputtering method, a vacuum deposition method, a laser ablation method, an ion plating method or a CVD (Chemical Vapor Deposition) method, or liquid-phase deposition such as a sol-gel method on the surface of the cathode 52 or the anode 54.

The secondary battery can function as in the case of the first or the second secondary battery, and can obtain the same effects as those of the first or the second secondary battery.

Second Embodiment

An anode active material according to a second embodiment of the invention has the same structure as that of the anode active material according to the first embodiment, except that iron is further included as an element.

The iron content in the anode active material is preferably within a range from 0.3 wt % to 5.9 wt % inclusive. When the iron content is 0.3 wt % or more, the cycle characteristics can be further improved; however, when the iron content exceeds 5.9 wt %, the tin content is reduced, thereby it is difficult to obtain a sufficient capacity.

The anode active material can be used in the fist battery, the second battery and the third battery as in the case of the first embodiment.

EXAMPLES

Specific examples of the invention will be described in detail below.

Examples 1-1 Through 1-7

At first, anode active materials were prepared. As the materials of the anode active material, cobalt powder, tin powder and carbon powder were prepared, and the cobalt powder and the tin powder were alloyed to form cobalt-tin alloy powder, and then the carbon powder was added to the alloy powder, and they were dry mixed, thereby a mixture was formed. At that time, as the ratio of the materials, as shown in Table 1, the ratio of cobalt to the total of tin and cobalt (hereinafter referred to as Co/(Sn+Co) ratio) is fixed to 37 wt %, and the ratio of carbon was changed within a range from 10 wt % to 30 wt % inclusive. Next, 20 g of the mixture was put into a reaction vessel of a planetary ball mill of Ito Seisakusho together with approximately 400 g of steel balls with a diameter of 9 mm. Next, an argon atmosphere is introduced into the reaction vessel, and the cycle of a 10-minute operation at 250 rpm and a 10-minute interval was repeated until the total operation time reached 30 hours. After that, the reaction vessel was cooled down to a room temperature, and synthesized anode active material powder was taken out from the reaction vessel, and the anode active material powder was shifted through a sieve having 280 meshes to remove coarse grains of the anode active material powder.

Figure 6:
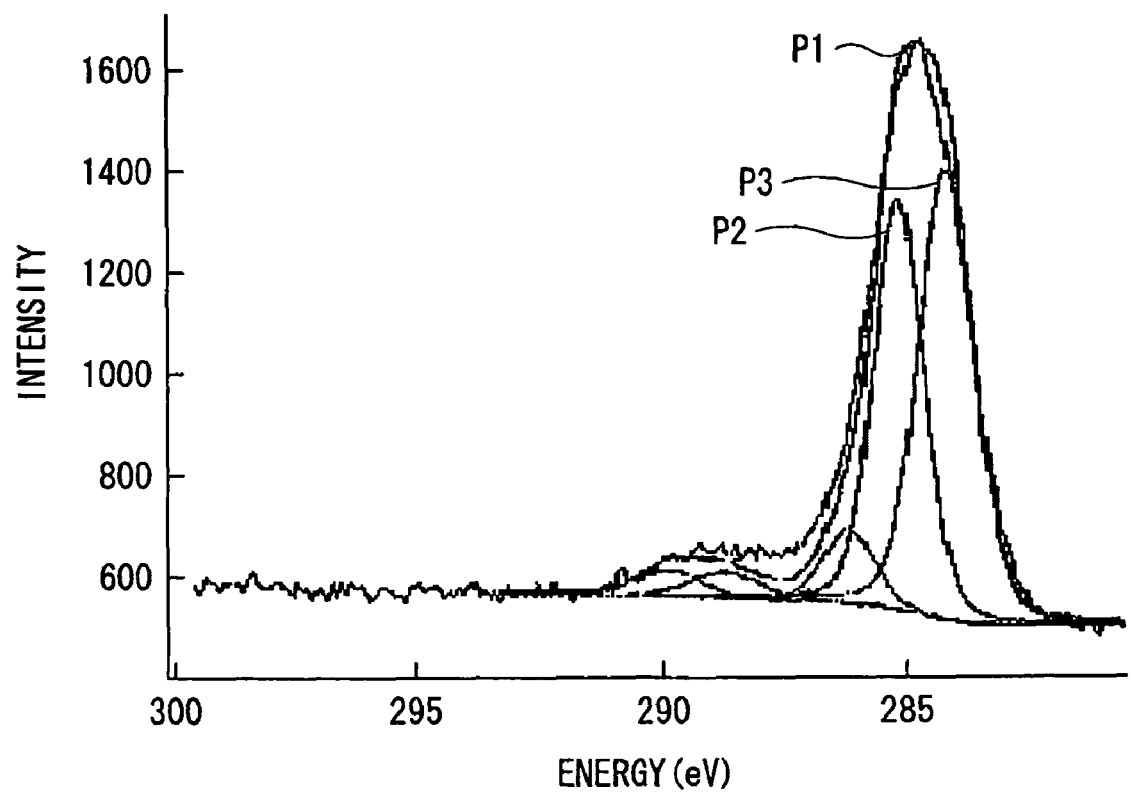
FIG. 6 is a plot showing an example of peaks of an anode active material formed in an example which are obtained by X-ray photoelectron spectroscopy.

The compositions of the obtained anode active materials were analyzed. The carbon content was measured by a carbon/sulfur analyzer, and the contents of cobalt and tin were measured by ICP (Inductively Coupled Plasma) emission spectrometry. The analytical values are shown in Table 1. The material ratios and the analytical values shown in Table 1 are rounded off to the first decimal place. The material ratios and the analytical values in the following examples are shown in the same manner. Moreover, when X-ray diffraction on each of the obtained anode active materials was performed, a diffraction peak having a broad half-width within 2θ=20° to 50° was observed. The half-width of the diffraction peak of each anode active material is also shown in Table 1. Further, when the XPS measurement was performed on each of the obtained anode active materials, as shown in FIG. 6, a peak P1 was obtained. When the peak P1 was analyzed, a peak P2 of surface contamination carbon and a peak P3 of C1s in the anode active material on a lower energy side than the peak 2 were obtained. In each of Examples 1-1 through 1-7, the peak P3 was obtained in a region lower than 284.5 eV. In other words, it was confirmed that carbon in each of the anode active materials was coupled to another element.

Figure 7:
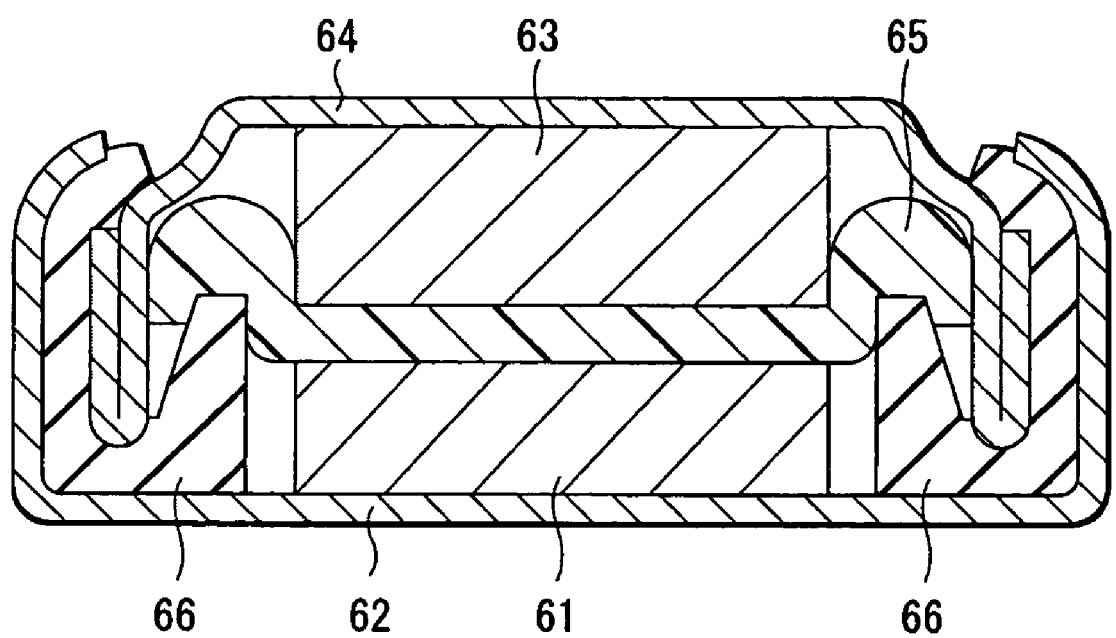
FIG. 7 is a sectional view of a coin type battery formed in an example.

Next, the anode active material powder of each of Examples 1-1 through 1-7 was used to form a coin type secondary battery shown in FIG. 7, and the initial charge capacity of the secondary battery was determined. The coin type battery included a test electrode 61 using the anode active material of each example which was contained in a package member 62, and a counter electrode 63 which was attached to a package member 64. The test electrode 61 and the counter electrode 63 were laminated with a separator 65 impregnated with an electrolyte solution in between, and then they were caulked by a gasket 66, thereby the coin type battery was formed.

The test electrode 61 was formed through the following steps. At first, 70 parts by weight of the obtained anode active material powder, 20 parts by weight of graphite which was an electrical conductor and another anode active material, 1 part by weight of acetylene black as an electrical conductor and 4 parts by weight of polyvinylidene fluoride as a binder were mixed to form a mixture. After the mixture was dispersed in an appropriate solvent to form slurry, the slurry was applied to a current collector of copper foil, and was dried. Then, the current collector was stamped into a pellet with a diameter of 15.2 mm.

As the counter electrode 63, a metal lithium plate stamped into a disk shape with a diameter of 15.5 mm was used. As the electrolyte solution, a mixed solvent including ethylene carbonate, propylene carbonate and dimethyl carbonate in which $LiPF_6$ as an electrolyte salt was dissolved was used.

As the initial charge capacity, a charge capacity per unit mass which was the mass of the test electrode 61 exclusive of the mass of the current collector of copper foil and the mass of the binder was determined through charging the secondary battery at a constant current of 1 mA until the battery voltage reached 0.2 mV, and then charging the secondary battery at a

TABLE 1

| | MATERIAL RATIO (WT %) | | | ANALYTICAL VALUE (WT %) | | | HALF-WIDTH (°) | INITIAL CHARGE CAPACITY (mAh/cm³) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|
| | Co | Sn | C | Co | Sn | Co | | | | | |
| EXAMPLE 1-1 | 33.3 | 56.7 | 10.0 | 33.0 | 56.1 | 9.9 | 3.5 | 500 | 122 | 73 | 60 |
| EXAMPLE 1-2 | 32.6 | 55.4 | 12.0 | 32.2 | 54.9 | 11.9 | 3.8 | 505 | 128 | 78 | 61 |
| EXAMPLE 1-3 | 31.5 | 53.6 | 15.0 | 31.1 | 53.0 | 14.9 | 4.3 | 515 | 131 | 81 | 62 |
| EXAMPLE 1-4 | 30.7 | 52.3 | 17.0 | 30.4 | 51.8 | 16.8 | 4.5 | 521 | 136 | 90 | 66 |
| EXAMPLE 1-5 | 29.6 | 50.4 | 20.0 | 29.3 | 49.9 | 19.8 | 4.8 | 525 | 140 | 98 | 70 |
| EXAMPLE 1-6 | 27.8 | 47.3 | 25.0 | 27.5 | 46.8 | 24.8 | 5.1 | 526 | 140 | 95 | 68 |
| EXAMPLE 1-7 | 25.9 | 44.1 | 30.0 | 25.6 | 43.7 | 29.7 | 5.4 | 510 | 128 | 78 | 61 |
| COMPARATIVE EXAMPLE 1-1 | 37.0 | 63.0 | 0 | 36.6 | 62.4 | 0 | 0.2 | 450 | 87 | 0 | 0 |
| COMPARATIVE EXAMPLE 1-2 | 36.6 | 62.4 | 1.0 | 36.3 | 61.7 | 1.0 | 0.5 | 453 | 91 | 0 | 0 |
| COMPARATIVE EXAMPLE 1-3 | 35.2 | 59.9 | 5.0 | 34.8 | 59.3 | 5.0 | 2.0 | 475 | 98 | 0 | 0 |
| COMPARATIVE EXAMPLE 1-4 | 34.0 | 58.0 | 8.0 | 33.7 | 57.4 | 7.9 | 3.0 | 490 | 111 | 13 | 12 |
| COMPARATIVE EXAMPLE 1-5 | 22.2 | 37.8 | 40.0 | 22.0 | 37.4 | 39.6 | 5.5 | 460 | 93 | 19 | 20 |
| COMPARATIVE EXAMPLE 1-6 | 18.5 | 31.5 | 50.0 | 18.3 | 31.2 | 49.5 | 5.5 | 410 | 76 | 9 | 12 |
| COMPARATIVE EXAMPLE 1-7 | 16.7 | 28.4 | 55.0 | 16.5 | 28.1 | 54.5 | 5.5 | 380 | 72 | 7 | 10 |

$$\frac{Co}{Sn+Co} = 37 \text{ wt \%}$$

constant voltage of 0.2 mV until a current reached 10 μA. In this case, charge means an insertion reaction of lithium into the anode active material. The results are shown in Table 1 and FIG. 8.

Moreover, a cylindrical type secondary battery shown in FIG. 1 was formed. At first, a cathode active material made of nickel oxide, ketjen black as an electrical conductor and polyvinylidene fluoride as a binder were mixed at a mass ratio of nickel oxide:ketjen black:polyvinylidene fluoride=94:3:3 to form a mixture. After the mixture was dispersed in a solvent such as N-methyl-2-pyrrolidone to form cathode mixture slurry, the cathode mixture slurry was uniformly applied to both sides of the cathode current collector 21A made of strip-shaped aluminum foil, and was dried. Then, the cathode active material layer 21B was formed through compression molding by a roller press so as to form the cathode 21. After that, the cathode lead 25 made of aluminum was attached to an end of the cathode current collector 21A.

Moreover, slurry including the anode active material which was formed as described above was uniformly applied to both sides of the anode current collector 22A made of strip-shaped copper foil, and was dried. Then, the anode active material layer 22B was formed through compression molding by a roller press so as to form the anode 22. Next, the anode lead 26 made of nickel was attached to an end of the anode current collector 22A.

After the cathode 21 and the anode 22 were formed, the separator 23 was prepared, and the anode 22, the separator 23, the cathode 21 and the separator 23 were laminated in this order to form a laminate, and the laminate was spirally wound several times to form the spirally wound electrode body 20.

After the spirally wound electrode body 20 was formed, the spirally wound electrode body 20 was sandwiched between a pair of insulating plates 12 and 13, and the anode lead 26 was welded to the battery can 11, and the cathode lead 25 was welded to the safety valve mechanism 15. Then, the spirally wound electrode body 20 was contained in the battery can 11 made of nickel-plated iron. After that, the above-described electrolyte solution was injected into the battery can 11 by a decomposition method.

After the electrolyte solution was injected into the battery can 11, the battery cover 14 was caulked to the battery can 11 by the gasket 17 of which the surface was coated with asphalt, thereby the cylindrical secondary battery shown in FIG. 1 was obtained.

The cycle characteristics of the obtained secondary battery were measured. The results are shown in Table 1 and FIG. 8. At that time, the cycle characteristics were measured through the following steps.

At first, after the secondary battery was charged at a constant current of 0.5 A until the battery voltage reached 4.2 V, the secondary battery was charged at a constant voltage of 4.2 V until the current reached 10 mA. Then, the secondary battery was discharged at a constant current of 0.25 A until the battery voltage reached 2.6 V. Thereby, the first cycle of charge-discharge was performed.

As the second or later cycles, after the secondary battery was charged at a constant current of 1.4 A until the battery voltage reached 4.2 V, the secondary battery was charged at a constant voltage of 4.2 V until the current reached 10 mA, and then the secondary battery was discharged at a constant current of 1.0 A until the battery voltage reached 2.6 V. As the cycle characteristics, the capacity retention ratio in the 300th cycle to the discharge capacity in the second cycle (discharge capacity in the 300th cycle)/(discharge capacity in the second cycle)×100(%) was determined.

Figure 9:
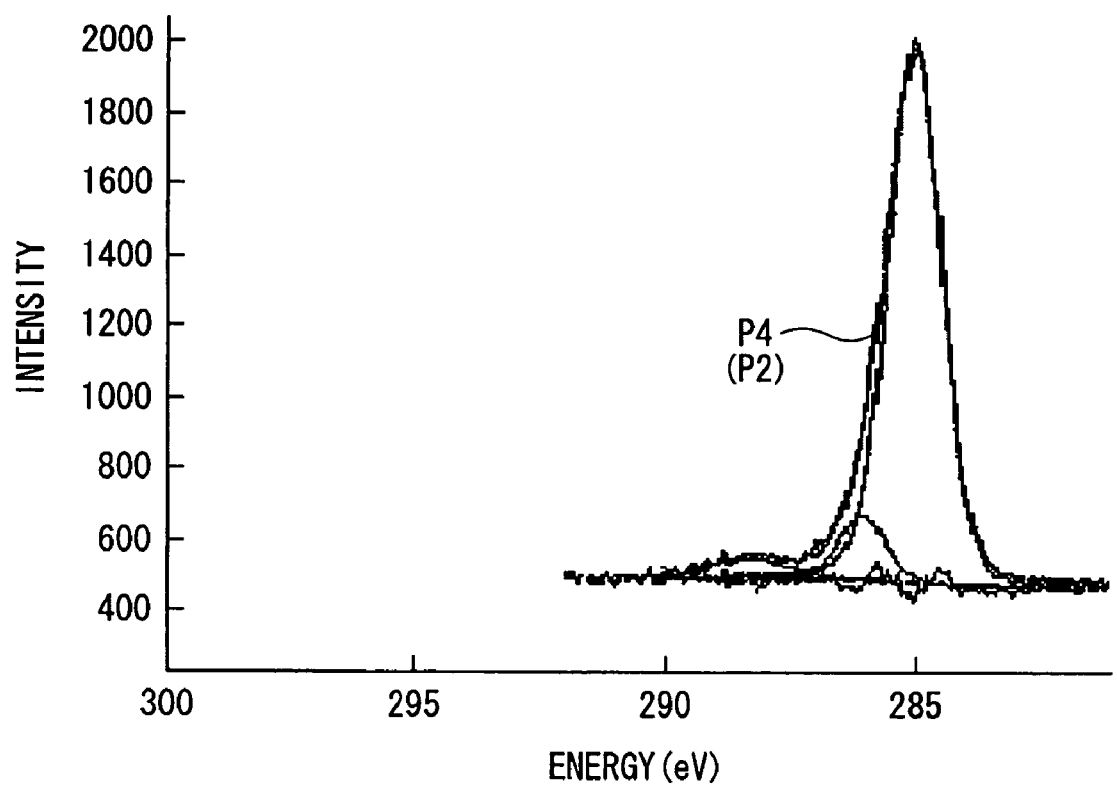
FIG. 9 is a plot showing an example of peaks of an anode active material formed in a comparative example which are obtained by X-ray photoelectron spectroscopy.

As Comparative Example 1-1 relative to Examples 1-1 through 1-7, an anode active material was synthesized, and a secondary battery was formed as in the case of Examples 1-1 through 1-7, except that as a material, carbon powder was not used. Moreover, as Comparative Examples 1-2 through 1-7, anode active materials were synthesized, and secondary batteries were formed as in the case of Examples 1-1 through 1-7, except that the material ratio of carbon powder was changed as shown in Table 1. The analysis of the composition and the measurement of the half-width of a diffraction peak having a broad half-width observed within a range of 2θ=20° to 50° were performed on the anode active materials of Comparative Examples 1-1 through 1-7. The results are shown in Table 1. Further, when the XPS measurement was performed on the anode active materials of Comparative Examples 1-1 through 1-7, in the anode active materials of Comparative Examples 1-3 through 1-7, the peak P1 shown in FIG. 6 was obtained. When the peak P1 was analyzed, as in the case of Examples 1-1 through 1-7, the peak P2 of surface contamination carbon and the peak P3 of C1s in the anode active material were obtained, and the peak P3 in each of Comparative Examples 1-3 through 1-7 was obtained in a region lower than 284.5 eV. In other words, it was confirmed that at least a part of carbon included in the anode active material was coupled to another element. On the other hand, in Comparative Example 1-1, as shown in FIG. 9, a peak P4 was obtained, and when the peak P4 was analyzed, only the peak P2 of surface contamination carbon was obtained. In Comparative Example 1-2, the amount of carbon used as a material was small, so only the peak P2 was obtained by the analysis, and the peak P3 was hardly detected.

Moreover, the charge capacities and the cycle characteristics of the secondary batteries of Comparative Examples 1-1 through 1-7 were measured in the same manner. The results are also shown in Table 1 and FIG. 8.

Figure 8:
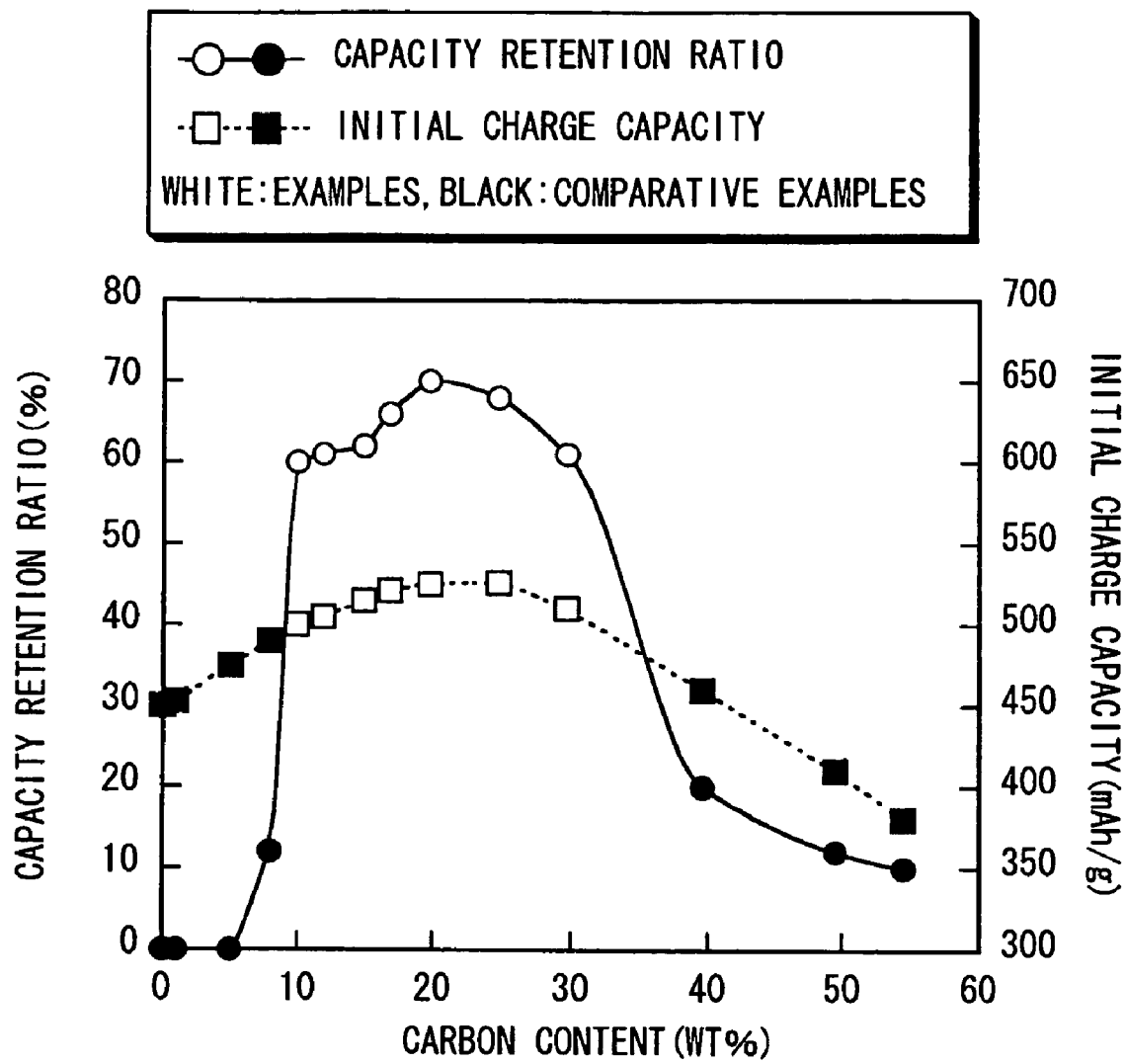
FIG. 8 is a plot showing a relationship between the carbon content in an anode active material, a capacity retention ratio and an initial charge capacity.

It was obvious from Table 1 and FIG. 8 that in Examples 1-1 through 1-7 in which the carbon content in the anode active material was within a range from 9.9 wt % to 29.7 wt % inclusive, the capacity retention ratio could be remarkably improved, compared to Comparative Examples 1-1 through 1-7 in which the carbon content was out of the range. Moreover, the initial charge capacity and the discharge capacity could be improved.

Moreover, when the carbon content in the anode active material was within a range from 14.9 wt % to 29.7 wt % inclusive, more specifically within a range from 16.8 wt % to 24.8 wt % inclusive, higher values could be obtained.

In other words, it was found out that when the carbon content was within a range from 9.9 wt % to 29.7 wt % inclusive, the capacity and the cycle characteristics could be improved, and the carbon content was more preferably within a range from 14.9 wt % to 29.7 wt % inclusive, and more preferably within a range from 16.8 wt % to 24.8 wt % inclusive.

Examples 2-1 Through 2-9

Secondary batteries were formed as in the case of Examples 1-1 through 1-7, except that and anode active materials in which the material ratio of cobalt, tin and carbon was changed as shown in Table 2 were synthesized. More specifically, the material ratio of carbon was fixed to 10 wt %, and the Co/(Sn+Co) ratio was changed within a range from 30 wt % to 70 wt % inclusive.

TABLE 2

| | MATERIAL RATIO (WT %) | | | ANALYTICAL VALUE (WT %) | | | Co / Sn + Co | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|
| | Co | Sn | C | Co | Sn | C | | | | | | |
| EXAMPLE 2-1 | 63.0 | 27.0 | 10.0 | 62.4 | 26.7 | 9.9 | 70 | 3.8 | 370 | 96 | 69 | 72 |
| EXAMPLE 2-2 | 58.5 | 31.5 | 10.0 | 57.9 | 31.2 | 9.9 | 65 | 3.8 | 380 | 100 | 71 | 71 |
| EXAMPLE 2-3 | 54.0 | 36.0 | 10.0 | 53.5 | 35.6 | 9.9 | 60 | 3.7 | 400 | 102 | 72 | 70 |
| EXAMPLE 2-4 | 49.5 | 40.5 | 10.0 | 49.0 | 40.1 | 9.9 | 55 | 3.7 | 420 | 105 | 72 | 69 |
| EXAMPLE 2-5 | 45.0 | 45.0 | 10.0 | 44.6 | 44.6 | 9.9 | 50 | 3.6 | 450 | 107 | 72 | 67 |
| EXAMPLE 2-6 | 40.5 | 49.5 | 10.0 | 40.1 | 49.0 | 9.9 | 45 | 3.6 | 480 | 113 | 73 | 64 |
| EXAMPLE 2-7 | 36.0 | 54.0 | 10.0 | 35.6 | 53.5 | 9.9 | 40 | 3.5 | 488 | 118 | 73 | 62 |
| EXAMPLE 1-1 | 33.3 | 56.7 | 10.0 | 33.0 | 56.1 | 9.9 | 37 | 3.5 | 500 | 122 | 73 | 60 |
| EXAMPLE 2-8 | 29.7 | 60.3 | 10.0 | 29.4 | 59.7 | 9.9 | 33 | 3.4 | 530 | 120 | 71 | 59 |
| EXAMPLE 2-9 | 27.0 | 63.0 | 10.0 | 26.7 | 62.4 | 9.9 | 30 | 3.3 | 560 | 120 | 68 | 57 |
| COMPARATIVE EXAMPLE 2-1 | 25.2 | 64.8 | 10.0 | 24.9 | 64.2 | 9.9 | 28 | 3.2 | 565 | 118 | 22 | 19 |
| COMPARATIVE EXAMPLE 2-2 | 22.5 | 67.5 | 10.0 | 22.3 | 66.8 | 9.9 | 25 | 3.0 | 575 | 115 | 0 | 0 |
| COMPARATIVE EXAMPLE 2-3 | 18.0 | 72.0 | 10.0 | 17.8 | 71.3 | 9.9 | 20 | 2.8 | 600 | 111 | 0 | 0 |
| COMPARATIVE EXAMPLE 2-4 | 67.5 | 22.5 | 10.0 | 66.8 | 22.3 | 9.9 | 75 | 3.8 | 284 | 71 | 52 | 73 |

As Comparative Examples 2-1 through 2-4 relative to Examples 2-1 through 2-9, anode active materials and secondary batteries were formed as in the case of Examples 2-1 through 2-9, except that the Co/(Sn+Co) ratio was changed as shown in Table 2. The Co/(Sn+Co) ratios in Comparative Examples 2-1, 2-2, 2-3 and 2-4 were 28 wt %, 25 wt %, 20 wt % and 75 wt %, respectively.

The analysis of the composition and the measurement of the half-width of a diffraction peak having a broad half-width observed within a range of 2θ=20° to 50° were performed on the anode active materials of Examples 2-1 through 2-9 and Comparative Examples 2-1 through 2-4 as in the case of Examples 1-1 through 1-7. The results are shown in Table 2. Further, when the XPS measurement was performed, and the obtained peaks were analyzed, as in the case of Examples 1-1 through 1-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured as in the case of Examples 1-1 through 1-7. The results are shown in Table 2 and FIG. 10.

Figure 10:
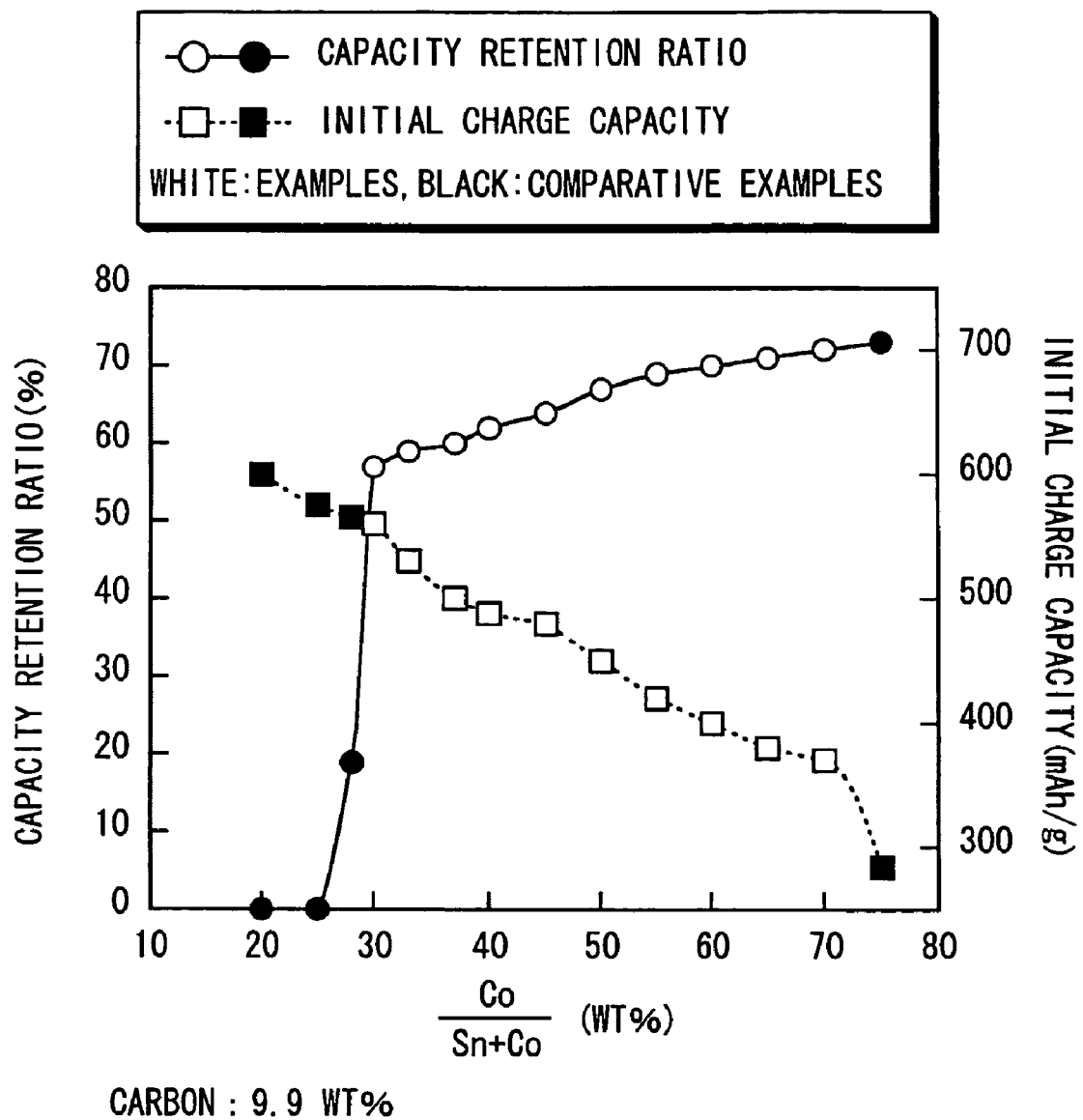
FIG. 10 is a plot showing a relationship between the ratio of cobalt to the total of tin and cobalt in an anode active material, a capacity retention ratio and an initial charge capacity.

It was obvious from Table 2 and FIG. 10 that in Examples 2-1 through 2-9 in which the Co/(Sn+Co) ratio was within a range from 30 wt % to 70 wt % inclusive, the capacity retention ratio could be remarkably improved, compared to Comparative Examples 2-1 through 2-3 in which the Co/(Sn+Co) ratio was lower than 30 wt %, and the initial charge capacity could be remarkably increased, compared to Comparative Example 2-4 in which the Co/(Sn+Co) ratio was higher than 70 wt %. More specifically, when the Co/(Sn+Co) ratio was equal to or lower than 60 wt %, a high initial charge capacity could be obtained.

In other words, it was found out that when the Co/(Sn+Co) ratio was within a range from 30 wt % to 70 wt % inclusive, the capacity and the cycle characteristics could be improved. Moreover, it was found out that the Co/(Sn+Co) ratio was more preferably 60 wt % or less.

Examples 3-1 Through 3-9

Secondary batteries were formed as in the case of Examples 1-1 through 1-7, except that anode active materials in which the material ratio of cobalt, tin and carbon was changed as shown in Table 3 were synthesized. More specifically, the material ratio of carbon was fixed to 20 wt %, and the Co/(Sn+Co) ratio was changed within a range from 30 wt % to 70 wt % inclusive.

TABLE 3

| | MATERIAL RATIO (WT %) | | | ANALYTICAL VALUE (WT %) | | | Co / Sn + Co | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|
| | Co | Sn | C | Co | Sn | C | | | | | | |
| EXAMPLE 3-1 | 56.0 | 24.0 | 20.0 | 55.4 | 23.8 | 19.8 | 70 | 5.0 | 370 | 98 | 82 | 84 |
| EXAMPLE 3-2 | 52.0 | 28.0 | 20.0 | 51.5 | 27.7 | 19.8 | 65 | 5.0 | 380 | 100 | 84 | 84 |
| EXAMPLE 3-3 | 48.0 | 32.0 | 20.0 | 47.5 | 31.7 | 19.8 | 60 | 4.9 | 400 | 106 | 88 | 83 |
| EXAMPLE 3-4 | 44.0 | 36.0 | 20.0 | 43.6 | 35.6 | 19.8 | 55 | 4.9 | 420 | 112 | 92 | 82 |
| EXAMPLE 3-5 | 40.0 | 40.0 | 20.0 | 39.6 | 39.6 | 19.8 | 50 | 4.9 | 450 | 118 | 95 | 80 |
| EXAMPLE 3-6 | 36.0 | 44.0 | 20.0 | 35.6 | 43.6 | 19.8 | 45 | 4.8 | 480 | 128 | 96 | 75 |
| EXAMPLE 3-7 | 32.0 | 48.0 | 20.0 | 31.7 | 47.5 | 19.8 | 40 | 4.8 | 505 | 133 | 96 | 72 |
| EXAMPLE 1-5 | 29.6 | 50.4 | 20.0 | 29.3 | 49.9 | 19.8 | 37 | 4.8 | 525 | 140 | 98 | 70 |
| EXAMPLE 3-8 | 26.4 | 53.6 | 20.0 | 26.1 | 53.1 | 19.8 | 33 | 4.6 | 545 | 140 | 95 | 68 |
| EXAMPLE 3-9 | 24.0 | 56.0 | 20.0 | 23.8 | 55.4 | 19.8 | 30 | 4.5 | 560 | 146 | 89 | 61 |
| COMPARATIVE EXAMPLE 3-1 | 22.4 | 57.6 | 20.0 | 22.2 | 57.0 | 19.8 | 28 | 4.4 | 565 | 140 | 49 | 35 |

TABLE 3-continued

| | MATERIAL RATIO (WT %) | | | ANALYTICAL VALUE (WT %) | | | Co / Sn + Co | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|
| | Co | Sn | C | Co | Sn | C | | | | | | |
| COMPARATIVE EXAMPLE 3-2 | 20.0 | 60.0 | 20.0 | 19.8 | 59.4 | 19.8 | 25 | 4.2 | 575 | 134 | 27 | 20 |
| COMPARATIVE EXAMPLE 3-3 | 16.0 | 64.0 | 20.0 | 15.8 | 63.4 | 19.8 | 20 | 4.0 | 600 | 126 | 0 | 0 |
| COMPARATIVE EXAMPLE 3-4 | 60.0 | 20.0 | 20.0 | 59.4 | 19.8 | 19.8 | 75 | 5.0 | 259 | 65 | 55 | 85 |

As Comparative Examples 3-1 through 3-4 relative to Examples 3-1 through 3-9, anode active materials and secondary batteries were formed as in the case of Examples 3-1 through 3-9, except that the Co/(Sn+Co) ratio was changed as shown in Table 3. The Co/(Sn+Co) ratios in Comparative Examples 3-1, 3-2, 3-3 and 3-4 were 28 wt %, 25 wt %, 20 wt % and 75 wt %, respectively.

The analysis of the composition and the measurement of the half-width of a diffraction peak having a broad half-width observed within a range of $2\theta=20°$ to $50°$ were performed on the anode active materials of Examples 3-1 through 3-9 and Comparative Examples 3-1 through 3-4 as in the case of Examples 1-1 through 1-7. The results are shown in Table 3.

Further, when the XPS measurement was performed, and the obtained peaks were analyzed, as in the case of Examples 1-1 through 1-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured as in the case of Examples 1-1 through 1-7. The results are shown in Table 3 and FIG. 11.

Figure 11:
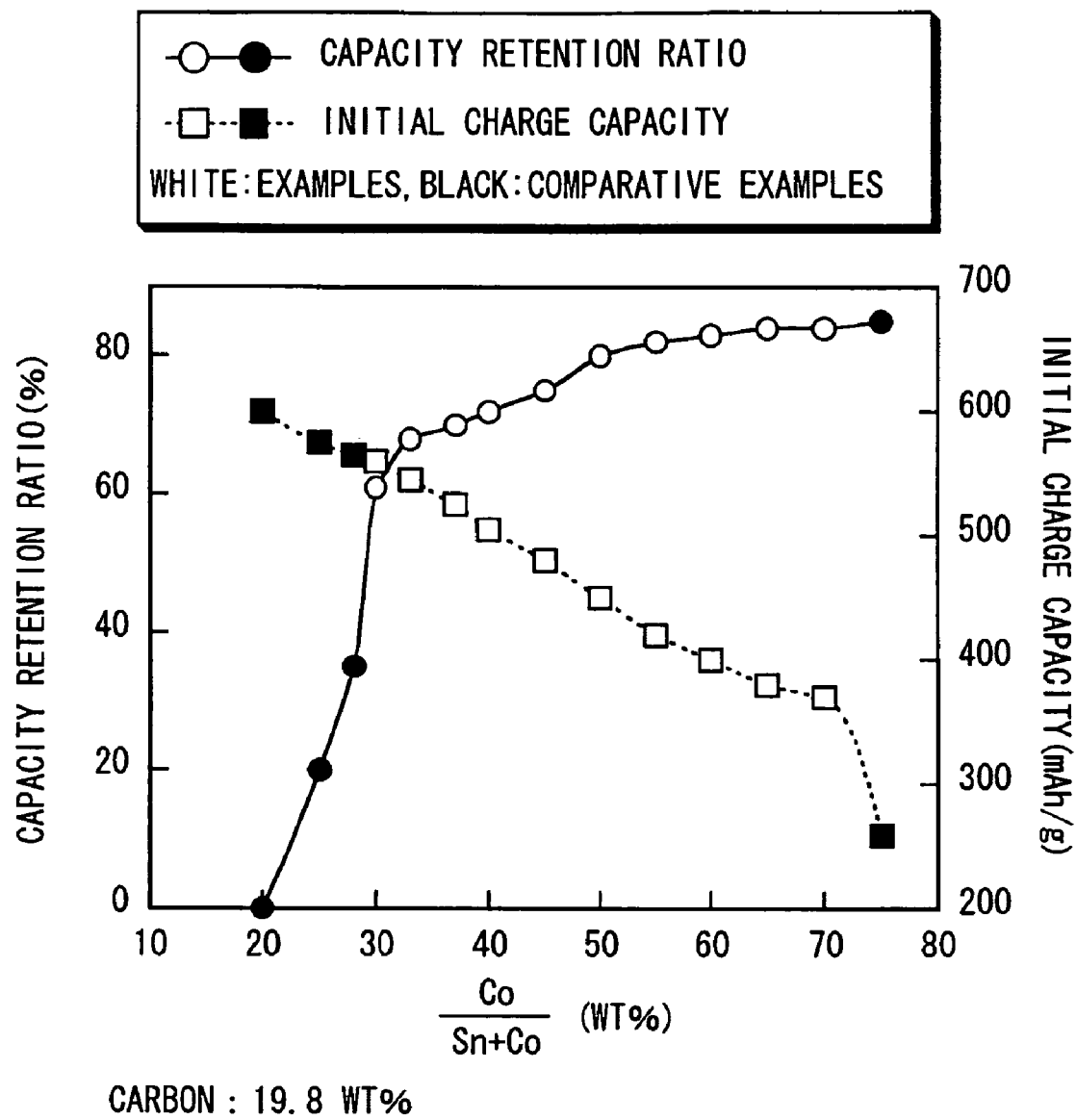
FIG. 11 is another plot showing a relationship between the ratio of cobalt to the total of tin and cobalt in an anode active material, a capacity retention ratio and an initial charge capacity.

It was obvious from Table 3 and FIG. 11 that the same results as those in the case of Examples 2-1 through 2-9 were obtained. In other words, it was found out that when the Co/(Sn+Co) ratio was within a range from 30 wt % to 70 wt %, even in the case where the carbon content was 19.8 wt %, the capacity and the cycle characteristics could be improved.

Examples 4-1 Through 4-9

Secondary batteries were formed as in the case of Examples 1-1 through 1-7, except that anode active materials in which the material ratio of cobalt, tin and carbon was changed as shown in Table 4 were synthesized. More specifically, the material ratio of carbon was fixed to 30 wt %, and the Co/(Sn+Co) ratio was changed within a range from 30 wt % to 70 wt % inclusive.

TABLE 4

| | MATERIAL RATIO (WT %) | | | ANALYTICAL VALUE (WT %) | | | Co / Sn + Co | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|
| | Co | Sn | C | Co | Sn | C | | | | | | |
| EXAMPLE 4-1 | 49.0 | 21.0 | 30.0 | 48.5 | 20.8 | 29.7 | 70 | 6.0 | 325 | 81 | 70 | 86 |
| EXAMPLE 4-2 | 45.5 | 24.5 | 30.0 | 45.0 | 24.3 | 29.7 | 65 | 5.9 | 401 | 105 | 85 | 81 |
| EXAMPLE 4-3 | 42.0 | 28.0 | 30.0 | 41.6 | 27.7 | 29.7 | 60 | 5.8 | 421 | 110 | 85 | 77 |
| EXAMPLE 4-4 | 38.5 | 31.5 | 30.0 | 38.1 | 31.2 | 29.7 | 55 | 5.7 | 445 | 116 | 86 | 74 |
| EXAMPLE 4-5 | 35.0 | 35.0 | 30.0 | 34.7 | 34.7 | 29.7 | 50 | 5.6 | 458 | 121 | 85 | 70 |
| EXAMPLE 4-6 | 31.5 | 38.5 | 30.0 | 31.2 | 38.1 | 29.7 | 45 | 5.5 | 472 | 124 | 84 | 68 |
| EXAMPLE 4-7 | 28.0 | 42.0 | 30.0 | 27.7 | 41.6 | 29.7 | 40 | 5.5 | 498 | 126 | 81 | 64 |
| EXAMPLE 1-7 | 25.9 | 44.1 | 30.0 | 25.6 | 43.7 | 29.7 | 37 | 5.4 | 510 | 128 | 78 | 61 |
| EXAMPLE 4-8 | 23.1 | 46.9 | 30.0 | 22.9 | 46.4 | 29.7 | 33 | 5.4 | 519 | 132 | 78 | 59 |
| EXAMPLE 4-9 | 21.0 | 49.0 | 30.0 | 20.8 | 48.5 | 29.7 | 30 | 5.3 | 525 | 135 | 76 | 56 |
| COMPARATIVE EXAMPLE 4-1 | 19.6 | 50.4 | 30.0 | 19.4 | 49.9 | 29.7 | 28 | 5.2 | 534 | 132 | 51 | 39 |
| COMPARATIVE EXAMPLE 4-2 | 17.5 | 52.5 | 30.0 | 17.3 | 52.0 | 29.7 | 25 | 5.1 | 545 | 128 | 31 | 24 |
| COMPARATIVE EXAMPLE 4-3 | 14.0 | 56.0 | 30.0 | 13.9 | 55.4 | 29.7 | 20 | 5.0 | 551 | 115 | 0 | 0 |
| COMPARATIVE EXAMPLE 4-4 | 52.5 | 17.5 | 30.0 | 52.0 | 17.3 | 29.7 | 75 | 6.1 | 271 | 67 | 60 | 89 |

As Comparative Examples 4-1 through 4-4 relative to Examples 4-1 through 4-9, anode active materials and secondary batteries were formed as in the case of Examples 4-1 through 4-9, except that the Co/(Sn+Co) ratio was changed as shown in Table 4. The Co/(Sn+Co) ratios in Comparative Examples 4-1, 4-2, 4-3 and 4-4 were 28 wt %, 25 wt %, 20 wt % and 75 wt %, respectively.

The analysis of the composition and the measurement of the half-width of a diffraction peak having a broad half-width observed within a range of $2\theta=20°$ to $50°$ were performed on the anode active materials of Examples 4-1 through 4-9 and Comparative Examples 4-1 through 4-4 as in the case of Examples 1-1 through 1-7. The results are shown in Table 4. Further, when the XPS measurement was performed, and the obtained peaks were analyzed, as in the case of Examples 1-1 through 1-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured in the same manner. The results are shown in Table 4 and FIG. 12.

Figure 12:
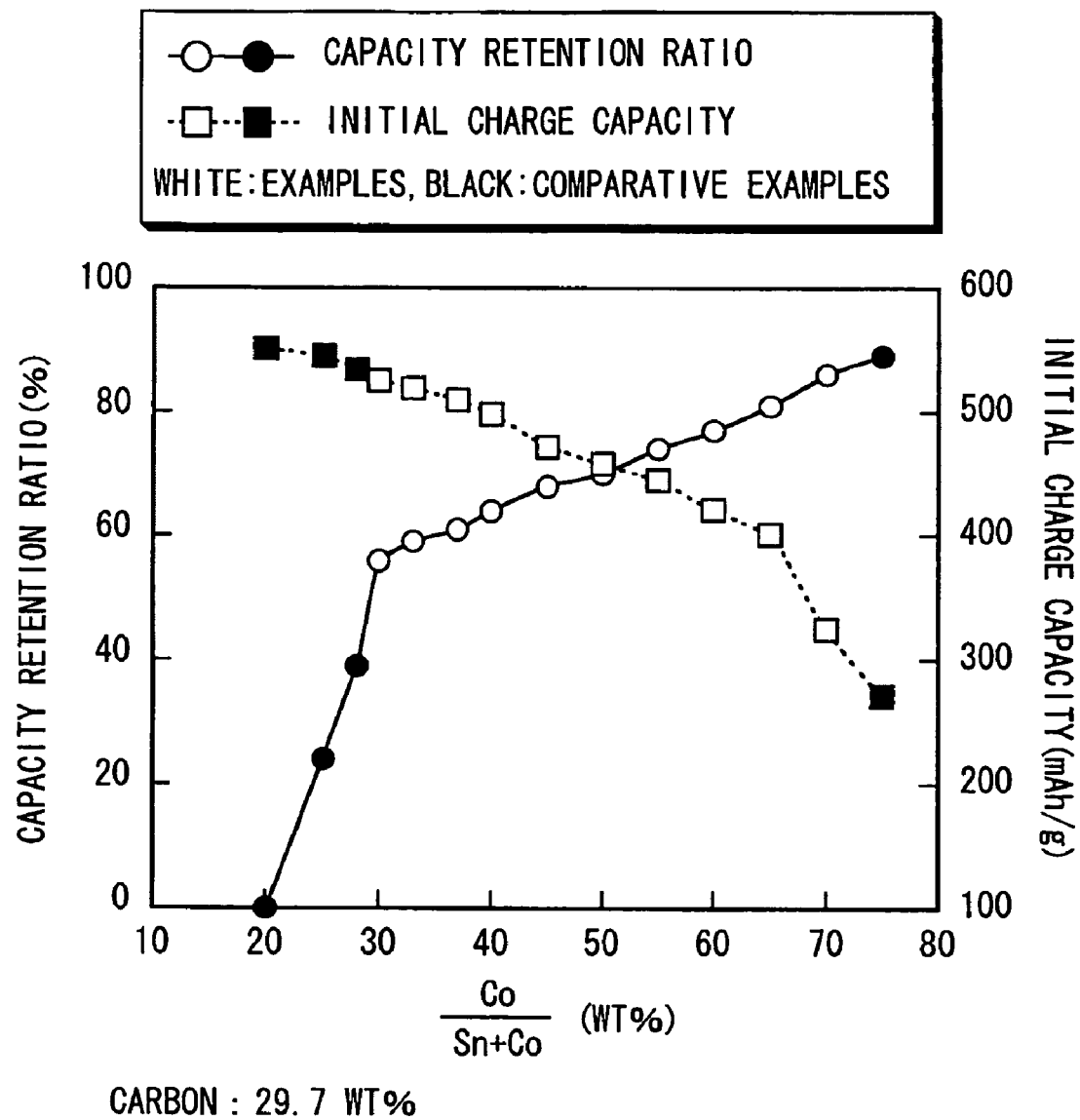
FIG. 12 is another plot showing a relationship between the ratio of cobalt to the total of tin and cobalt in an anode active material, a capacity retention ratio and an initial charge capacity.

It was obvious from Table 4 and FIG. 12 that the same results as those in Examples 2-1 through 2-9 were obtained. In other words, it was found out that when the Co/(Sn+Co) ratio was within a range from 30 wt % to 70 wt % inclusive, even in the case where the carbon content was 29.7 wt %, the capacity and the cycle characteristics could be improved.

Examples 5-1 Through 5-6 and 6-1 Through 6-6

Anode active materials and secondary batteries were formed as in the case of Examples 1-1 through 1-7, except that the operation time and the number of revolutions when the anode active materials were synthesized were changed so as to change the half-width of a diffraction peak having a broad half-width observed within a range of $2\theta=20°$ to $50°$. At that time, in the material ratio of cobalt, tin and carbon, the material ratio of carbon was changed in Examples 5-1 through 5-6 and Examples 6-1 through 6-6 as shown in Table 5, and the Co/(Sn+Co) ratio was the same.

other words, it was confirmed that at least a part of carbon included in the anode active material was coupled to another element. Moreover, the initial charge capacities and the cycle characteristics of the secondary batteries were measured as in the case of Examples 1-1 through 1-7. The results are shown in Table 5.

It was obvious from Table 5 that in Examples 5-1 through 5-6 and 6-1 through 6-6, the larger the half-width was, the more the capacity retention ratio was improved. In other words, it was found out that when the half-width of the diffraction peak had a larger reactive phase, the cycle characteristics could be improved.

Examples 7-1 Through 7-11

Anode active materials and secondary batteries were formed as in the case of Examples 1-1 through 1-7, except that silicon powder was further used as a material, and the material ratio of cobalt, tin, carbon and silicon was changed as shown in Table 6. More specifically, the material ratio of the silicon powder was changed within a range from 0.3 wt % to 10 wt % inclusive, and the Co/(Sn+Co) ratio and the material ratio of carbon were fixed. The analysis of the composition was performed on the secondary batteries of Examples 7-1 through 7-11 as in the case of Examples 1-1 through 1-7. The results are shown in Table 6. The silicon content was measured by

TABLE 5

| | MATERIAL RATIO (WT %) | | | ANALYTICAL VALUE (WT %) | | | HALF-WIDTH (°) | CAPACITY RETENTION RATIO (%) |
|---|---|---|---|---|---|---|---|---|
| | Co | Sn | C | Co | Sn | C | | |
| EXAMPLE 5-1 | 33.3 | 56.7 | 10.0 | 33.0 | 56.1 | 9.9 | 1.0 | 38 |
| EXAMPLE 5-2 | 33.3 | 56.7 | 10.0 | 33.0 | 56.1 | 9.9 | 1.2 | 45 |
| EXAMPLE 5-3 | 33.3 | 56.7 | 10.0 | 33.0 | 56.1 | 9.9 | 1.5 | 48 |
| EXAMPLE 5-4 | 33.3 | 56.7 | 10.0 | 33.0 | 56.1 | 9.9 | 2.0 | 51 |
| EXAMPLE 5-5 | 33.3 | 56.7 | 10.0 | 33.0 | 56.1 | 9.9 | 3.0 | 55 |
| EXAMPLE 5-6 | 33.3 | 56.7 | 10.0 | 33.0 | 56.1 | 9.9 | 4.0 | 64 |
| EXAMPLE 6-1 | 25.9 | 44.1 | 30.0 | 25.6 | 43.7 | 29.7 | 1.0 | 40 |
| EXAMPLE 6-2 | 25.9 | 44.1 | 30.0 | 25.6 | 43.7 | 29.7 | 1.2 | 43 |
| EXAMPLE 6-3 | 25.9 | 44.1 | 30.0 | 25.6 | 43.7 | 29.7 | 1.5 | 45 |
| EXAMPLE 6-4 | 25.9 | 44.1 | 30.0 | 25.6 | 43.7 | 29.7 | 2.0 | 48 |
| EXAMPLE 6-5 | 25.9 | 44.1 | 30.0 | 25.6 | 43.7 | 29.7 | 3.0 | 50 |
| EXAMPLE 6-6 | 25.9 | 44.1 | 30.0 | 25.6 | 43.7 | 29.7 | 4.0 | 54 |

$$\frac{Co}{Sn+Co} = 37 \text{ wt \%}$$

The analysis of the composition and the measurement of the half-width of a diffraction peak having a broad half-width observed within a range of $2\theta=20°$ to $50°$ were performed on the anode active materials of Examples 5-1 through 5-6 and 6-1 through 6-6 as in the case of Examples 1-1 through 1-7. The results are shown in Table 5. Further, when the XPS measurement was performed, and the obtained peaks were analyzed, as in the case of Examples 1-1 through 1-7, the peak P2 of surface contamination carbon and the peak P3 of C1s in the anode active material were obtained, and the peak P3 was obtained in a region lower than 284.5 eV in each example. In ICP emission spectrometry. Moreover, when the XPS measurement was performed, and the obtained peaks were analyzed, as in the case of Examples 1-1 through 1-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured in the same manner. The results are shown in Table 6.

TABLE 6

| | MATERIAL RATIO (WT %) | | | | | ANALYTICAL VALUE (WT %) | | | | | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|---|---|
| | Co | Sn | C | Si | Sn + Si | Co | Sn | C | Si | Sn + Si | | | | |
| EXAMPLE 1-5 | 29.6 | 50.4 | 20 | 0 | 50.4 | 29.3 | 49.9 | 19.8 | 0 | 49.9 | 525 | 140 | 98 | 70 |
| EXAMPLE 7-1 | 29.5 | 50.2 | 20 | 0.3 | 50.5 | 29.2 | 49.7 | 19.8 | 0.3 | 50.0 | 526 | 140 | 98 | 70 |
| EXAMPLE 7-2 | 29.4 | 50.1 | 20 | 0.5 | 50.6 | 29.1 | 49.6 | 19.8 | 0.5 | 50.1 | 530 | 142 | 96 | 68 |
| EXAMPLE 7-3 | 29.2 | 49.8 | 20 | 1.0 | 50.8 | 28.9 | 49.3 | 19.8 | 1.0 | 50.3 | 550 | 144 | 96 | 67 |
| EXAMPLE 7-4 | 28.9 | 49.1 | 20 | 2.0 | 51.1 | 28.6 | 48.6 | 19.8 | 2.0 | 50.6 | 560 | 146 | 95 | 65 |
| EXAMPLE 7-5 | 28.1 | 47.9 | 20 | 4.0 | 51.9 | 27.8 | 47.4 | 19.8 | 4.0 | 51.4 | 575 | 148 | 95 | 64 |
| EXAMPLE 7-6 | 27.4 | 46.6 | 20 | 6.0 | 52.6 | 27.1 | 46.2 | 19.8 | 5.9 | 52.1 | 591 | 152 | 96 | 63 |
| EXAMPLE 7-7 | 27.0 | 46.0 | 20 | 7.0 | 53.0 | 26.7 | 45.5 | 19.8 | 6.9 | 52.5 | 610 | 157 | 97 | 62 |
| EXAMPLE 7-8 | 26.6 | 45.4 | 20 | 8.0 | 53.4 | 26.4 | 44.9 | 19.8 | 7.9 | 52.8 | 620 | 159 | 89 | 56 |
| EXAMPLE 7-9 | 26.5 | 45.0 | 20 | 8.5 | 53.5 | 26.2 | 44.6 | 19.8 | 8.4 | 53.0 | 636 | 159 | 65 | 41 |
| EXAMPLE 7-10 | 26.3 | 44.7 | 20 | 9.0 | 53.7 | 26.0 | 44.3 | 19.8 | 8.9 | 53.2 | 660 | 161 | 40 | 25 |
| EXAMPLE | 25.9 | 44.1 | 20 | 10 | 54.1 | 25.6 | 43.7 | 19.8 | 9.9 | 53.6 | 690 | 163 | 16 | 10 |

$$\frac{Co}{Sn + Co} = 37 \text{ wt \%}$$

It was obvious from Table 6 that in Examples 7-1 through 7-11 in which silicon was included, the initial charge capacity could be further improved, compared to Example 1-5 in which no silicon was included. However, there was a tendency that the capacity retention ratio declined with increasing the silicon content.

In other words, it was found out that when silicon was included in the anode active material, the capacity could be improved, and the silicon content was preferably within a range from 0.5 wt % to 7.9 wt % inclusive.

Examples 8-1 Through 8-10

In Example 8-1, an anode active material was synthesized, and a secondary battery was formed as in the case of Examples 1-1 through 1-7, except that the material ratio of cobalt, tin and carbon was changed as shown in Table 7. In Examples 8-2 through 8-10, anode active materials were synthesized, and secondary batteries were formed as in the case of Examples 1-1 through 1-7, except that cobalt powder, tin powder, carbon powder and titanium powder were prepared as materials, and the material ratio of them was changed as shown in Table 7. More specifically, the material ratio of titanium was changed within a range from 0 wt % to 16 wt % inclusive, and the Co/(Sn+Co) ratio and the material ratio of carbon were fixed. Moreover, the anode active materials were synthesized through alloying the cobalt powder, the tin powder and the titanium powder to form cobalt-tin-titanium alloy powder, and then mixing carbon powder to the alloy powder. The analysis of the composition was performed on the anode active materials of Examples 8-1 through 8-10 as in the case of Examples 1-1 through 1-7. The results are shown in Table 7. The titanium content was measured by ICP emission spectrometry. Further, when the XPS measurement was performed, and the obtained peaks were analyzed, as in the case of Examples 1-1 through 1-7 the peak P2 of surface contamination carbon and the peak P3 of C1s in the anode active material were obtained, and the peak P3 was obtained in a region lower that 284.5 eV in each example. In other words, it was confirmed that at least a part of carbon included in the anode active material was coupled to another element. Moreover, the initial charge capacities and the cycle characteristics of the secondary batteries were measured in the same manner. The results are shown in Table 7 and FIG. 13.

TABLE 7

| | MATERIAL RATIO (WT %) | | | | ANALYTICAL VALUE (WT %) | | | | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|
| | Co | Sn | C | Ti | Co | Sn | C | Ti | | | | |
| EXAMPLE 8-1 | 28.0 | 52.0 | 20 | 0 | 27.7 | 51.5 | 19.8 | 0 | 530 | 140 | 98 | 70 |
| EXAMPLE 8-2 | 27.6 | 51.2 | 20 | 1.2 | 27.3 | 50.7 | 19.8 | 1.2 | 545 | 143 | 100 | 73 |

TABLE 7-continued

| | MATERIAL RATIO (WT %) | | | | ANALYTICAL VALUE (WT %) | | | | INITIAL CHARGE CAPACITY | DISCHARGE CAPACITY IN SECOND CYCLE | DISCHARGE CAPACITY IN 300TH CYCLE | CAPACITY RETENTION RATIO |
|---|---|---|---|---|---|---|---|---|---|---|---|---|
| | Co | Sn | C | Ti | Co | Sn | C | Ti | (mAh/g) | (mAh/cm$^3$) | (mAh/cm$^3$) | (%) |
| EXAMPLE 8-3 | 27.2 | 50.4 | 20 | 2.4 | 26.9 | 49.9 | 19.8 | 2.4 | 551 | 145 | 116 | 80 |
| EXAMPLE 8-4 | 26.6 | 49.4 | 20 | 4.0 | 26.3 | 48.9 | 19.8 | 4.0 | 560 | 147 | 122 | 83 |
| EXAMPLE 8-5 | 26.2 | 48.7 | 20 | 5.1 | 26.0 | 48.2 | 19.8 | 5.0 | 568 | 147 | 125 | 85 |
| EXAMPLE 8-6 | 25.4 | 47.1 | 20 | 7.5 | 25.1 | 46.7 | 19.8 | 7.4 | 572 | 148 | 124 | 84 |
| EXAMPLE 8-7 | 24.5 | 45.5 | 20 | 10.0 | 24.3 | 45.0 | 19.8 | 9.9 | 570 | 147 | 125 | 85 |
| EXAMPLE 8-8 | 23.5 | 43.6 | 20 | 13.0 | 23.2 | 43.1 | 19.8 | 12.9 | 565 | 143 | 120 | 84 |
| EXAMPLE 8-9 | 22.8 | 42.3 | 20 | 15.0 | 22.5 | 41.8 | 19.8 | 14.9 | 540 | 140 | 111 | 79 |
| EXAMPLE 8-10 | 22.4 | 41.6 | 20 | 16.0 | 22.2 | 41.2 | 19.8 | 15.8 | 500 | 130 | 90 | 69 |

$$\frac{Co}{Sn+Co} = 35 \text{ wt \%}$$

Figure 13:
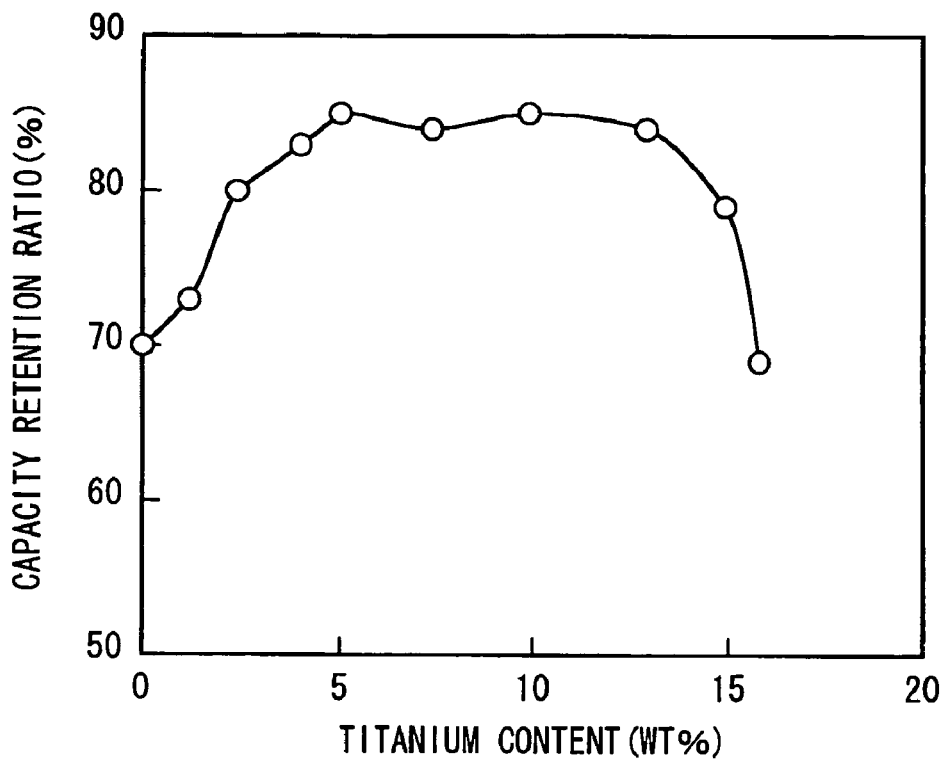
FIG. 13 is a plot showing a relationship between the titanium content in an anode active material and a capacity retention ratio.

It was obvious from Table 7 and FIG. 13 that in Examples 8-2 through 8-9 in which titanium was included within a range of 14.9 wt % or less, the capacity retention ratio could be improved, compared to Example 8-1 in which no titanium was included, and Example 8-10 in which titanium exceeding 14.9 wt % was included. Moreover, when the titanium content was equal to or higher than 2.4 wt %, more specifically within a range from 4.0 wt % to 12.9 wt % inclusive, a higher value could be obtained.

In other words, it was found out that when titanium of 14.9 wt % or less was included in the anode active material, the cycle characteristics could be further improved, and more preferably titanium was included within a range of 2.4 wt % or more, and more preferably within a range from 4.0 wt % to 12.9 wt % inclusive.

Examples 9-1 Through 9-9

Anode active materials were synthesized, and secondary batteries were formed as in the case of Examples 1-1 through 1-7, except that cobalt powder, tin powder, carbon powder and bismuth powder were prepared as materials, and the material ratio of them was changed as shown in Table 8. More specifically, the material ratio of bismuth was changed within a range from 1.2 wt % to 16 wt % inclusive, and the Co/(Sn+Co) ratio and the material ratio of carbon were fixed. The anode active materials were synthesized through alloying the cobalt powder, the tin powder and the bismuth powder to form cobalt-tin-bismuth alloy powder, and then mixing the carbon powder to the alloy powder. The analysis of the composition was performed on the anode active materials as in the case of Examples 1-1 through 1-7. The results are shown in Table 8. The bismuth content was measured by ICP emission spectrometry. Further, when the XPS measurement was performed, and the obtained peaks were analyzed, as in the case of Examples 1-1 through 1-7, the peak P2 of surface contamination carbon and the peak P3 of C1s in the anode active material were obtained, and the peak P3 was obtained in a region lower that 284.5 eV in each example. In other words, it was confirmed that at least a part of carbon include in the anode active material was coupled to another element. Moreover, the initial charge capacities and the cycle characteristics of the secondary batteries were measured in the same manner. The results are shown in Table 8 and FIG. 14.

TABLE 8

| | MATERIAL RATIO (WT %) | | | | ANALYTICAL VALUE (WT %) | | | | INITIAL CHARGE CAPACITY | DISCHARGE CAPACITY IN SECOND CYCLE | DISCHARGE CAPACITY IN 300TH CYCLE | CAPACITY RETENTION RATIO |
|---|---|---|---|---|---|---|---|---|---|---|---|---|
| | Co | Sn | C | Bi | Co | Sn | C | Bi | (mAh/g) | (mAh/cm$^3$) | (mAh/cm$^3$) | (%) |
| EXAMPLE 8-1 | 28.0 | 52.0 | 20 | 0 | 27.7 | 51.5 | 19.8 | 0 | 530 | 140 | 98 | 70 |
| EXAMPLE 9-1 | 27.6 | 51.2 | 20 | 1.2 | 27.3 | 50.7 | 19.8 | 1.2 | 525 | 138 | 95 | 71 |
| EXAMPLE 9-2 | 27.2 | 50.4 | 20 | 2.4 | 26.9 | 49.9 | 19.8 | 2.4 | 524 | 138 | 101 | 73 |
| EXAMPLE 9-3 | 26.6 | 49.4 | 20 | 4.0 | 26.3 | 48.9 | 19.8 | 4.0 | 524 | 138 | 105 | 76 |
| EXAMPLE 9-4 | 26.2 | 48.7 | 20 | 5.1 | 26.0 | 48.2 | 19.8 | 5.0 | 520 | 138 | 113 | 82 |
| EXAMPLE 9-5 | 25.4 | 47.1 | 20 | 7.5 | 25.1 | 46.7 | 19.8 | 7.4 | 517 | 137 | 116 | 85 |
| EXAMPLE 9-6 | 24.5 | 45.5 | 20 | 10.0 | 24.3 | 45.0 | 19.8 | 9.9 | 515 | 136 | 118 | 87 |
| EXAMPLE 9-7 | 23.5 | 43.6 | 20 | 13.0 | 23.2 | 43.1 | 19.8 | 12.9 | 511 | 136 | 117 | 86 |
| EXAMPLE 9-8 | 22.8 | 42.3 | 20 | 15.0 | 22.5 | 41.8 | 19.8 | 14.9 | 510 | 136 | 111 | 82 |
| EXAMPLE 9-9 | 22.4 | 41.6 | 20 | 16.0 | 22.2 | 41.2 | 19.8 | 15.8 | 498 | 131 | 89 | 68 |

$$\frac{Co}{Sn+Co} = 35 \text{ wt \%}$$

Figure 14:
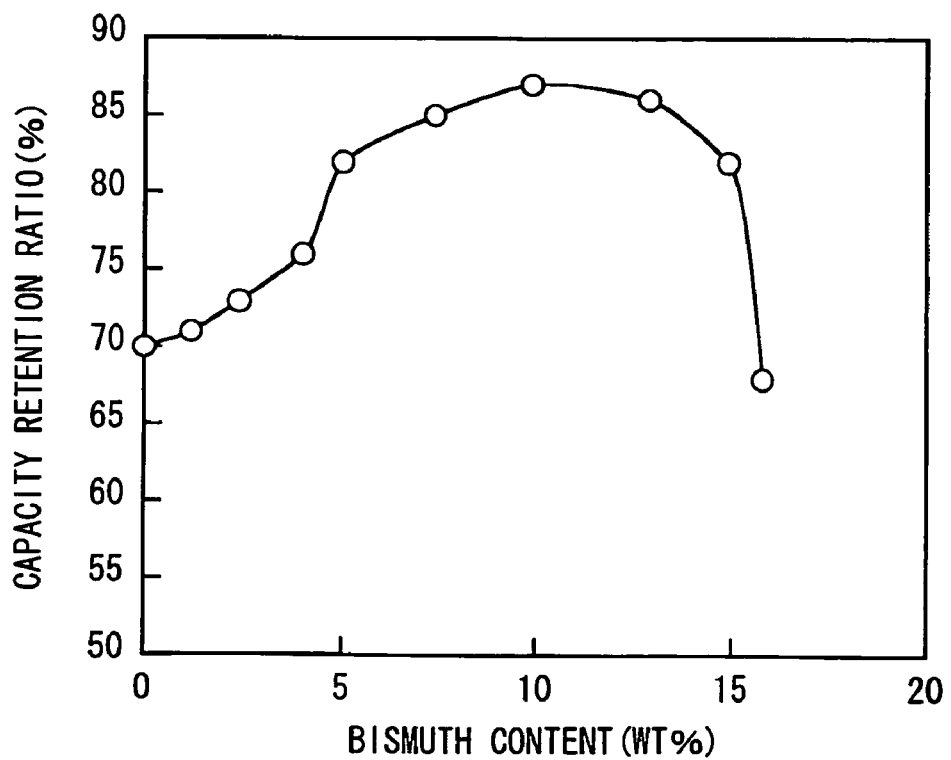
FIG. 14 is a plot showing a relationship between the bismuth content in an anode active material and a capacity retention ratio.

As shown in Table 8 and FIG. 14, in Examples 9-1 through 9-9 in which bismuth was added, the same results as those in Examples 8-2 through 8-10 in which titanium was added were obtained. In other words, it was found out that in the case where bismuth was included in the anode active material within a range from 14.9 wt % or less, the cycle characteristics can be further improved, and bismuth was more preferably included within a range of 4.0 wt % or more.

Examples 10-1 Through 10-14

Anode active materials were synthesized and secondary batteries were formed as in the case of Examples 1-1 through 1-7, except that cobalt powder, tin powder, carbon powder, and molybdenum powder, niobium powder, aluminum powder, germanium powder, indium powder, gallium powder, phosphorus powder, or aluminum powder and phosphorus powder were used as materials, and the material ratio of cobalt, tin, carbon, and molybdenum, niobium, aluminum, germanium, indium, gallium, phosphorus, or aluminum and phosphorus was changed as shown in Table 9. More specifically, the material ratio of molybdenum, niobium, aluminum, germanium, indium, gallium, phosphorus, or aluminum and phosphorus was 3 wt %, 4 wt %, 5 wt % or 6 wt %, and the Co/(Sn+Co) ratio was fixed to 35 wt %. Moreover, the anode active materials were synthesized through alloying the cobalt powder and the tin powder to form cobalt-tin alloy powder, and then mixing the carbon powder, and the molybdenum powder, the niobium powder, the aluminum powder, the germanium powder, the indium powder, the gallium powder, the phosphorus powder, or the aluminum powder and the phosphorus powder to the alloy powder. The analysis of the composition was performed on the anode active materials of Examples 10-1 through 10-14 as in the case of Examples 1-1 through 1-7. The results are shown in Table 9. The contents of molybdenum, niobium, aluminum, germanium, indium, gallium and phosphorus were measured by ICP emission spectrometry. Further, when the XPS measurement was performed, and the obtained peaks were analyzed, as in the case of Examples 1-1 through 1-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured in the same manner. The results are shown in Table 10.

TABLE 9

| | MATERIAL RATIO (WT %) | | | | | | | | | | ANALYTICAL VALUE (WT %) | | | | | | | | | |
|---|---|---|---|---|---|---|---|---|---|---|---|---|---|---|---|---|---|---|---|---|
| | Co | Sn | C | Mo | Nb | Al | Ge | In | Ga | P | Co | Sn | C | Mo | Nb | Al | Ge | In | Ga | P |
| EXAMPLE 8-1 | 28.0 | 52.0 | 20 | — | — | — | — | — | — | — | 27.7 | 51.5 | 19.8 | — | — | — | — | — | — | — |
| EXAMPLE 10-1 | 26.6 | 49.4 | 20 | 4.0 | — | — | — | — | — | — | 26.3 | 48.9 | 19.8 | 4.0 | — | — | — | — | — | — |
| EXAMPLE 10-2 | 26.6 | 49.4 | 18 | 6.0 | — | — | — | — | — | — | 26.3 | 48.9 | 17.8 | 5.9 | — | — | — | — | — | — |
| EXAMPLE 10-3 | 26.6 | 49.4 | 20 | — | 4.0 | — | — | — | — | — | 26.3 | 48.9 | 19.8 | — | 4.0 | — | — | — | — | — |
| EXAMPLE 10-4 | 27.0 | 50.1 | 18 | — | 5.0 | — | — | — | — | — | 26.7 | 49.5 | 17.8 | — | 5.0 | — | — | — | — | — |
| EXAMPLE 10-5 | 26.3 | 48.8 | 19 | — | 6.0 | — | — | — | — | — | 26.0 | 48.3 | 18.8 | — | 5.9 | — | — | — | — | — |
| EXAMPLE 10-6 | 27.3 | 50.7 | 18 | — | — | 4.0 | — | — | — | — | 27.0 | 50.2 | 17.8 | — | — | 4.0 | — | — | — | — |
| EXAMPLE 10-7 | 25.9 | 48.1 | 20 | — | — | 6.0 | — | — | — | — | 25.6 | 47.6 | 19.8 | — | — | 5.9 | — | — | — | — |
| EXAMPLE 10-8 | 25.9 | 48.1 | 20 | — | — | — | 6.0 | — | — | — | 25.6 | 47.6 | 19.8 | — | — | — | 5.9 | — | — | — |
| EXAMPLE 10-9 | 27.7 | 51.4 | 18 | — | — | — | — | 3.0 | — | — | 27.4 | 50.8 | 17.8 | — | — | — | — | 3.0 | — | — |
| EXAMPLE 10-10 | 27.3 | 50.7 | 18 | — | — | — | — | 4.0 | — | — | 27.0 | 50.2 | 17.8 | — | — | — | — | 4.0 | — | — |
| EXAMPLE 10-11 | 25.9 | 48.1 | 20 | — | — | — | — | 6.0 | — | — | 25.6 | 47.6 | 19.8 | — | — | — | — | 5.9 | — | — |
| EXAMPLE 10-12 | 25.9 | 48.1 | 20 | — | — | — | — | — | 6.0 | — | 25.6 | 47.6 | 19.8 | — | — | — | — | — | 5.9 | — |
| EXAMPLE 10-13 | 27.7 | 51.4 | 18 | — | — | — | — | — | — | 3.0 | 27.4 | 50.8 | 17.8 | — | — | — | — | — | — | 3.0 |
| EXAMPLE 10-14 | 25.9 | 48.1 | 20 | — | — | 4.0 | — | — | — | 2.0 | 25.6 | 47.6 | 19.8 | — | — | 3.9 | — | — | — | 1.9 |

$$\frac{Co}{Sn+Co} = 35 \text{ wt \%}$$

TABLE 10

|  | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|
| EXAMPLE 8-1 | 530 | 140 | 98 | 70 |
| EXAMPLE 10-1 | 510 | 136 | 107 | 79 |
| EXAMPLE 10-2 | 508 | 138 | 110 | 80 |
| EXAMPLE 10-3 | 535 | 140 | 116 | 83 |
| EXAMPLE 10-4 | 530 | 139 | 114 | 82 |
| EXAMPLE 10-5 | 532 | 138 | 113 | 82 |
| EXAMPLE 10-6 | 556 | 141 | 110 | 78 |
| EXAMPLE 10-7 | 552 | 144 | 117 | 81 |
| EXAMPLE 10-8 | 540 | 142 | 114 | 80 |
| EXAMPLE 10-9 | 540 | 139 | 110 | 79 |
| EXAMPLE 10-10 | 544 | 140 | 112 | 80 |
| EXAMPLE 10-11 | 550 | 144 | 120 | 83 |
| EXAMPLE 10-12 | 525 | 138 | 112 | 81 |
| EXAMPLE 10-13 | 541 | 141 | 110 | 78 |
| EXAMPLE 10-14 | 560 | 147 | 113 | 77 |

As shown in Tables 9 and 10, in Examples 10-1 through 10-14, the cycle characteristics could be improved as in the case of Examples 8-2 through 8-10 and 9-1 through 9-9. In other words, it was found out that when the anode active material included at least one kind selected from the group consisting of molybdenum, niobium, aluminum, germanium, indium, gallium and phosphorus, the cycle characteristics could be further improved.

Examples 11-1 Through 11-8

Anode active materials were synthesized, and secondary batteries were formed as in the case of Examples 1-1 through 1-7, except that cobalt powder, tin powder, carbon powder, silicon powder, titanium powder and indium powder were prepared as materials, and the material ratio of them was changed as shown in Table 11. More specifically, the material ratio of titanium, or titanium and indium was changed within a range from 0 wt % to 10 wt % inclusive, and the Co/(Sn+Co) ratio, the material ratio of carbon and the material ratio of silicon were fixed. Moreover, the anode active materials were synthesized through alloying the cobalt powder and the tin powder, the cobalt powder, the tin powder and the titanium powder, or the cobalt powder, the tin powder, the titanium powder and the indium powder to form cobalt-tin alloy powder, or cobalt-tin-titanium alloy powder, or cobalt-tin-titanium-indium alloy powder, and then mixing the carbon powder and the silicon powder to the alloy powder. The analysis of the composition was performed on the anode active materials of Examples 11-1 through 11-8 as in the case of Examples 1-1 through 1-7. The results are shown in Table 11. The contents of silicon, titanium and indium were measured by ICP emission spectrometry. Further, when the XPS measurement was performed, and the obtained peaks were analyzed, as in the case of Examples 1-1 through 1-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured in the same manner. The results are shown in Table 12.

TABLE 11

|  | MATERIAL RATIO (WT %) | | | | | | ANALYTICAL VALUE (WT %) | | | | | |
|---|---|---|---|---|---|---|---|---|---|---|---|---|
|  | Co | Sn | C | Si | Ti | In | Co | Sn | C | Si | Ti | In |
| EXAMPLE 8-1 | 28.0 | 52.0 | 20.0 | — | — | — | 27.7 | 51.5 | 19.8 | — | — | — |
| EXAMPLE 11-1 | 27.7 | 51.4 | 18.0 | 3.0 | — | — | 27.4 | 50.8 | 17.8 | 3.0 | — | — |
| EXAMPLE 11-2 | 26.3 | 48.8 | 18.0 | 3.0 | 4.0 | — | 26.0 | 48.3 | 17.8 | 3.0 | 4.0 | — |
| EXAMPLE 11-3 | 25.9 | 48.0 | 18.0 | 3.0 | 5.1 | — | 25.6 | 47.6 | 17.8 | 3.0 | 5.0 | — |
| EXAMPLE 11-4 | 25.0 | 46.5 | 18.0 | 3.0 | 7.5 | — | 24.8 | 46.0 | 17.8 | 3.0 | 7.4 | — |
| EXAMPLE 11-5 | 26.3 | 48.8 | 18.0 | 3.0 | 2.6 | 1.4 | 26.0 | 48.3 | 17.8 | 3.0 | 2.6 | 1.4 |
| EXAMPLE 11-6 | 25.9 | 48.0 | 18.0 | 3.0 | 3.7 | 1.4 | 25.6 | 47.6 | 17.8 | 3.0 | 3.6 | 1.4 |
| EXAMPLE 11-7 | 25.0 | 46.5 | 18.0 | 3.0 | 6.1 | 1.4 | 24.8 | 46.0 | 17.8 | 3.0 | 6.0 | 1.4 |
| EXAMPLE 11-8 | 24.2 | 44.9 | 18.0 | 3.0 | 8.6 | 1.4 | 23.9 | 44.4 | 17.8 | 3.0 | 8.4 | 1.4 |

$$\frac{Co}{Sn+Co} = 35 \text{ wt \%}$$

TABLE 12

|  | INTIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|
| EXAMPLE 8-1 | 530 | 140 | 98 | 70 |
| EXAMPLE 11-1 | 568 | 147 | 96 | 65 |
| EXAMPLE 11-2 | 592 | 148 | 110 | 74 |
| EXAMPLE 11-3 | 600 | 149 | 113 | 76 |
| EXAMPLE 11-4 | 602 | 150 | 113 | 75 |
| EXAMPLE 11-5 | 588 | 147 | 112 | 76 |
| EXAMPLE 11-6 | 597 | 149 | 112 | 75 |
| EXAMPLE 11-7 | 598 | 149 | 113 | 76 |
| EXAMPLE 11-8 | 593 | 148 | 110 | 74 |

It was obvious from Table 12 that in Examples 11-2 through 11-8 in which in addition to silicon, titanium, or titanium and indium were added, the initial charge capacity and the capacity retention ratio could be further improved, compared to Examples 8-1 and 11-1 in which they were not included.

In other words, it was found out that when at least one kind selected from the group consisting of titanium, molybdenum, niobium, aluminum, germanium, indium, gallium and phosphorus, and silicon were included in the anode active material, the capacity and the cycle characteristics could be further improved.

Examples 12-1 Through 12-6

Anode active materials were synthesized as in the case of Examples 1-1 through 1-7, except that cobalt powder, tin powder, carbon powder, silicon powder and titanium powder were prepared as materials, and after the cobalt powder and the tin powder, or the cobalt powder, the tin powder and the titanium powder were alloyed to form cobalt-tin alloy powder or cobalt-tin-titanium alloy powder, the carbon powder, or the carbon powder and the silicon powder were mixed to the alloy powder. At that time, the material ratio was changed as shown in Table 13. Moreover, cylindrical secondary batteries shown in FIG. 1 were formed as in the case of Examples 1-1 through 1-7, except that the anode active materials were used, and the composition of the electrolyte solution was changed in Examples 12-1 through 12-3 and Examples 12-4 through 12-6. At that time, in Examples 12-1 through 12-3, an electrolyte solution in which $LiPF_6$ as the electrolyte salt was dissolved in a mixed solvent including ethylene carbonate, propylene carbonate and dimethyl carbonate at a mass ratio of ethylene carbonate:propylene carbonate:dimethyl carbonate=30:10:60 at a ratio of 1 mol/l was used, and in Examples 12-4 through 12-6, an electrolyte solution in which $LiPF_6$ as the electrolyte salt was dissolved in a mixed solvent including 4-fluoro-1,3-dioxolane-2-one, ethylene carbonate, propylene carbonate and dimethyl carbonate at a mass ratio of 4-fluoro-1,3-dioxolane-2-one:ethylene carbonate:propylene carbonate:dimethyl carbonate=20:10:10:60 at a ratio of 1 mol/l was used. The same anode active material was used in Examples 12-1 and 12-4, Examples 12-2 and 12-5, and Examples 12-3 and 12-6.

The analysis of the composition was performed on the anode active materials of Examples 12-1 through 12-6 as in the case of Examples 1-1 through 1-7. The results are shown in Table 13. Further, when the XPS measurement was performed, and the obtained peaks were analyzed, as in the case of Examples 1-1 through 1-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the cycle characteristics of the secondary batteries were measured in the same manner. The results are shown in Table 13.

TABLE 13

|  | MATERIAL RATIO (WT %) | | | | | ANALYTICAL VALUE (WT %) | | | | | | CAPACITY RETENTION RATIO (%) |
|---|---|---|---|---|---|---|---|---|---|---|---|---|
|  | Co | Sn | C | Si | Ti | Co | Sn | C | Si | Ti | SOLVENT |  |
| EXAMPLE 12-1 | 30.0 | 50 | 20.0 | — | — | 29.9 | 49.8 | 19.8 | — | — | EC + PC + DMC | 70 |
| EXAMPLE 12-2 | 28.8 | 48 | 19.2 | 4.0 | — | 28.7 | 47.8 | 19.1 | 3.9 | — | EC + PC + DMC | 64 |
| EXAMPLE 12-3 | 28.2 | 47 | 18.8 | 4.0 | 2.0 | 28.1 | 46.8 | 18.7 | 3.9 | 1.9 | EC + PC + DMC | 72 |
| EXAMPLE 12-4 | 30.0 | 50 | 20.0 | — | — | 29.9 | 49.8 | 19.8 | — | — | FEC + EC + PC + DMC | 86 |
| EXAMPLE 12-5 | 28.8 | 48 | 19.2 | 4.0 | — | 28.6 | 47.8 | 19.0 | 3.9 | — | FEC + EC + PC + DMC | 78 |
| EXAMPLE 12-6 | 28.2 | 47 | 18.8 | 4.0 | 2.0 | 28.0 | 46.8 | 18.7 | 13.9 | 1.9 | FEC + EC + PC + DMC | 90 |

EC: ethylene Carbonate
PC: propylene Carbonate
DMC: dimethyl Carbonate
FEC: 4-fluoro-1,3-dioxolane-2-one $$\frac{Co}{Sn + Co} = 37.5 \text{ wt \%}$$

It was obvious from Table 13 that in Examples 12-4 through 12-6 in which 4-fluoro-1,3-dioxolane-2-one was used as a solvent, the capacity retention ratio could be further improved, compared to Examples 12-1 through 12-3 in which 4-fluoro-1,3-dioxolane-2-one was not used.

Examples 13-1 Through 13-18

Cylindrical secondary batteries were formed as in the case of Examples 12-1 and 12-4, except that the composition of the solvent was changed as shown in Table 14. The cycle characteristics of the secondary batteries of Examples 13-1 through 13-18 were measured as in the case of Examples 1-1 through 1-7. The results are shown in Table 14.

and specifically when the content of 4-fluoro-1,3-dioxolane-2-one was within a range from 0.1 wt % to 80 wt % inclusive, a higher effect could be obtained.

Examples 14-1 Through 14-6

Cylindrical secondary batteries were formed as in the case of 14-2, except that instead of 4-fluoro-1,3-dioxolane-2-one, another derivative of a cyclic carbonate including a halogen atom was used. At that time, 4-difluoro-1,3-dioxolane-2-one, 4-difluoro-5-fluoro-1,3-dioxolane-2-one, 4-chloro-1,3-dioxolane-2-one, 4-bromo-1,3-dioxolane-2-one, 4-iodo-1,3-dioxolane-2-one and 4-fluoromethyl-1,3-dioxolane-2-one

TABLE 14

| | MATERIAL RATIO (WT %) | | | ANALYTICAL VALUE (WT %) | | | SOLVENT (WT %) | | | | CAPACITY RETENTION RATIO |
|---|---|---|---|---|---|---|---|---|---|---|---|
| | Co | Sn | C | Co | Sn | C | FEC | EC | PC | DMC | (%) |
| EXAMPLE 12-1 | 30 | 50 | 20 | 29.9 | 49.8 | 19.8 | 0 | 30 | 10 | 60 | 70 |
| EXAMPLE 13-1 | 30 | 50 | 20 | 29.9 | 49.8 | 19.8 | 0.1 | 29.9 | 10 | 60 | 71 |
| EXAMPLE 13-2 | 30 | 50 | 20 | 29.9 | 49.8 | 19.8 | 0.5 | 29.5 | 10 | 60 | 75 |
| EXAMPLE 13-3 | 30 | 50 | 20 | 29.9 | 49.8 | 19.8 | 1.0 | 29 | 10 | 60 | 78 |
| EXAMPLE 13-4 | 30 | 50 | 20 | 29.9 | 49.8 | 19.8 | 5.0 | 25 | 10 | 60 | 80 |
| EXAMPLE 13-5 | 30 | 50 | 20 | 29.9 | 49.8 | 19.8 | 10 | 20 | 10 | 60 | 83 |
| EXAMPLE 13-6 | 30 | 50 | 20 | 29.9 | 49.8 | 19.8 | 15 | 15 | 10 | 60 | 84 |
| EXAMPLE 12-4 | 30 | 50 | 20 | 29.9 | 49.8 | 19.8 | 20 | 10 | 10 | 60 | 86 |
| EXAMPLE 13-7 | 30 | 50 | 20 | 29.9 | 49.8 | 19.8 | 20 | 20 | 0 | 60 | 86 |
| EXAMPLE 13-8 | 30 | 50 | 20 | 29.9 | 49.8 | 19.8 | 25 | 5 | 10 | 60 | 87 |
| EXAMPLE 13-9 | 30 | 50 | 20 | 29.9 | 49.8 | 19.8 | 30 | 0 | 10 | 60 | 88 |
| EXAMPLE 13-10 | 30 | 50 | 20 | 29.9 | 49.8 | 19.8 | 30 | 10 | 0 | 60 | 89 |
| EXAMPLE 13-11 | 30 | 50 | 20 | 29.9 | 49.8 | 19.8 | 35 | 0 | 5 | 60 | 89 |
| EXAMPLE 13-12 | 30 | 50 | 20 | 29.9 | 49.8 | 19.8 | 40 | 0 | 0 | 60 | 92 |
| EXAMPLE 13-13 | 30 | 50 | 20 | 29.9 | 49.8 | 19.8 | 50 | 0 | 0 | 50 | 89 |
| EXAMPLE 13-14 | 30 | 50 | 20 | 29.9 | 49.8 | 19.8 | 60 | 0 | 0 | 40 | 86 |
| EXAMPLE 13-15 | 30 | 50 | 20 | 29.9 | 49.8 | 19.8 | 65 | 0 | 0 | 35 | 83 |
| EXAMPLE 13-16 | 30 | 50 | 20 | 29.9 | 49.8 | 19.8 | 70 | 0 | 0 | 30 | 79 |
| EXAMPLE 13-17 | 30 | 50 | 20 | 29.9 | 49.8 | 19.8 | 80 | 0 | 0 | 20 | 72 |
| EXAMPLE 13-18 | 30 | 50 | 20 | 29.9 | 49.8 | 19.8 | 90 | 0 | 0 | 10 | 50 |

EC: ethylene carbonate
PC: propylene carbonate
DMC: dimethyl carbonate
FEC: 4-fluoro-1,3-dioxolane-2-one $$\frac{Co}{Sn + Co} = 37.5 \text{ wt \%}$$

It was obvious from Table 14 that as the content of 4-fluoro-1,3-dioxolane-2-one increased, the capacity retention ratio increased to a maximum value, then decreased.

In other words, it was found out that when 4-fluoro-1,3-dioxolane-2-one was included, the cycle characteristics could be improved irrespective of the composition of the solvent, were used in Example 14-1, Example 14-2, Example 14-3, Example 14-4, Example 14-5 and Example 14-6, respectively.

The cycle characteristics of the secondary batteries of Examples 14-1 through 14-6 were measured as in the case of Examples 1-1 through 1-7. The results are shown in Table 15.

TABLE 15

| | MATERIAL RATIO (WT %) | | | ANALYTICAL VALUE (WT %) | | | | CAPACITY RETENTION RATIO |
|---|---|---|---|---|---|---|---|---|
| | Co | Sn | C | Co | Sn | C | SOLVENT | (%) |
| EXAMPLE 12-1 | 30 | 50 | 20 | 29.9 | 49.8 | 19.8 | EC + PC + DMC | 70 |
| EXAMPLE 12-4 | 30 | 50 | 20 | 29.9 | 49.8 | 19.8 | FEC + EC + PC + DMC | 86 |
| EXAMPLE 14-1 | 30 | 50 | 20 | 29.9 | 49.8 | 19.8 | DFEC + EC + PC + DMC | 78 |
| EXAMPLE 14-2 | 30 | 50 | 20 | 29.9 | 49.8 | 19.8 | Tri-FEC + EC + PC + DMC | 74 |
| EXAMPLE 14-3 | 30 | 50 | 20 | 29.9 | 49.8 | 19.8 | Cl-EC + EC + PC + DMC | 79 |
| EXAMPLE 14-4 | 30 | 50 | 20 | 29.9 | 49.8 | 19.8 | Br-EC + EC + PC + DMC | 75 |

TABLE 15-continued

| | MATERIAL RATIO (WT %) | | | ANALYTICAL VALUE (WT %) | | | | CAPACITY RETENTION RATIO |
|---|---|---|---|---|---|---|---|---|
| | Co | Sn | C | Co | Sn | C | SOLVENT | (%) |
| EXAMPLE 14-5 | 30 | 50 | 20 | 29.9 | 49.8 | 19.8 | I-EC + EC + PC + DMC | 74 |
| EXAMPLE 14-6 | 30 | 50 | 20 | 29.9 | 49.8 | 19.8 | F-PC + EC + PC + DMC | 80 |

EC: ethylene carbonate
PC: propylene carbonate
DMC: dimethyl carbonate
FEC: 4-fluoro-1,3-dioxolane-2-one
F-PC: 4-fluoromethyl-1,3-dioxolane-2-one
DFEC: 4-difluoro-1,3-dioxolane-2-one
Tri-FEC: 4-difluoro-5-fluoro-1,3-dioxolane-2-one
Cl-EC: 4-chloro-1,3-dioxolane-2-one
Br-EC: 4-bromo-1,3-dioxolane-2-one
I-EC: 4-iodo-1,3-dioxolane-2-one $\frac{Co}{Sn+Co} = 37.5 \text{ wt }\%$ It was obvious from Table 15 that even if another derivative of a cyclic carbonate including a halogen atom was used, the cycle characteristics could be improved as in the case of Example 12-4. However, the capacity retention ratio was specifically high in Example 12-4 in which 4-fluoro-1,3-dioxolane-2-one was used. In other words, it was found out that when a derivative of a cyclic carbonate including a halogen atom was included, the cycle characteristics could be improved, and when 4-fluoro-1,3-dioxolane-2-one was included as the derivative, it is specifically effective at improving the cycle characteristics.

Examples 15-1 Through 15-7

Coin type secondary batteries were formed as in the case of Examples 1-1 through 1-7, except that instead of the liquid electrolyte solution, an electrolyte layer made of a gel electrolyte was formed on the surfaces of the test electrode 61 an the counter electrode 63. In other words, anode active materials synthesized through mixing cobalt, tin and carbon at the same material ratios as those in Examples 1-1 through 1-7 as shown in Table 16 were used for the test electrode 61. Moreover, the electrolyte layer was formed through the following steps. At first, a copolymer of vinylidene fluoride and hexafluoropropylene as a high molecular weight compound, and diethyl carbonate as a mixed solvent were mixed to an electrolyte solution formed through mixing ethylene carbonate and propylene carbonate as solvents and $LiPF_6$ as the electrolyte salt at a mass ratio of ethylene carbonate:propylene carbonate:$LiPF_6$=11.5:11.5:4 so as to have a mass ratio of the electrolyte solution:the high molecular weight compound:the mixed solvent=27:10:60, thereby a precursor solution was formed. The molecular weight of the copolymer of vinylidene fluoride and hexafluoropropylene was 600000. The obtained precursor solution was uniformly applied to the facing surfaces of the test electrode 61 and the counter electrode 63, and they were left for 6 hours at a room temperature to volatilize diethyl carbonate, thereby the gel electrolyte layer was formed.

The initial charge capacities of the coin type secondary batteries were measured as in the case of Examples 1-1 through 1-7. The results are shown in Table 16 and FIG. 15.

TABLE 16

| | MATERIAL RATIO (WT %) | | | ANALYTICAL VALUE (WT %) | | | HALF-WIDTH | INITIAL CHARGE CAPACITY | DISCHARGE CAPACITY IN SECOND CYCLE | DISCHARGE CAPACITY IN 300TH CYCLE | CAPACITY RETENTION RATIO |
|---|---|---|---|---|---|---|---|---|---|---|---|
| | Co | Sn | C | Co | Sn | Co | (°) | (mAh/cm³) | (mAh/cm³) | (mAh/cm³) | (%) |
| EXAMPLE 15-1 | 33.3 | 56.7 | 10 | 33.0 | 56.1 | 9.9 | 3.5 | 475 | 98 | 58 | 59 |
| EXAMPLE 15-2 | 32.6 | 55.4 | 12 | 32.2 | 54.9 | 11.9 | 3.8 | 481 | 102 | 62 | 61 |
| EXAMPLE 15-3 | 31.5 | 53.6 | 15 | 31.1 | 53.0 | 14.9 | 4.3 | 490 | 105 | 66 | 63 |
| EXAMPLE 15-4 | 30.7 | 52.3 | 17 | 30.4 | 51.8 | 16.8 | 4.5 | 495 | 108 | 72 | 67 |
| EXAMPLE 15-5 | 29.6 | 50.4 | 20 | 29.3 | 49.9 | 19.8 | 4.8 | 500 | 112 | 80 | 71 |
| EXAMPLE 15-6 | 27.8 | 47.3 | 25 | 27.5 | 46.8 | 24.8 | 5.1 | 501 | 113 | 78 | 69 |
| EXAMPLE 15-7 | 25.9 | 44.1 | 30 | 25.6 | 43.7 | 29.7 | 5.4 | 485 | 100 | 60 | 60 |
| COMPARATIVE EXAMPLE 15-1 | 37.0 | 63.0 | 0 | 36.6 | 62.4 | 0 | 0.2 | 432 | 78 | 0 | 0 |
| COMPARATIVE EXAMPLE 15-2 | 36.6 | 62.4 | 1.0 | 36.3 | 61.7 | 1.0 | 0.5 | 434 | 80 | 0 | 0 |
| COMPARATIVE EXAMPLE 15-3 | 35.2 | 59.9 | 5.0 | 34.8 | 59.3 | 5.0 | 2.0 | 455 | 91 | 0 | 0 |
| COMPARATIVE EXAMPLE 15-4 | 34.0 | 58.0 | 8.0 | 33.7 | 57.4 | 7.9 | 3.0 | 469 | 94 | 15 | 16 |
| COMPARATIVE EXAMPLE 15-5 | 22.2 | 37.8 | 40 | 22.0 | 37.4 | 39.6 | 5.5 | 440 | 81 | 32 | 40 |

TABLE 16-continued

| | MATERIAL RATIO (WT %) | | | ANALYTICAL VALUE (WT %) | | | HALF-WIDTH (°) | INITIAL CHARGE CAPACITY (mAh/cm³) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|
| | Co | Sn | C | Co | Sn | Co | | | | | |
| COMPARATIVE EXAMPLE 15-6 | 18.5 | 31.5 | 50 | 18.3 | 31.2 | 49.5 | 5.5 | 394 | 72 | 25 | 35 |
| COMPARATIVE EXAMPLE 15-7 | 16.7 | 28.4 | 55 | 16.5 | 28.1 | 54.5 | 5.5 | 363 | 61 | 17 | 28 |

$\frac{Co}{Sn+Co} = 37$ wt %

Moreover, secondary batteries shown in FIGS. 3 and 4 were formed. At first, the cathode 33 and the anode 34 were formed as in the case of Examples 1-1 through 1-7, and the cathode lead 31 and the anode lead 32 were attached.

Next, the above-described precursor solution was uniformly applied to the cathode 33 and the anode 32, and they were left for 6 hours at a room temperature to volatilize diethyl carbonate, thereby the gel electrolyte layer 36 was formed.

After that, the cathode 33 and the anode 34 were laminated with the separator 35 in between so that the surfaces of the cathode 33 and the anode 34 on which the electrolyte layer 36 was formed faced each other, thereby a laminate was formed, and the laminate was spirally wound to form the spirally wound electrode body 30.

The obtained spirally wound electrode body 30 was vacuum-sealed in the package members 40 made of a dampproof aluminum laminate film so as to form the secondary batteries shown in FIGS. 3 and 4.

The cycle characteristics of the secondary batteries were measured as in the case of Examples 1-1 through 1-7. The results are shown in Table 16 and FIG. 15.

As Comparative Examples 15-1 through 15-7 relative to Examples 15-1 through 15-7, secondary batteries were formed as in the case of Examples 15-1 through 15-7, except that anode active materials synthesized through mixing cobalt, tin and carbon at a material ratio shown in Table 16, that is, anode active materials synthesized as in the case of Comparative Examples 1-1 through 1-7 were used.

The initial charge capacities and the cycle characteristics of the obtained secondary batteries of Comparative Examples 15-1 through 15-7 were measured. The results are shown in Table 16 and FIG. 15.

Figure 15:
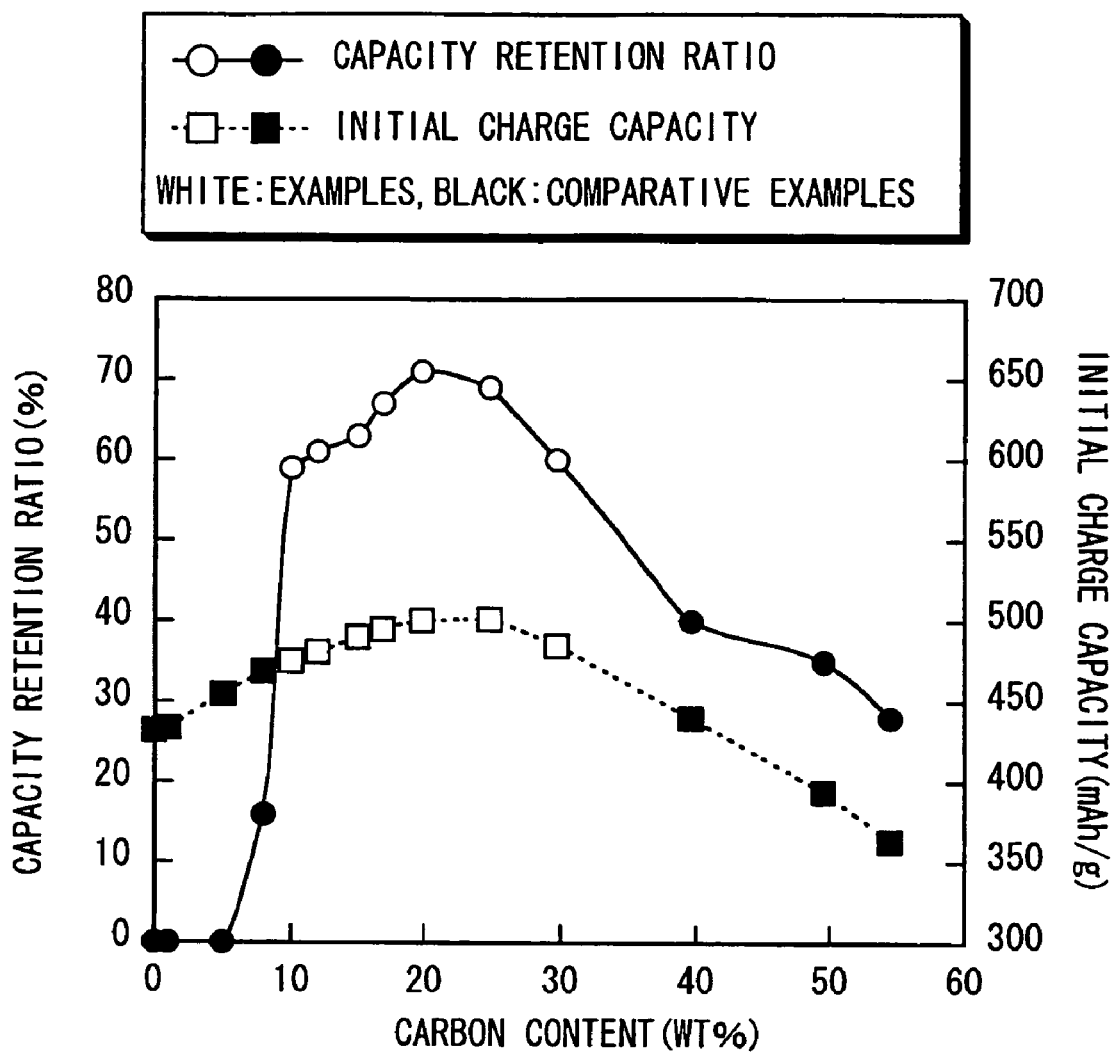
FIG. 15 is another plot showing a relationship between the carbon content in an anode active material, a capacity retention ratio and an initial charge capacity.

It was obvious from Table 16 and FIG. 15 that the same results as those in Examples 1-1 through 1-7 were obtained. In other words, it was found out that even if the gel electrolyte was used, in the case where the carbon content was within a range from 9.9 wt % to 29.7 wt % inclusive, the capacity and the cycle characteristics could be improved, and the carbon content was more preferably within a range from 14.9 wt % to 29.7 wt % inclusive, and more preferably within a range from 16.8 wt % to 24.8 wt % inclusive.

Examples 16-1 Through 16-9, 17-1 Through 17-9 and 18-1 Through 18-9

As Examples 16-1 through 16-9, secondary batteries were formed as in the case of Examples 15-1 through 15-9, except that as shown in Table 17, anode active materials in which the material ratio of carbon was fixed to 10 wt %, and the Co/(Sn+Co) ratio was changed within a range from 30 wt % to 70 wt % inclusive, that is, anode active materials synthesized as in the case of Examples 2-1 through 2-9 were used. Moreover, as Comparative Examples 16-1 through 16-4 relative to Examples 16-1 through 16-9, secondary batteries were formed as in the case of Examples 16-1 through 16-9, except that as shown in Table 17, anode active materials in which the material ratio of carbon was fixed to 10 wt %, and the Co/(Sn+Co) ratio was 28 wt %, 25 wt %, 20 wt % and 75 wt %, that is, anode active materials synthesized as in the case of Comparative Examples 2-1 through 2-4 was used.

TABLE 17

| | MATERIAL RATIO (WT %) | | | ANALYTICAL VALUE (WT %) | | | $\frac{Co}{Sn+Co}$ | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|
| | Co | Sn | C | Co | Sn | C | | | | | | |
| EXAMPLE 16-1 | 63.0 | 27.0 | 10.0 | 62.4 | 26.7 | 9.9 | 70 | 3.8 | 350 | 78 | 57 | 73 |
| EXAMPLE 16-2 | 58.5 | 31.5 | 10.0 | 57.9 | 31.2 | 9.9 | 65 | 3.8 | 365 | 81 | 58 | 72 |
| EXAMPLE 16-3 | 54.0 | 36.0 | 10.0 | 53.5 | 35.6 | 9.9 | 60 | 3.7 | 382 | 83 | 59 | 71 |
| EXAMPLE 16-4 | 49.5 | 40.5 | 10.0 | 49.0 | 40.1 | 9.9 | 55 | 3.7 | 401 | 85 | 60 | 70 |
| EXAMPLE 16-5 | 45.0 | 45.0 | 10.0 | 44.6 | 44.6 | 9.9 | 50 | 3.6 | 429 | 87 | 57 | 66 |
| EXAMPLE 16-6 | 40.5 | 49.5 | 10.0 | 40.1 | 49.0 | 9.9 | 45 | 3.6 | 458 | 91 | 57 | 63 |
| EXAMPLE 16-7 | 36.0 | 54.0 | 10.0 | 35.6 | 53.5 | 9.9 | 40 | 3.5 | 466 | 95 | 58 | 61 |
| EXAMPLE 15-1 | 33.3 | 56.7 | 10.0 | 33.0 | 56.1 | 9.9 | 37 | 3.5 | 475 | 98 | 58 | 59 |
| EXAMPLE 16-8 | 29.7 | 60.3 | 10.0 | 29.4 | 59.7 | 9.9 | 33 | 3.4 | 504 | 97 | 56 | 58 |
| EXAMPLE 16-9 | 27.0 | 63.0 | 10.0 | 26.7 | 62.4 | 9.9 | 30 | 3.3 | 532 | 97 | 54 | 56 |
| COMPARATIVE EXAMPLE 16-1 | 25.2 | 64.8 | 10.0 | 24.9 | 64.2 | 9.9 | 28 | 3.2 | 538 | 96 | 16 | 17 |

TABLE 17-continued

| | MATERIAL RATIO (WT %) | | | ANALYTICAL VALUE (WT %) | | | Co/Sn + Co | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|
| | Co | Sn | C | Co | Sn | C | | | | | | |
| COMPARATIVE EXAMPLE 16-2 | 22.5 | 67.5 | 10.0 | 22.3 | 66.8 | 9.9 | 25 | 3.0 | 545 | 93 | 0 | 0 |
| COMPARATIVE EXAMPLE 16-3 | 18.0 | 72.0 | 10.0 | 17.8 | 71.3 | 9.9 | 20 | 2.8 | 561 | 88 | 0 | 0 |
| COMPARATIVE EXAMPLE 16-4 | 67.5 | 22.5 | 10.0 | 66.8 | 22.3 | 9.9 | 75 | 3.8 | 271 | 62 | 45 | 73 |

Figure 18:
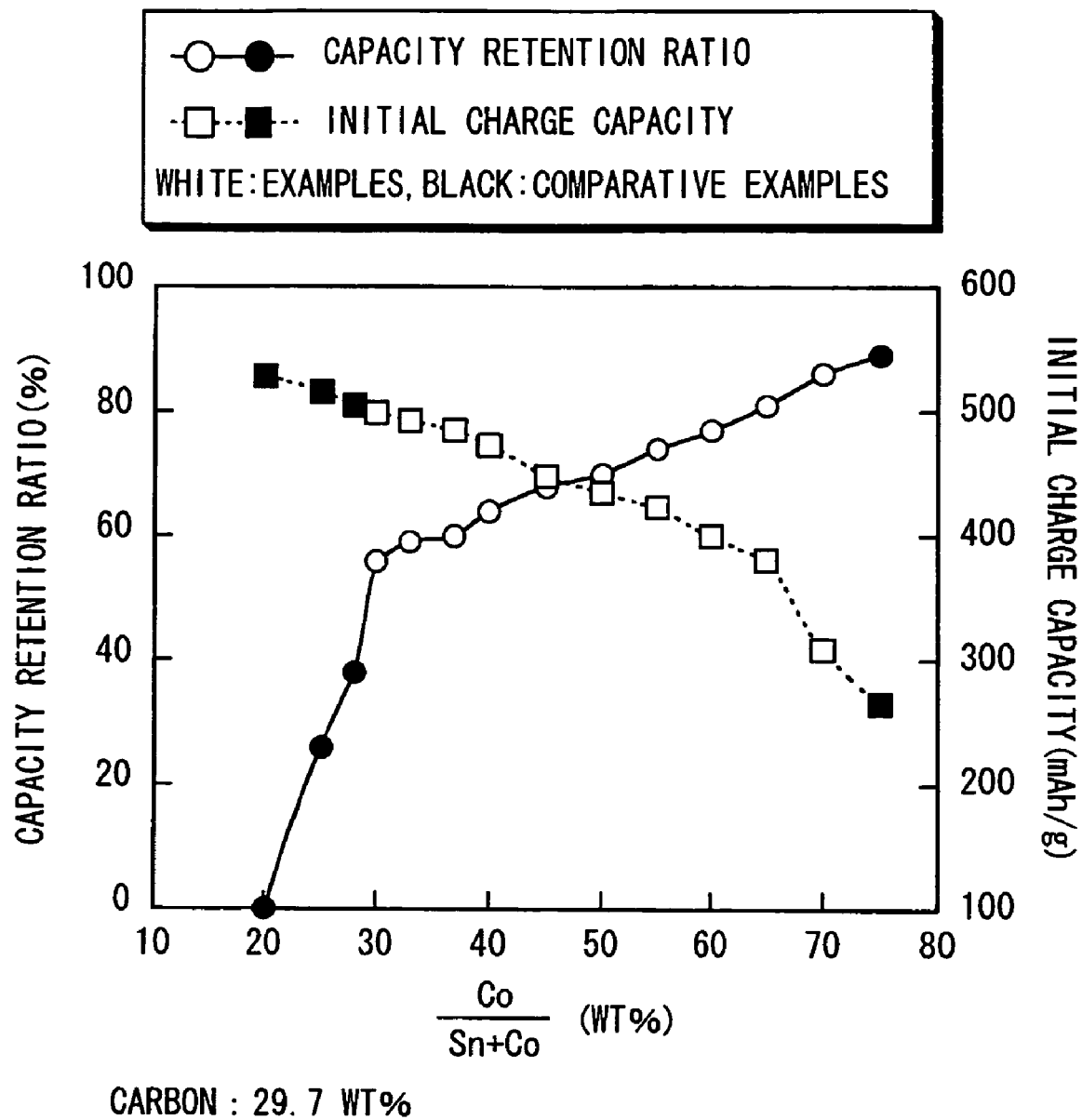
FIG. 18 is another plot showing a relationship between the ratio of cobalt to the total of tin and cobalt in an anode active material, a capacity retention ratio and an initial charge capacity.

As Examples 17-1 through 17-9, secondary batteries were formed as in the case of Examples 15-1 through 15-9, except that as shown in FIG. 18, anode active materials in which the material ratio of carbon was fixed to 20 wt %, and the Co/(Sn+Co) ratio was changed within a range from 30 wt % to 70 wt % inclusive, that is, anode active materials synthesized as in the case of Examples 3-1 through 3-9 was used. Moreover, as Comparative Examples 17-1 through 17-4 relative to Examples 17-1 through 17-9, secondary batteries were formed as in the case of Examples 17-1 through 17-9, except that as shown in Table 18, anode active materials in which the material ratio of carbon was fixed to 20 wt %, and the Co/(Sn+Co) ratio was 28 wt %, 20 wt % and 75 wt %, that is, anode active materials synthesized as in the case of Comparative Examples 3-1 through 3-4 were used.

As Examples 18-1 through 18-9, secondary batteries were formed as in the case of Examples 15-1 through 15-9, except that as shown in Table 19, anode active materials in which the material ratio of carbon was fixed to 30 wt %, and the Co/(Sn+Co) ratio was changed within a range from 30 wt % to 70 wt % inclusive, that is, anode active materials synthesized as in the case of Examples 4-1 through 4-9 were used. Moreover, as Comparative Examples 18-1 through 18-4 relative to Examples 18-1 through 19-9, secondary batteries were formed as in the case of Examples 18-1 through 18-9, except that as shown in Table 19, anode active materials in which the material ratio of carbon was fixed to 30 wt %, and the Co/(Sn+Co) ratio was 28 wt %, 25 wt %, 20 wt % and 75 wt %, that is, anode active materials synthesized as in the case of Comparative Examples 4-1 through 4-4 were used.

TABLE 18

| | MATERIAL RATIO (WT %) | | | ANALYTICAL VALUE (WT %) | | | Co/Sn + Co | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|
| | Co | Sn | C | Co | Sn | C | | | | | | |
| EXAMPLE 17-1 | 56.0 | 24.0 | 20.0 | 55.4 | 23.8 | 19.8 | 70 | 5.0 | 351 | 78 | 67 | 85 |
| EXAMPLE 17-2 | 52.0 | 28.0 | 20.0 | 51.5 | 27.7 | 19.8 | 65 | 5.0 | 362 | 80 | 67 | 84 |
| EXAMPLE 17-3 | 48.0 | 32.0 | 20.0 | 47.5 | 31.7 | 19.8 | 60 | 4.9 | 382 | 85 | 70 | 83 |
| EXAMPLE 17-4 | 44.0 | 36.0 | 20.0 | 43.6 | 35.6 | 19.8 | 55 | 4.9 | 405 | 90 | 73 | 81 |
| EXAMPLE 17-5 | 40.0 | 40.0 | 20.0 | 39.6 | 39.6 | 19.8 | 50 | 4.9 | 428 | 94 | 75 | 79 |
| EXAMPLE 17-6 | 36.0 | 44.0 | 20.0 | 35.6 | 43.6 | 19.8 | 45 | 4.8 | 456 | 102 | 76 | 74 |
| EXAMPLE 17-7 | 32.0 | 48.0 | 20.0 | 31.7 | 47.5 | 19.8 | 40 | 4.8 | 481 | 106 | 76 | 71 |
| EXAMPLE 15-5 | 29.6 | 50.4 | 20.0 | 29.3 | 49.9 | 19.8 | 37 | 4.8 | 500 | 112 | 80 | 71 |
| EXAMPLE 17-8 | 26.4 | 53.6 | 20.0 | 26.1 | 53.1 | 19.8 | 33 | 4.6 | 518 | 112 | 75 | 67 |
| EXAMPLE 17-9 | 24.0 | 56.0 | 20.0 | 23.8 | 55.4 | 19.8 | 30 | 4.5 | 534 | 117 | 70 | 60 |
| COMPARATIVE EXAMPLE 17-1 | 22.4 | 57.6 | 20.0 | 22.2 | 57.0 | 19.8 | 28 | 4.4 | 539 | 111 | 37 | 33 |
| COMPARATIVE EXAMPLE 17-2 | 20.0 | 60.0 | 20.0 | 19.8 | 59.4 | 19.8 | 25 | 4.2 | 548 | 106 | 22 | 21 |
| COMPARATIVE EXAMPLE 17-3 | 16.0 | 64.0 | 20.0 | 15.8 | 63.4 | 19.8 | 20 | 4.0 | 558 | 97 | 0 | 0 |
| COMPARATIVE EXAMPLE 17-4 | 60.0 | 20.0 | 20.0 | 59.4 | 19.8 | 19.8 | 75 | 5.0 | 248 | 45 | 38 | 85 |

TABLE 19

| | MATERIAL RATIO (WT %) | | | ANALYTICAL VALUE (WT %) | | | Co/Sn + Co | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|
| | Co | Sn | C | Co | Sn | C | | | | | | |
| EXAMPLE 18-1 | 49.0 | 21.0 | 30.0 | 48.5 | 20.8 | 29.7 | 70 | 6.0 | 309 | 66 | 57 | 86 |
| EXAMPLE 18-2 | 45.5 | 24.5 | 30.0 | 45.0 | 24.3 | 29.7 | 65 | 5.9 | 381 | 85 | 69 | 81 |
| EXAMPLE 18-3 | 42.0 | 28.0 | 30.0 | 41.6 | 27.7 | 29.7 | 60 | 5.8 | 400 | 89 | 69 | 77 |
| EXAMPLE 18-4 | 38.5 | 31.5 | 30.0 | 38.1 | 31.2 | 29.7 | 55 | 5.7 | 423 | 94 | 70 | 74 |
| EXAMPLE 18-5 | 35.0 | 35.0 | 30.0 | 34.7 | 34.7 | 29.7 | 50 | 5.6 | 435 | 97 | 68 | 70 |
| EXAMPLE 18-6 | 31.5 | 38.5 | 30.0 | 31.2 | 38.1 | 29.7 | 45 | 5.5 | 448 | 98 | 67 | 68 |
| EXAMPLE 18-7 | 28.0 | 42.0 | 30.0 | 27.7 | 41.6 | 29.7 | 40 | 5.5 | 473 | 99 | 63 | 64 |

TABLE 19-continued

| | MATERIAL RATIO (WT %) | | | ANALYTICAL VALUE (WT %) | | | Co / Sn + Co | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|
| | Co | Sn | C | Co | Sn | C | | | | | | |
| EXAMPLE 15-7 | 25.9 | 44.1 | 30.0 | 25.6 | 43.7 | 29.7 | 37 | 5.4 | 485 | 100 | 60 | 60 |
| EXAMPLE 18-8 | 23.1 | 46.9 | 30.0 | 22.9 | 46.4 | 29.7 | 33 | 5.4 | 493 | 102 | 60 | 59 |
| EXAMPLE 18-9 | 21.0 | 49.0 | 30.0 | 20.8 | 48.5 | 29.7 | 30 | 5.3 | 499 | 103 | 58 | 56 |
| COMPARATIVE EXAMPLE 18-1 | 19.6 | 50.4 | 30.0 | 19.4 | 49.9 | 29.7 | 28 | 5.2 | 505 | 101 | 38 | 38 |
| COMPARATIVE EXAMPLE 18-2 | 17.5 | 52.5 | 30.0 | 17.3 | 52.0 | 29.7 | 25 | 5.1 | 516 | 94 | 24 | 26 |
| COMPARATIVE EXAMPLE 18-3 | 14.0 | 56.0 | 30.0 | 13.9 | 55.4 | 29.7 | 20 | 5.0 | 528 | 85 | 0 | 0 |
| COMPARATIVE EXAMPLE 18-4 | 52.5 | 17.5 | 30.0 | 52.0 | 17.3 | 29.7 | 75 | 6.1 | 265 | 54 | 48 | 89 |

The initial capacities and the cycle characteristics of the obtained secondary batteries of Examples 16-1 through 16-9, 17-1 through 17-9 and 18-1 through 18-9 and Comparative Examples 16-1 through 16-4, 17-1 through 17-4 and 18-1 through 18-4 were measured as in the case of Examples 1-1 through 1-7. The results are shown in Tables 17 through 19 and FIGS. 16 through 18.

Figure 16:
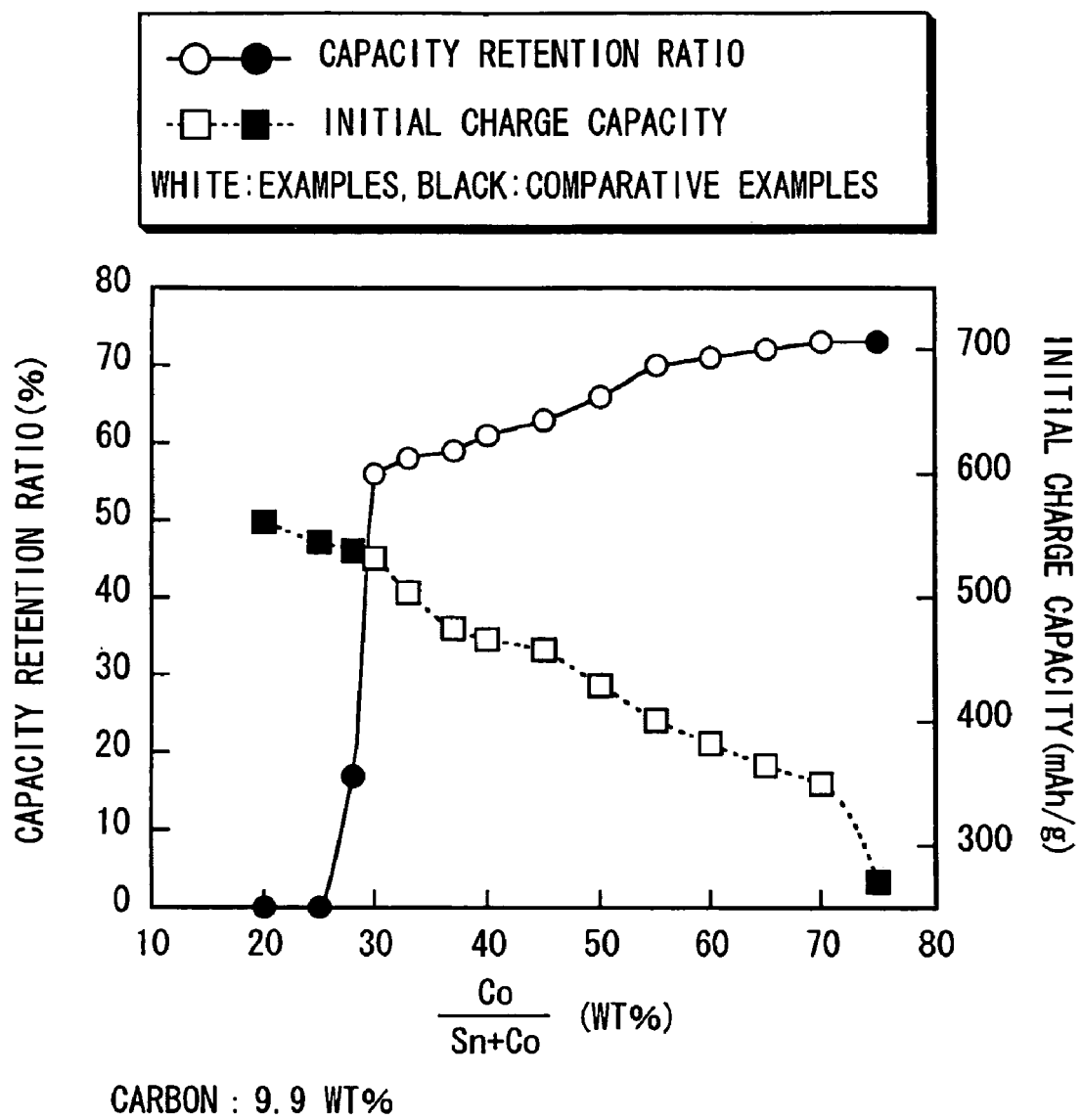
FIG. 16 is another plot showing a relationship between the ratio of cobalt to the total of tin and cobalt in an anode active material, a capacity retention ratio and an initial charge capacity.
Figure 17:
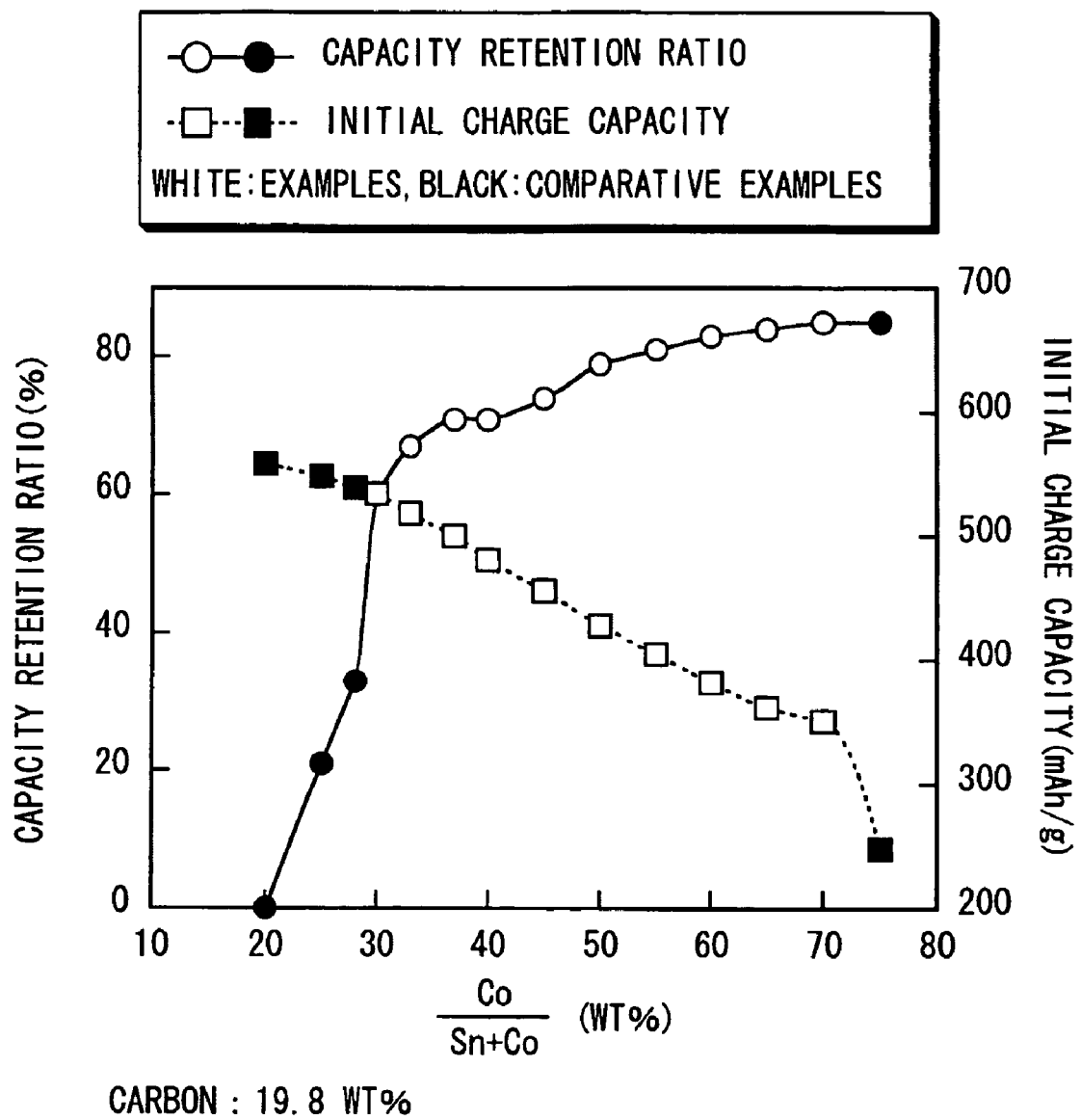
FIG. 17 is another plot showing a relationship between the ratio of cobalt to the total of tin and cobalt in an anode active material, a capacity retention ratio and an initial charge capacity.

It was obvious from Tables 17 through 19 and FIGS. 16 through 18 that the same results as those in Examples 2-1 through 2-9, 3-1 through 3-9 and 4-1 through 4-9 were obtained. In other words, it was found out that in the case where the Co/(Sn+Co) ratio was within a range from 30 wt % to 70 wt % inclusive, even if the gel electrolyte was used, the capacity and the cycle characteristics could be improved. Moreover, it was found out that the Co/(Sn+Co) ratio was more preferably 60 wt % or less.

Examples 19-1 Through 19-11

Secondary batteries were formed as in the case of Examples 15-1 through 15-9, except that as shown in Table 20, anode active materials in which the material ratio of silicon powder was changed within a range from 0.3 wt % to 10 wt % inclusive, and the Co/(Sn+Co) ratio and the material ratio of carbon was fixed, that is, anode active materials synthesized as in the case of Examples 7-1 through 7-11 were used.

The initial charge capacities and the cycle characteristics of the secondary batteries of Examples 19-1 through 19-11 were measured as in the case of Examples 1-1 through 1-9. The results are shown in Table 21.

TABLE 20

| | MATERIAL RATIO (WT %) | | | | | ANALYTICAL VALUE (WT %) | | | | |
|---|---|---|---|---|---|---|---|---|---|---|
| | Co | Sn | C | Si | Sn + Si | Co | Sn | C | Si | Sn + Si |
| EXAMPLE 15-5 | 29.6 | 50.4 | 20.0 | 0 | 50.4 | 29.3 | 49.9 | 19.8 | 0 | 49.9 |
| EXAMPLE 19-1 | 29.5 | 50.2 | 20.0 | 0.3 | 60.5 | 29.2 | 49.7 | 19.8 | 0.3 | 50.0 |
| EXAMPLE 19-2 | 29.4 | 50.1 | 20.0 | 0.5 | 50.6 | 29.1 | 49.6 | 19.8 | 0.5 | 50.1 |
| EXAMPLE 19-3 | 29.2 | 49.8 | 20.0 | 1.0 | 50.8 | 28.9 | 49.3 | 19.8 | 1.0 | 50.3 |
| EXAMPLE 19-4 | 28.9 | 49.1 | 20.0 | 2.0 | 51.1 | 28.6 | 48.6 | 19.8 | 2.0 | 50.6 |
| EXAMPLE 19-5 | 28.1 | 47.9 | 20.0 | 4.0 | 51.9 | 27.8 | 47.4 | 19.8 | 4.0 | 51.4 |
| EXAMPLE 19-6 | 27.4 | 46.6 | 20.0 | 6.0 | 52.6 | 27.1 | 46.2 | 19.8 | 5.9 | 52.1 |
| EXAMPLE 19-7 | 27.0 | 46.0 | 20.0 | 7.0 | 53.0 | 26.7 | 45.5 | 19.8 | 6.9 | 52.5 |
| EXAMPLE 19-8 | 26.6 | 45.4 | 20.0 | 8.0 | 53.4 | 26.4 | 44.9 | 19.8 | 7.9 | 52.8 |
| EXAMPLE 19-9 | 26.5 | 45.0 | 20.0 | 8.5 | 53.5 | 26.2 | 44.6 | 19.8 | 8.4 | 53.0 |
| EXAMPLE 19-10 | 26.3 | 44.7 | 20.0 | 9.0 | 53.7 | 26.0 | 44.3 | 19.8 | 8.9 | 53.2 |
| EXAMPLE 19-11 | 25.9 | 44.1 | 20.0 | 10 | 54.1 | 25.6 | 43.7 | 19.8 | 9.9 | 53.6 |

$$\frac{Co}{Sn + Co} = 37 \text{ wt \%}$$

TABLE 21

| | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|
| EXAMPLE 15-5 | 500 | 112 | 80 | 71 |
| EXAMPLE 19-1 | 501 | 112 | 80 | 71 |

TABLE 21-continued

|  | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|
| EXAMPLE 19-2 | 504 | 113 | 78 | 69 |
| EXAMPLE 19-3 | 523 | 116 | 79 | 68 |
| EXAMPLE 19-4 | 532 | 118 | 78 | 66 |
| EXAMPLE 19-5 | 546 | 119 | 75 | 63 |
| EXAMPLE 19-6 | 561 | 122 | 75 | 62 |
| EXAMPLE 19-7 | 580 | 126 | 75 | 60 |
| EXAMPLE 19-8 | 591 | 127 | 69 | 54 |
| EXAMPLE 19-9 | 608 | 127 | 48 | 38 |
| EXAMPLE 19-10 | 630 | 129 | 27 | 21 |
| EXAMPLE 19-11 | 658 | 131 | 14 | 11 |

$\frac{Co}{Sn+Co} = 37$ wt %

It was obvious from Table 21 that the same results as those in Examples 7-1 through 7-11 were obtained. In other words, it was found out that even if the gel electrolyte was used, when the anode active material included silicon, the capacity could be improved, and the silicon content was preferably within a range from 0.5 wt % to 7.9 wt % inclusive.

Examples 20-1 Through 20-10

Secondary batteries were formed as in the case of Examples 15-1 through 15-9, except that as shown in Table 22, anode active materials in which the material ratio of titanium was changed within a range from 0 wt % to 16 wt % inclusive, and the Co/(Sn+Co) ratio and the material ratio of carbon were fixed, that is, anode active materials synthesized as in the case of Examples 8-1 through 8-10 were used.

was used, when titanium was included in the anode active material within a range of 14.9 wt % or less, the cycle characteristics could be further improved, and the titanium content was more preferably within a range of 2.4 wt % or more, and more preferably within a range from 4.0 wt % to 12.9 wt % inclusive.

Examples 21-1 Through 21-8

Secondary batteries were formed as in the case of Examples 15-1 through 15-9, except that as shown in Table 23, anode active materials in which the material ratio of titanium and indium was changed within a range from 0 wt %

TABLE 22

|  | MATERIAL RATIO (WT %) | | | | ANALYTICAL VALUE (WT %) | | | | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|
|  | Co | Sn | C | Ti | Co | Sn | C | Ti |  |  |  |  |
| EXAMPLE 20-1 | 28.0 | 52.0 | 20 | 0 | 27.7 | 51.5 | 19.8 | 0 | 501 | 111 | 77 | 69 |
| EXAMPLE 20-2 | 27.6 | 51.2 | 20 | 1.2 | 27.3 | 50.7 | 19.8 | 1.2 | 514 | 113 | 81 | 72 |
| EXAMPLE 20-3 | 27.2 | 50.4 | 20 | 2.4 | 26.9 | 49.9 | 19.8 | 2.4 | 525 | 117 | 95 | 81 |
| EXAMPLE 20-4 | 26.6 | 49.4 | 20 | 4.0 | 26.3 | 48.9 | 19.8 | 4.0 | 534 | 118 | 98 | 83 |
| EXAMPLE 20-5 | 26.2 | 48.7 | 20 | 5.1 | 26.0 | 48.2 | 19.8 | 5.0 | 548 | 119 | 100 | 84 |
| EXAMPLE 20-6 | 25.4 | 47.1 | 20 | 7.5 | 25.1 | 46.7 | 19.8 | 7.4 | 547 | 119 | 101 | 85 |
| EXAMPLE 20-7 | 24.5 | 45.5 | 20 | 10.0 | 24.3 | 45.0 | 19.8 | 9.9 | 543 | 119 | 101 | 85 |
| EXAMPLE 20-8 | 23.5 | 43.6 | 20 | 13.0 | 23.2 | 43.1 | 19.8 | 12.9 | 539 | 118 | 99 | 84 |
| EXAMPLE 20-9 | 22.8 | 42.3 | 20 | 15.0 | 22.5 | 41.8 | 19.8 | 14.9 | 516 | 113 | 88 | 78 |
| EXAMPLE 20-10 | 22.4 | 41.6 | 20 | 16.0 | 22.2 | 41.2 | 19.8 | 15.8 | 479 | 104 | 72 | 69 |

$\frac{Co}{Sn+Co} = 35$ wt %

The initial charge capacities and the cycle characteristics of the obtained secondary batteries of Examples 20-1 through 20-10 were measured as in the case of Examples 1-1 through 1-7. The results are shown in Table 22 and FIG. 19.

Figure 19:
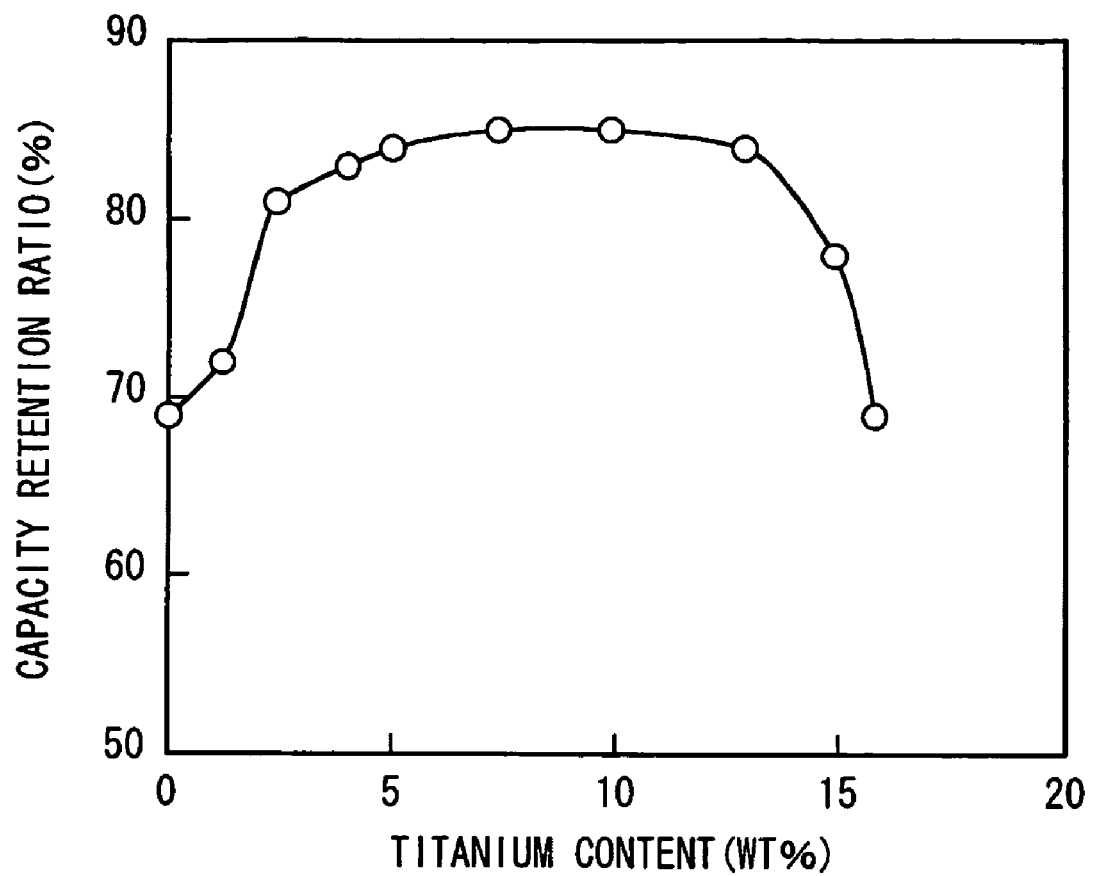
FIG. 19 is another plot showing a relationship between the titanium content in an anode active material and a capacity retention ratio.

It was obvious from Table 22 and FIG. 19 that the same results as those in Examples 8-1 through 8-10 were obtained. In other words, it was found out that even if the gel electrolyte to 10 wt % inclusive, and the Co/(Sn+Co) ratio and the material ratio of carbon and silicon were fixed, that is, anode active materials synthesized as in the case of Examples 11-1 through 11-8 were used.

The initial charge capacities and the cycle characteristics of the obtained secondary batteries of Examples 21-1 through 21-8 were measured as in the case of Examples 1-1 through 1-7. The results are shown in Table 24.

TABLE 23

| | MATERIAL RATIO (WT %) | | | | | | ANALYTICAL VALUE (WT%) | | | | | |
|---|---|---|---|---|---|---|---|---|---|---|---|---|
| | Co | Sn | C | Si | Ti | In | Co | Sn | C | Si | Ti | In |
| EXAMPLE 20-1 | 28.0 | 52.0 | 20.0 | — | — | — | 27.7 | 51.5 | 19.8 | — | — | — |
| EXAMPLE 21-1 | 27.7 | 51.4 | 18.0 | 3.0 | — | — | 27.4 | 50.8 | 17.8 | 3.0 | — | — |
| EXAMPLE 21-2 | 26.3 | 48.8 | 18.0 | 3.0 | 4.0 | — | 26.0 | 48.3 | 17.8 | 3.0 | 4.0 | — |
| EXAMPLE 21-3 | 25.9 | 48.0 | 18.0 | 3.0 | 5.1 | — | 25.6 | 47.6 | 17.8 | 3.0 | 5.0 | — |
| EXAMPLE 21-4 | 25.0 | 46.5 | 18.0 | 3.0 | 7.5 | — | 24.8 | 46.0 | 17.8 | 3.0 | 7.4 | — |
| EXAMPLE 21-5 | 26.3 | 48.8 | 18.0 | 3.0 | 2.6 | 1.4 | 26.0 | 48.3 | 17.8 | 3.0 | 2.6 | 1.4 |
| EXAMPLE 21-6 | 25.9 | 48.0 | 18.0 | 3.0 | 3.7 | 1.4 | 25.6 | 47.6 | 17.8 | 3.0 | 3.6 | 1.4 |
| EXAMPLE 21-7 | 25.0 | 46.5 | 18.0 | 3.0 | 6.1 | 1.4 | 24.8 | 46.0 | 17.8 | 3.0 | 6.0 | 1.4 |
| EXAMPLE 21-8 | 24.2 | 44.9 | 18.0 | 3.0 | 8.6 | 1.4 | 23.9 | 44.4 | 17.8 | 3.0 | 8.4 | 1.4 |

$$\frac{Co}{Sn + Co} = 35 \text{ wt \%}$$

TABLE 24

| | INITIAL CHARGE CAPACITY (mAh/g) | DISCHARGE CAPACITY IN SECOND CYCLE (mAh/cm$^3$) | DISCHARGE CAPACITY IN 300TH CYCLE (mAh/cm$^3$) | CAPACITY RETENTION RATIO (%) |
|---|---|---|---|---|
| EXAMPLE 20-1 | 501 | 111 | 77 | 69 |
| EXAMPLE 21-1 | 540 | 117 | 75 | 64 |
| EXAMPLE 21-2 | 562 | 118 | 86 | 73 |
| EXAMPLE 21-3 | 570 | 120 | 90 | 75 |
| EXAMPLE 21-4 | 572 | 120 | 91 | 76 |
| EXAMPLE 21-5 | 559 | 118 | 89 | 76 |
| EXAMPLE 21-6 | 567 | 119 | 91 | 76 |
| EXAMPLE 21-7 | 568 | 119 | 91 | 76 |
| EXAMPLE 21-8 | 563 | 118 | 88 | 74 |

It was obvious from Table 24 that the same results as those in Examples 11-1 through 11-8 were obtained. In other words, it was found out that even if the gel electrolyte was used, when at least one kind selected from the group consisting of titanium, molybdenum, niobium, aluminum, germanium, indium, gallium and phosphorus, and silicon were included in the anode active material, the capacity and the cycle characteristics could be further improved.

Examples 22-1 Through 22-3

Secondary batteries were formed as in the case of Example 15-5, except that a solvent in which 4-fluoro-1,3-dioxolane-2-one, ethylene carbonate and propylene carbonate were mixed at a mass ratio of 4-fluoro-1,3-dioxolane-2-one:ethylene carbonate:propylene carbonate=1:10.5:11.5, 5:6.5:11.5 or 10:1.5:11.5 was used.

The cycle characteristics of the obtained secondary batteries of Examples 22-1 through 22-3 were measured as in the case of Examples 1-1 through 1-7. The results are shown in Table 25.

TABLE 25

| | MATERIAL RATIO (WT %) | | | ANALYTICAL VALUE (WT %) | | | SOLVENT (WT %) | | | CAPACITY RETENTION RATIO (%) |
|---|---|---|---|---|---|---|---|---|---|---|
| | Co | Sn | C | Co | Sn | C | FEC | EC | PC | |
| EXAMPLE 15-5 | 29.6 | 50.4 | 20 | 29.3 | 49.9 | 19.8 | 0 | 11.5 | 11.5 | 71 |
| EXAMPLE 22-1 | 29.6 | 50.4 | 20 | 29.3 | 49.9 | 19.8 | 1 | 10.5 | 11.5 | 73 |
| EXAMPLE 22-2 | 29.6 | 50.4 | 20 | 29.3 | 49.9 | 19.8 | 5 | 6.5 | 11.5 | 83 |
| EXAMPLE 22-3 | 29.6 | 50.4 | 20 | 29.3 | 49.9 | 19.8 | 10 | 1.5 | 11.5 | 90 |

EC: ethylene Carbonate
PC: propylene Carbonate
FEC: 4-fluoro-1,3-dioxolane-2-one $$\frac{Co}{Sn + Co} = 37 \text{ wt \%}$$

It was obvious from Table 25 that in Examples 22-1 through 22-3 in which 4-fluoro-1,3-dioxolane-2-one was used in the solvent, the capacity retention ratio could be improved, compared to Example 15-5 in which 4-fluoro-1,3-dioxolane-2-one was not used. In other words, it was found out that in the case where a cyclic carbonate including a halogen atom was included in the solvent, even if the gel electrolyte was used, the cycle characteristics could be further improved.

Examples 23-1 Through 23-7

Anode active materials were formed. As the materials of the anode active materials, cobalt powder, tin powder, iron powder and carbon powder were prepared, and after the cobalt powder, the tin powder and the iron powder were alloyed to form cobalt-tin-iron alloy powder, the carbon powder was added to the alloy powder, and they were dry-mixed, thereby a mixture was formed. At that time, as the ratio of the materials, as shown in Table 26, the Co/(Sn+Co) ratio was fixed to 37 wt %, and the ratio of iron was fixed to 0.8 wt %, and the ratio of carbon was changed within a range from 10 wt % to 30 wt % inclusive. Next, 20 g of the mixture was put into a reaction vessel of a planetary ball mill of Ito Seisakusho together with approximately 400 g of steel balls with a diameter of 9 mm. Next, an argon atmosphere is introduced into the reaction vessel, and the cycle of 10-minute operation at 250 rpm and a 10-minute interval was repeated until the total operation time reached 30 hours. After that, the reaction vessel was cooled down to a room temperature, and synthesized anode active material powder was taken out from the reaction vessel, and the anode active material powder was shifted through a sieve having 280 meshes to remove coarse grains of the anode active material powder.

The compositions of the obtained anode active materials were analyzed. The carbon content was measured by a carbon/sulfur analyzer, and the contents of cobalt, tin and iron were measured by ICP (Inductively Coupled Plasma) emission spectrometry. The analytical values are shown in Table 26. Moreover, when X-ray diffraction on each of the obtained anode active materials was performed, a diffraction peak having a broad half-width within $2\theta=20°$ to $50°$ was observed. The half-width of the diffraction peak are also shown in Table 26. Further, when the XPS measurement was performed on the obtained anode active materials, as shown in FIG. 6, the peak P1 was obtained. When the peak P1 was analyzed, the peak P2 of surface contamination carbon and the peak P3 of C1s in the anode active material on a lower energy side than the peak P2 were obtained. The peak P3 in each of Examples 23-1 through 23-7 was obtained in a region lower than 284.5 eV. In other words, it was confirmed that carbon in each of the anode active materials was coupled to another element.

TABLE 26

| | MATERIAL RATIO (WT %) | | | | ANALYTICAL VALUE (WT %) | | | | HALF-WIDTH (°) | INITIAL CHARGE CAPACITY (mAh/cm³) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|---|
| | Co | Sn | C | Fe | Co | Sn | C | Fe | | | | | |
| EXAMPLE 23-1 | 33.0 | 56.2 | 10.0 | 0.8 | 32.7 | 55.6 | 9.9 | 0.8 | 3.5 | 495 | 121 | 76 | 63 |
| EXAMPLE 23-2 | 32.3 | 54.9 | 12.0 | 0.8 | 31.9 | 54.4 | 11.9 | 0.8 | 3.8 | 501 | 127 | 81 | 64 |
| EXAMPLE 23-3 | 31.2 | 53.0 | 15.0 | 0.8 | 30.8 | 52.5 | 14.9 | 0.8 | 4.3 | 505 | 130 | 86 | 66 |
| EXAMPLE 23-4 | 30.4 | 51.8 | 17.0 | 0.8 | 30.1 | 51.3 | 16.8 | 0.8 | 4.5 | 511 | 135 | 93 | 69 |
| EXAMPLE 23-5 | 29.3 | 49.9 | 20.0 | 0.8 | 29.0 | 49.4 | 19.8 | 0.8 | 4.8 | 518 | 139 | 101 | 73 |
| EXAMPLE 23-6 | 27.5 | 46.7 | 25.0 | 0.8 | 27.2 | 46.3 | 24.8 | 0.8 | 5.1 | 526 | 139 | 100 | 72 |
| EXAMPLE 23-7 | 25.6 | 43.6 | 30.0 | 0.8 | 25.3 | 43.2 | 29.7 | 0.8 | 5.4 | 510 | 127 | 81 | 64 |
| COMPARATIVE EXAMPLE 23-1 | 36.7 | 62.5 | 0 | 0.8 | 36.3 | 61.9 | 0 | 0.8 | 0.2 | 447 | 86 | 0 | 0 |
| COMPARATIVE EXAMPLE 23-2 | 36.3 | 61.9 | 1.0 | 0.8 | 36.0 | 61.2 | 1.0 | 0.8 | 0.5 | 449 | 90 | 0 | 0 |
| COMPARATIVE EXAMPLE 23-3 | 34.9 | 59.3 | 5.0 | 0.8 | 34.5 | 58.8 | 5.0 | 0.8 | 2.0 | 472 | 97 | 0 | 0 |
| COMPARATIVE EXAMPLE 23-4 | 33.7 | 57.5 | 8.0 | 0.8 | 33.4 | 56.9 | 7.9 | 0.8 | 3.0 | 486 | 110 | 13 | 12 |
| COMPARATIVE EXAMPLE 23-5 | 21.9 | 37.3 | 40.0 | 0.8 | 21.7 | 36.9 | 39.6 | 0.8 | 5.5 | 460 | 92 | 19 | 21 |
| COMPARATIVE EXAMPLE 23-6 | 18.2 | 31.0 | 50.0 | 0.8 | 18.0 | 30.7 | 49.5 | 0.8 | 5.5 | 410 | 75 | 9 | 12 |

$\dfrac{Co}{Sn+Co} = 37$ wt %

Next, the anode active material power of each of Examples 23-1 through 23-7 was used to form a coin type secondary battery shown in FIG. 7, and the initial charge capacity of the secondary battery was determined. The coin type battery included the test electrode 61 using the anode active material of each example which was contained in the package member 62, and the counter electrode 63 which was attached to the package member 64. The test electrode 61 and the counter electrode 63 were laminated with the separator 65 impregnated with an electrolyte solution in between, and then they were caulked by the gasket 66, thereby the coin type battery was formed.

The test electrode 61 was formed through the following steps. At first, 70 parts by weight of the obtained anode active material powder, 20 parts by weight of graphite which was an electrical conductor and another anode active material, 1 part by weight of acetylene black as an electrical conductor and 4 parts by weight of polyvinylidene fluoride as a binder were mixed to form a mixture. After the mixture was dispersed in an appropriate mixed solvent to form slurry, the slurry was applied to a current collector of copper foil, and was dried. Then, the current collector was stamped into a pellet with a diameter of 15.2 mm.

As the counter electrode 63, a metal lithium plate stamped into a disk shape with a diameter of 15.5 mm was used. As the electrolyte solution, a mixed solvent including ethylene carbonate, propylene carbonate and dimethyl carbonate in which $LiPF_6$ as an electrolyte salt was dissolved was used.

As the initial charge capacity, charge capacity per unit mass which was the mass of the test electrode 61 exclusive of the mass of the current collector of copper foil and the mass of the binder was determined through charging the secondary battery at a constant current of 1 mA until the battery voltage reached 0.2 mV, and then charging the secondary battery at a constant voltage of 0.2 mV until a current reached 10 µA. In this case, charge means an insertion reaction of lithium into the anode active material. The result is shown in Table 26 and FIG. 20.

Moreover, a cylindrical type secondary battery shown in FIG. 1 was formed. At first, a cathode active material made of nickel oxide, ketjen black as an electrical conductor and polyvinylidene fluoride as a binder were mixed at a mass ratio of nickel oxide:ketjen black:polyvinylidene fluoride=94:3:3 to form a mixture. After the mixture was dispersed in a mixed solvent such as N-methyl-2-pyrrolidone to form cathode mixture slurry, the cathode mixture slurry was uniformly applied to both sides of the cathode current collector 21A made of strip-shaped aluminum foil, and was dried. Then, the cathode active material layer 21B was formed through compression molding by a roller press so as to form the cathode 21. After that, the cathode lead 25 made of aluminum was attached to an end of the cathode current collector 21A.

Moreover, slurry including the anode active material which was formed as described above was uniformly applied to both sides of the anode current collector 22A made of strip-shaped copper foil, and was dried. Then, the anode active material layer 22B was formed through compression molding by a roller press so as to form the anode 22. Next, the anode lead 26 made of nickel was attached to an end of the anode current collector 22A.

After the cathode 21 and the anode 22 were formed, the separator 23 was prepared, and the anode 22, the separator 23, the cathode 21 and the separator 23 were laminated in this order to form a laminate, and the laminate was spirally wound several times to form the spirally wound electrode body 20.

After the spirally wound electrode body 20 was formed, the spirally wound electrode body 20 was sandwiched between a pair of insulating plates 12 and 13, and the anode lead 26 was welded to the battery can 11, and the cathode lead 25 was welded to the safety valve mechanism 15. Then, the spirally wound electrode body 20 was contained in the battery can 11 made of nickel-plated iron. After that, the above-described electrolyte solution was injected into the battery can 11 by a decomposition method.

After the electrolyte solution was injected into the battery can 11, the battery cover 14 was caulked to the battery can 11 by the gasket 17 of which the surface was coated with asphalt, thereby the cylindrical secondary battery shown in FIG. 1 was obtained.

The cycle characteristics of the obtained secondary battery were measured. The result was shown in Table 26 and FIG. 20. At that time, the cycle characteristics were measured through the following steps.

At first, after the secondary battery was charged at a constant current of 0.5 A until the battery voltage reached 4.2 V, the secondary battery was charged at a constant voltage of 4.2 V until the current reached 10 mA. Then, the secondary battery was discharged at a constant current of 0.25 A until the battery voltage reached 2.6 V. Thereby, the first cycle of charge-discharge was performed.

As the second or later cycles, after the secondary battery was charged at a constant current of 1.4 A until the battery voltage reached 4.2 V, the secondary battery was charged at a constant voltage of 4.2 V until the current reached 10 mA, and then the secondary battery was discharged at a constant current of 1.0 A until the battery voltage reached 2.6 V. As the cycle characteristics, the capacity retention ratio in the 300th cycle to the discharge capacity in the second cycle (discharge capacity in the 300th cycle)/(discharge capacity in the second cycle)×100(%) was determined.

As Comparative Example 23-1 relative to Examples 23-1 through 23-7, an anode active material was synthesized, and a secondary battery was formed as in the case of Examples 23-1 through 23-7, except that as a material, carbon powder was not used. Moreover, as Comparative Examples 23-2 through 23-6, anode active materials were synthesized, and secondary batteries were formed as in the case of Examples 23-1 through 23-7, except that the material ratio of carbon powder was changed as shown in Table 26. The analysis of the composition and the measurement of the half-width of a diffraction peak having a broad half-width observed within a range of 2θ=20° to 50° were performed on the anode active materials of Comparative Examples 23-1 through 23-6. The results are shown in Table 26. Further, when the XPS measurement was performed on the anode active materials of Comparative Examples 23-1 through 23-6, in the anode active materials of Comparative Examples 23-3 through 23-6, the peak P1 shown in FIG. 6 was obtained. When the peak P1 was analyzed, as in the case of Examples 23-1 through 23-7, the peak P2 of surface contamination carbon and the peak P3 of C1s in the anode active material were obtained, and the peak P3 in each of Comparative Examples 23-3 through 23-6 was obtained in a region lower than 284.5 eV. In other words, it was confirmed that at least a part of carbon included in the anode active material was coupled to another element. On the other hand, in Comparative Example 23-1, as shown in FIG. 9, a peak P4 was obtained, and when the peak P4 was analyzed, only the peak P2 of surface contamination carbon was obtained. In Comparative Example 23-2, the amount of carbon used as a material was small, so only the peak P2 was obtained by the analysis, and the peak P3 was hardly detected.

Moreover, the initial charge capacities and the cycle characteristics of the secondary batteries were measured in the same manner. The results are also shown in Table 26 and FIG. 20.

Figure 20:
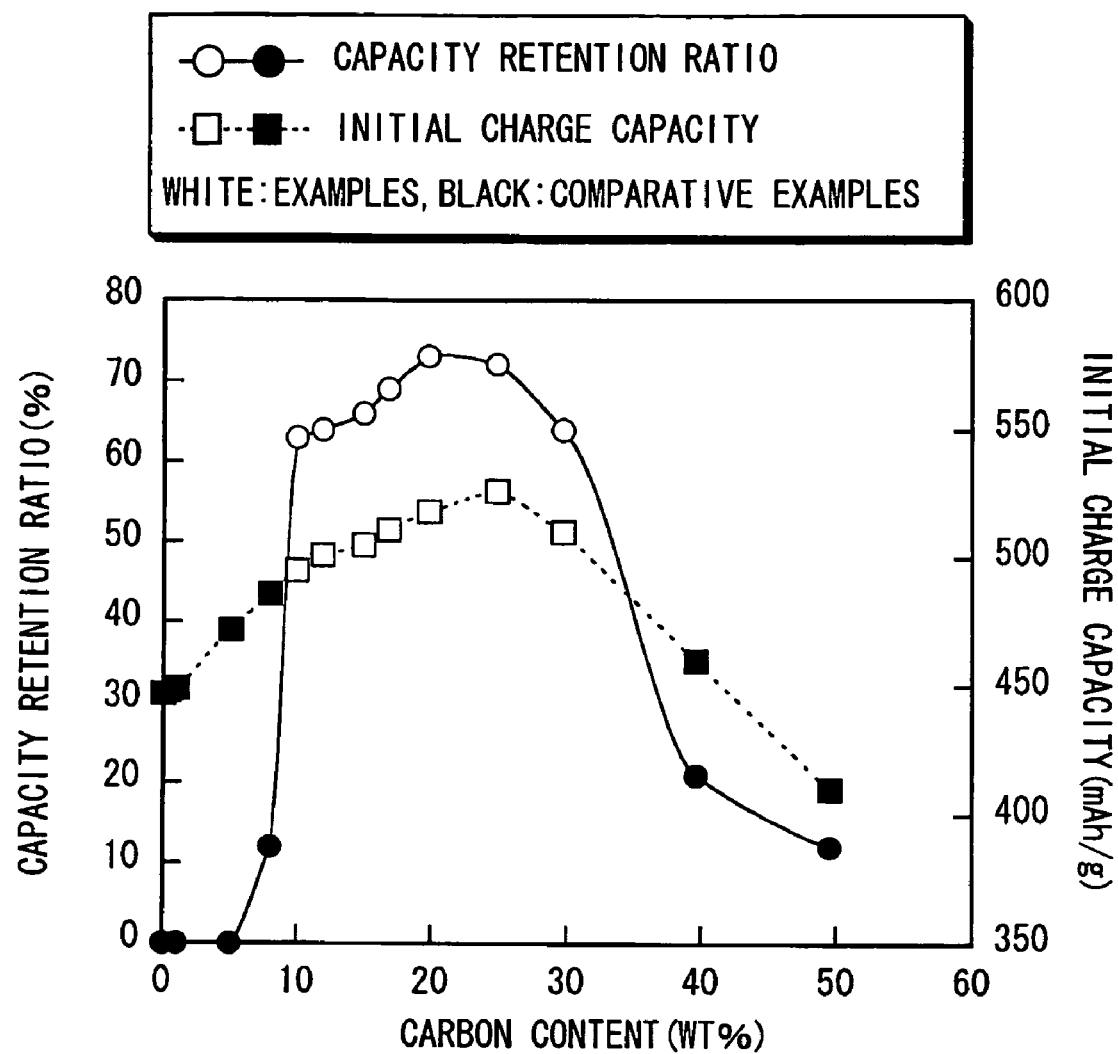
FIG. 20 is another plot showing a relationship between the carbon content in an anode active material, a capacity retention ratio and an initial charge capacity.

It was obvious from Table 26 and FIG. 20 that in Examples 23-1 through 23-7 in which the carbon content in the anode active material was within a range from 9.9 wt % to 29.7 wt % inclusive, the capacity retention ratio could be remarkably improved, compared to Comparative Examples 23-1 through 23-6 in which the carbon content was out of the range. Moreover, the initial charge capacity and the discharge capacity could be improved.

Moreover, when the carbon content in the anode active material was within a range from 14.9 wt % to 29.7 wt % inclusive, more specifically within a range from 16.8 wt % to 24.8 wt % inclusive, higher values could be obtained.

In other words, it was found out that when the carbon content was within a range from 9.9 wt % to 29.7 wt % inclusive, the capacity and the cycle characteristics could be improved, and the carbon content was more preferably within a range from 14.9 wt % to 29.7 wt % inclusive, and more preferably within a range from 16.8 wt % to 24.8 wt % inclusive.

Examples 24-1 Through 24-9

Secondary batteries were formed as in the case of Examples 23-1 through 23-7, except that anode active materials in which the material ratio of cobalt, tin, iron and carbon was changed as shown in Table 27 were synthesized. More specifically, the material ratio of iron was fixed to 0.8 wt %, and the material ratio of carbon was fixed to 10 wt %. The Co/(Sn+Co) ratio was changed within a range from 30 wt % to 70 wt % inclusive.

TABLE 27

| | MATERIAL RATIO (WT %) | | | | ANALYTICAL VALUE (WT %) | | | | Co/Sn + Co | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|---|---|
| | Co | Sn | C | Fe | Co | Sn | C | Fe | | | | | | |
| EXAMPLE 24-1 | 62.4 | 26.8 | 10 | 0.8 | 61.8 | 26.5 | 9.9 | 0.8 | 70 | 3.8 | 367 | 96 | 69 | 72 |
| EXAMPLE 24-2 | 58.0 | 31.2 | 10 | 0.8 | 57.4 | 30.9 | 9.9 | 0.8 | 65 | 3.8 | 377 | 100 | 71 | 71 |
| EXAMPLE 24-3 | 53.5 | 35.7 | 10 | 0.8 | 53.0 | 35.3 | 9.9 | 0.8 | 60 | 3.7 | 396 | 102 | 72 | 70 |
| EXAMPLE 24-4 | 49.1 | 40.1 | 10 | 0.8 | 48.6 | 39.7 | 9.9 | 0.8 | 55 | 3.7 | 415 | 104 | 72 | 69 |
| EXAMPLE 24-5 | 44.6 | 44.6 | 10 | 0.8 | 44.2 | 44.2 | 9.9 | 0.8 | 50 | 3.6 | 446 | 106 | 71 | 67 |
| EXAMPLE 24-6 | 40.1 | 49.1 | 10 | 0.8 | 39.7 | 48.6 | 9.9 | 0.8 | 45 | 3.6 | 476 | 112 | 72 | 64 |
| EXAMPLE 24-7 | 35.7 | 53.5 | 10 | 0.8 | 35.3 | 53.0 | 9.9 | 0.8 | 40 | 3.5 | 483 | 117 | 73 | 62 |
| EXAMPLE 23-1 | 33.0 | 56.2 | 10 | 0.8 | 32.7 | 55.6 | 9.9 | 0.8 | 37 | 3.5 | 495 | 121 | 76 | 63 |
| EXAMPLE 24-8 | 29.4 | 59.8 | 10 | 0.8 | 29.1 | 59.2 | 9.9 | 0.8 | 33 | 3.4 | 525 | 120 | 71 | 59 |
| EXAMPLE 24-9 | 26.8 | 62.4 | 10 | 0.8 | 26.5 | 61.8 | 9.9 | 0.8 | 30 | 3.3 | 555 | 119 | 68 | 57 |
| COMPARATIVE EXAMPLE 24-1 | 25.0 | 64.2 | 10 | 0.8 | 24.7 | 63.6 | 9.9 | 0.8 | 28 | 3.2 | 558 | 117 | 22 | 19 |
| COMPARATIVE EXAMPLE 24-2 | 22.3 | 66.9 | 10 | 0.8 | 22.1 | 66.2 | 9.9 | 0.8 | 25 | 3.0 | 575 | 114 | 0 | 0 |
| COMPARATIVE EXAMPLE 24-3 | 17.8 | 71.4 | 10 | 0.8 | 17.7 | 70.6 | 9.9 | 0.8 | 20 | 2.8 | 590 | 109 | 0 | 0 |
| COMPARATIVE EXAMPLE 24-4 | 66.9 | 22.3 | 10 | 0.8 | 66.2 | 22.1 | 9.9 | 0.8 | 75 | 3.8 | 278 | 71 | 52 | 73 |

As Comparative Examples 24-1 through 24-4 relative to Examples 24-1 through 24-9, anode active materials and secondary batteries were formed as in the case of Examples 24-1 through 24-9, except that the Co/(Sn+Co) ratio was changed as shown in Table 27. The Co/(Sn+Co) ratios in Comparative Examples 24-1, 24-2, 24-3 and 24-4 were 28 wt %, 25 wt %, 20 wt % and 75 wt %, respectively.

The analysis of the composition and the measurement of the half-width of a diffraction peak having a broad half-width observed within a range of 2θ=20° to 50° were performed on the obtained anode active materials of Examples 24-1 through 24-9 and Comparative Examples 24-1 through 24-4 as in the case of Examples 23-1 through 23-7. The results are shown in Table 27. Further, when the XPS measurement was performed, and the obtained peaks were analyzed, as in the case of Examples 23-1 through 23-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured as in the case of Examples 23-1 through 23-7. The results are shown in Table 27 and FIG. 21.

Figure 21:
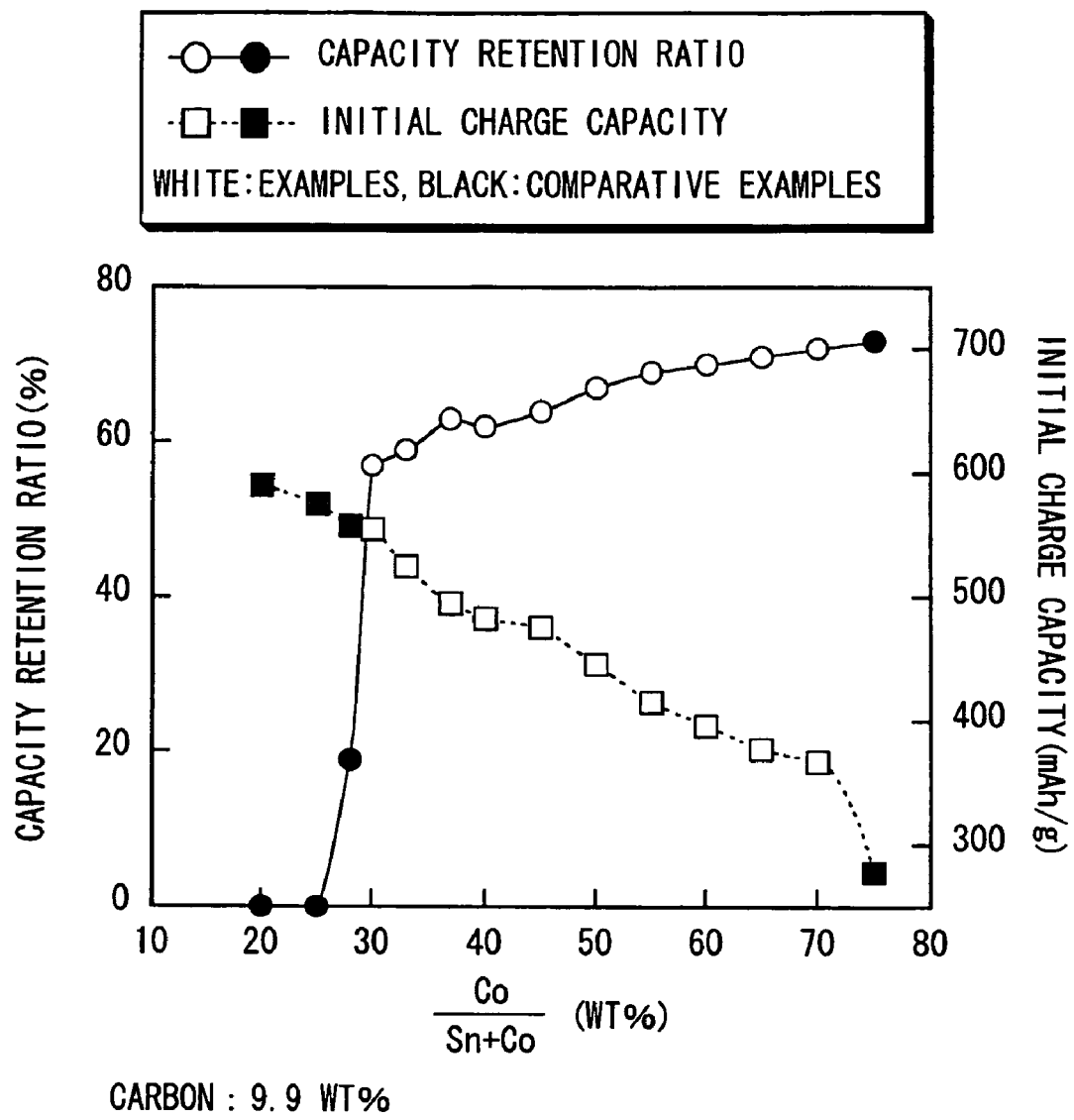
FIG. 21 is another plot showing a relationship between the ratio of cobalt to the total of tin and cobalt in an anode active material, a capacity retention ratio and an initial charge capacity.

It was obvious from Table 27 and FIG. 21 that in Examples 24-1 through 24-9 in which the Co/(Sn+Co) ratio was within a range from 30 wt % to 70 wt % inclusive, the capacity retention ratio could be remarkably improved, compared to Comparative Examples 24-1 through 24-3 in which the Co/(Sn+Co) ratio was lower than 30 wt %, and the initial charge capacity could be remarkably increased, compared to Comparative Example 2-4 in which the Co/(Sn+Co) ratio was higher than 70 wt %. More specifically, when the Co/(Sn+Co) ratio was equal to or lower than 60 wt %, a high initial charge capacity could be obtained.

In other words, it was found out that when the Co/(Sn+Co) ratio was within a range from 30 wt % to 70 wt % inclusive, the capacity and the cycle characteristics could be improved. Moreover, it was found out that the Co/(Sn+Co) ratio was more preferably 60 wt % or less.

Examples 25-1 Through 25-9

Secondary batteries were formed as in the case of Examples 23-1 through 23-7, except that anode active materials in which the material ratio of cobalt, tin, iron and carbon was changed as shown in Table 28 were synthesized. More specifically, the material ratio of iron was fixed to 0.8 wt %, and the material ratio of carbon was fixed to 20 wt %. The Co/(Sn+Co) ratio was changed within a range from 30 wt % to 70 wt % inclusive.

TABLE 28

| | MATERIAL RATIO (WT %) | | | | ANALYTICAL VALUE (WT %) | | | | Co/Sn+Co | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|---|---|
| | Co | Sn | C | Fe | Co | Sn | C | Fe | | | | | | |
| EXAMPLE 25-1 | 55.4 | 23.8 | 20 | 0.8 | 54.9 | 23.5 | 19.8 | 0.8 | 70 | 5.0 | 368 | 98 | 85 | 87 |
| EXAMPLE 25-2 | 51.5 | 27.7 | 20 | 0.8 | 51.0 | 27.4 | 19.8 | 0.8 | 65 | 5.0 | 378 | 100 | 87 | 87 |
| EXAMPLE 25-3 | 47.5 | 31.7 | 20 | 0.8 | 47.0 | 31.4 | 19.8 | 0.8 | 60 | 4.9 | 397 | 106 | 91 | 86 |
| EXAMPLE 25-4 | 43.6 | 35.6 | 20 | 0.8 | 43.1 | 35.3 | 19.8 | 0.8 | 55 | 4.9 | 417 | 111 | 94 | 85 |
| EXAMPLE 25-5 | 39.6 | 39.6 | 20 | 0.8 | 39.2 | 39.2 | 19.8 | 0.8 | 50 | 4.9 | 445 | 118 | 98 | 83 |
| EXAMPLE 25-6 | 35.6 | 43.6 | 20 | 0.8 | 35.3 | 43.1 | 19.8 | 0.8 | 45 | 4.8 | 474 | 127 | 99 | 78 |
| EXAMPLE 25-7 | 31.7 | 47.5 | 20 | 0.8 | 31.4 | 47.0 | 19.8 | 0.8 | 40 | 4.8 | 500 | 133 | 100 | 75 |
| EXAMPLE 23-5 | 29.3 | 49.9 | 20 | 0.8 | 29.0 | 49.4 | 19.8 | 0.8 | 37 | 4.8 | 518 | 139 | 101 | 73 |
| EXAMPLE 25-8 | 26.1 | 53.1 | 20 | 0.8 | 25.9 | 52.5 | 19.8 | 0.8 | 33 | 4.6 | 539 | 139 | 97 | 70 |
| EXAMPLE 25-9 | 23.8 | 55.4 | 20 | 0.8 | 23.5 | 54.9 | 19.8 | 0.8 | 30 | 4.5 | 555 | 145 | 93 | 64 |
| COMPARATIVE EXAMPLE 25-1 | 22.2 | 57.0 | 20 | 0.8 | 22.0 | 56.5 | 19.8 | 0.8 | 28 | 4.4 | 561 | 139 | 50 | 36 |
| COMPARATIVE EXAMPLE 25-2 | 19.8 | 59.4 | 20 | 0.8 | 19.6 | 58.8 | 19.8 | 0.8 | 25 | 4.2 | 569 | 133 | 27 | 20 |
| COMPARATIVE EXAMPLE 25-3 | 15.8 | 63.4 | 20 | 0.8 | 15.7 | 62.7 | 19.8 | 0.8 | 20 | 4.0 | 591 | 125 | 0 | 0 |
| COMPARATIVE EXAMPLE 25-4 | 59.4 | 19.8 | 20 | 0.8 | 58.8 | 19.6 | 19.8 | 0.8 | 75 | 5.0 | 252 | 65 | 57 | 88 |

As Comparative Examples 25-1 through 25-4 relative to Examples 25-1 through 25-9, anode active materials and secondary batteries were formed as in the case of Examples 25-1 through 25-9, except that the Co/(Sn+Co) ratio was changed as shown in Table 28. The Co/(Sn+Co) ratios in Comparative Examples 25-1, 25-2, 25-3 and 25-4 were 28 wt %, 25 wt %, 20 wt % and 75 wt %, respectively.

The analysis of the composition and the measurement of the half-width of a diffraction peak having a broad half-width observed within a range of 2θ=20° to 50° were performed on the anode active materials of Examples 25-1 through 25-9 and Comparative Examples 25-1 through 25-4 as in the case of Examples 23-1 through 23-7. The results are shown in Table 28. Further, when the XPS measurement was performed, and the obtained peaks were analyzed, as in the case of Examples 23-1 through 23-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured as in the case of Examples 23-1 through 23-7. The results are shown in Table 28 and FIG. 22.

Figure 22:
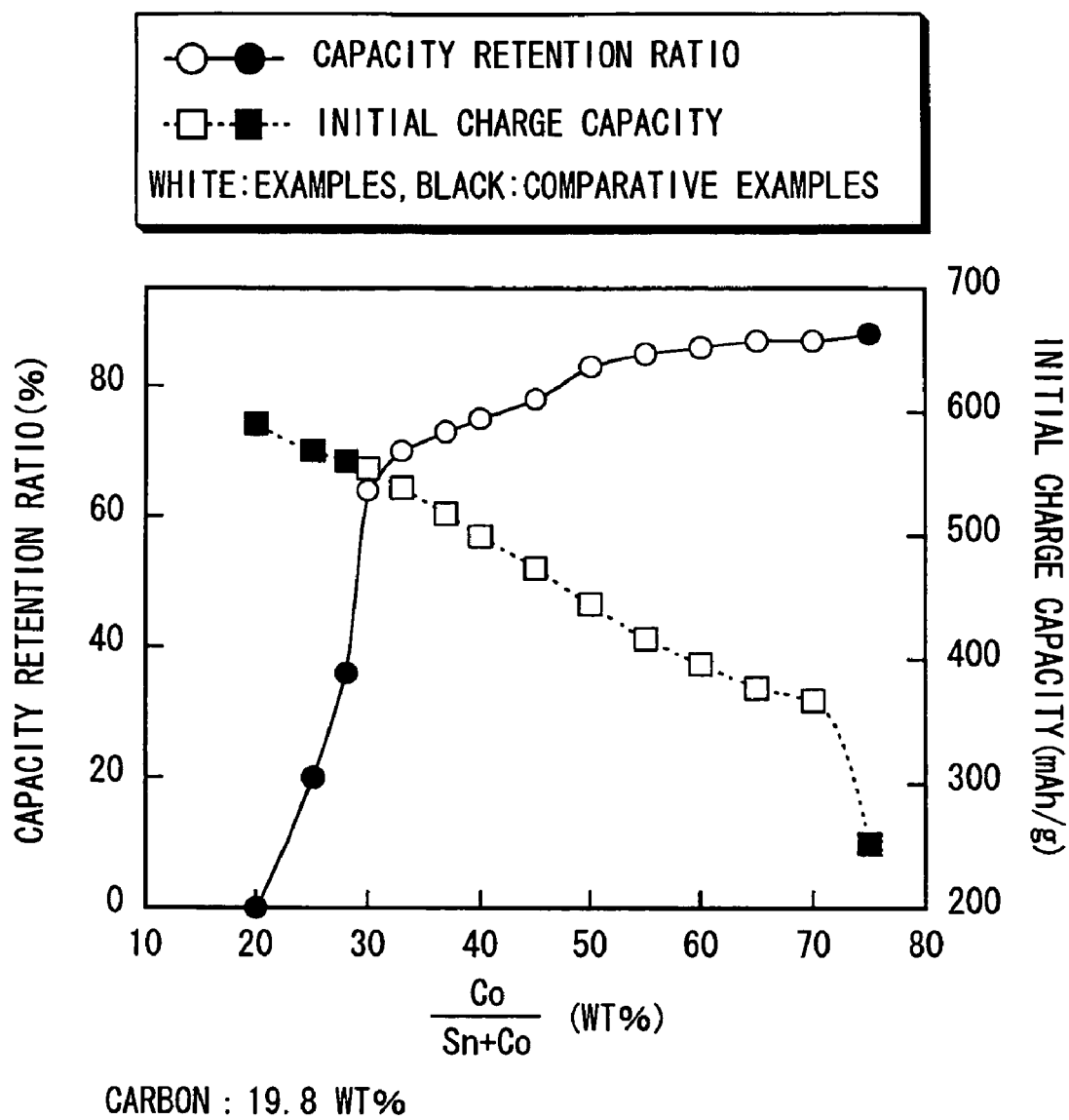
FIG. 22 is another plot showing a relationship between the ratio of cobalt to the total of tin and cobalt in an anode active material, a capacity retention ratio and an initial charge capacity.

It was obvious from Table 28 and FIG. 22 that the same results as those in the case of Examples 24-1 through 24-9 were obtained. In other words, it was found out that when the Co/(Sn+Co) ratio was within a range from 30 wt % to 70 wt % inclusive, even in the case where the carbon content was 19.8 wt %, the capacity and the cycle characteristics could be improved.

Examples 26-1 Through 26-9

Secondary batteries were formed as in the case of Examples 23-1 through 23-7, except that anode active materials in which the material ratio of cobalt, tin, and carbon was changed as shown in Table 29 were synthesized. More specifically, the material ratio of iron was fixed to 0.8 wt %, and the material ratio of carbon was fixed to 30 wt %. The Co/(Sn+Co) ratio was changed within a range from 30 wt % to 70 wt % inclusive.

TABLE 29

| | MATERIAL RATIO (WT %) | | | | ANALYTICAL VALUE (WT %) | | | | Co/(Sn+Co) | HALF-WIDTH (°) | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|---|---|
| | Co | Sn | C | Fe | Co | Sn | C | Fe | | | | | | |
| EXAMPLE 26-1 | 48.4 | 20.8 | 30 | 0.8 | 48.0 | 20.6 | 29.7 | 0.8 | 70 | 6.0 | 321 | 81 | 70 | 87 |
| EXAMPLE 26-2 | 45.0 | 24.2 | 30 | 0.8 | 44.5 | 24.0 | 29.7 | 0.8 | 65 | 5.9 | 397 | 105 | 87 | 83 |
| EXAMPLE 26-3 | 41.5 | 27.7 | 30 | 0.8 | 41.1 | 27.4 | 29.7 | 0.8 | 60 | 5.8 | 416 | 110 | 89 | 81 |
| EXAMPLE 26-4 | 38.1 | 31.1 | 30 | 0.8 | 37.7 | 30.8 | 29.7 | 0.8 | 55 | 5.7 | 441 | 116 | 90 | 78 |
| EXAMPLE 26-5 | 34.6 | 34.6 | 30 | 0.8 | 34.3 | 34.3 | 29.7 | 0.8 | 50 | 5.6 | 451 | 121 | 88 | 73 |
| EXAMPLE 26-6 | 31.1 | 38.1 | 30 | 0.8 | 30.8 | 37.7 | 29.7 | 0.8 | 45 | 5.5 | 467 | 124 | 88 | 71 |
| EXAMPLE 26-7 | 27.7 | 41.5 | 30 | 0.8 | 27.4 | 41.1 | 29.7 | 0.8 | 40 | 5.4 | 486 | 126 | 84 | 67 |
| EXAMPLE 23-7 | 25.6 | 43.6 | 30 | 0.8 | 25.3 | 43.2 | 29.7 | 0.8 | 37 | 5.4 | 510 | 127 | 81 | 64 |
| EXAMPLE 26-8 | 22.8 | 46.4 | 30 | 0.8 | 22.6 | 45.9 | 29.7 | 0.8 | 33 | 5.3 | 512 | 132 | 79 | 60 |
| EXAMPLE 26-9 | 20.8 | 48.4 | 30 | 0.8 | 20.6 | 48.0 | 29.7 | 0.8 | 30 | 5.2 | 521 | 135 | 78 | 58 |
| COMPARATIVE EXAMPLE 26-1 | 19.4 | 49.8 | 30 | 0.8 | 19.2 | 49.3 | 29.7 | 0.8 | 28 | 5.2 | 530 | 132 | 46 | 35 |
| COMPARATIVE EXAMPLE 26-2 | 17.3 | 51.9 | 30 | 0.8 | 17.1 | 51.4 | 29.7 | 0.8 | 25 | 5.1 | 541 | 128 | 29 | 23 |
| COMPARATIVE EXAMPLE 26-3 | 13.8 | 55.4 | 30 | 0.8 | 13.7 | 54.8 | 29.7 | 0.8 | 20 | 5.1 | 548 | 115 | 0 | 0 |
| COMPARATIVE EXAMPLE 26-4 | 51.9 | 17.3 | 30 | 0.8 | 51.4 | 17.1 | 29.7 | 0.8 | 75 | 6.1 | 269 | 67 | 60 | 90 |

As Comparative Examples 26-1 through 26-4 relative to Examples 26-1 through 26-9, anode active materials and secondary batteries were formed as in the case of Examples 26-1 through 26-9, except that the Co/(Sn+Co) ratio was changed as shown in Table 29. The Co/(Sn+Co) ratios in Comparative Examples 26-1, 26-2, 26-3 and 26-4 were 28 wt %, 25 wt %, 20 wt % and 75 wt %, respectively.

The analysis of the composition and the measurement of the half-width of a diffraction peak having a broad half-width observed within a range of $2\theta=20°$ to $50°$ were performed on the anode active materials of Examples 26-1 through 26-9 and Comparative Examples 26-1 through 26-4 as in the case of Examples 23-1 through 23-7. The results are shown in Table 29. Further, when the XPS measurement was performed, and the obtained peaks were analyzed, as in the case of Examples 23-1 through 23-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured in the same manner. The results are shown in Table 29 and FIG. 23.

Figure 23:
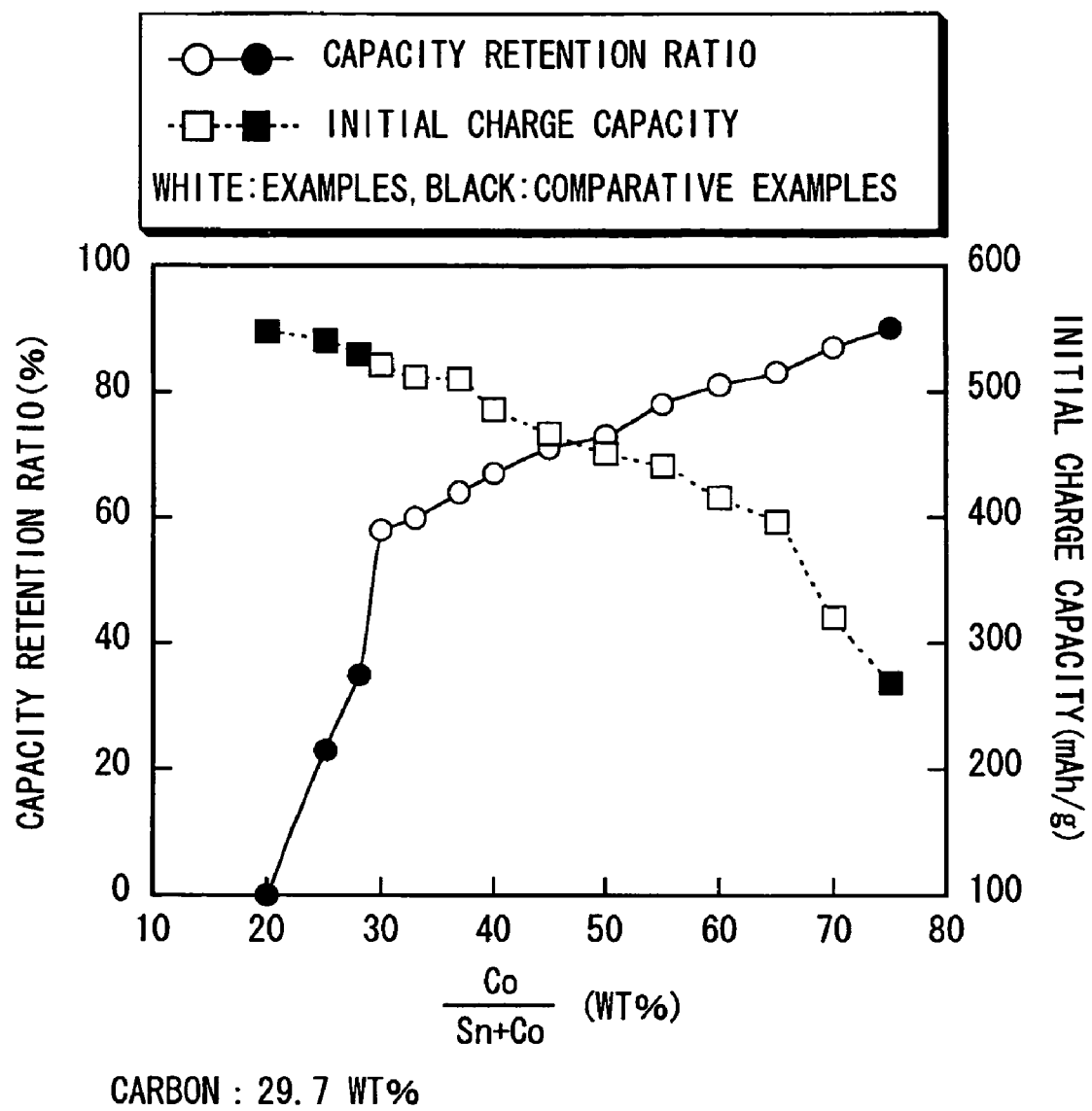
FIG. 23 is another plot showing a relationship between the ratio of cobalt to the total of tin and cobalt in an anode active material, a capacity retention ratio and an initial charge capacity.

It was obvious from Table 29 and FIG. 23 that the same results as those in Examples 24-1 through 24-9 were obtained. In other words, it was found out that when the Co/(Sn+Co) ratio was within a range from 30 wt % to 70 wt % inclusive, even in the case where the carbon content was 29.7 wt %, the capacity and the cycle characteristics could be improved.

Examples 27-1 Through 27-6 and 28-1 Through 28-6

Anode active materials and secondary batteries were formed as in the case of Examples 23-1 through 23-7, except that the operation time and the number of revolutions when the anode active materials were synthesized were changed so as to change the half-width of a diffraction peak having a broad half-width observed within a range of $2\theta=20°$ to $50°$. At that time, in the material ratio of cobalt, tin, iron and carbon, the material ratio of carbon was changed in Examples 27-1 through 27-6 and Examples 28-1 through 28-6 as shown in Table 30, and the Co/(Sn+Co) ratio was the same.

TABLE 30

| | MATERIAL RATIO (WT %) | | | | ANALYTICAL VALUE (WT %) | | | | HALF-WIDTH (°) | CAPACITY RETENTION RATIO (%) |
|---|---|---|---|---|---|---|---|---|---|---|
| | Co | Sn | C | Fe | Co | Sn | C | F | | |
| EXAMPLE 27-1 | 33.0 | 56.2 | 10.0 | 0.8 | 32.7 | 55.6 | 9.9 | 0.8 | 1.0 | 39 |
| EXAMPLE 27-2 | 33.0 | 56.2 | 10.0 | 0.8 | 32.7 | 55.6 | 9.9 | 0.8 | 1.2 | 46 |
| EXAMPLE 27-3 | 33.0 | 56.2 | 10.0 | 0.8 | 32.7 | 55.6 | 9.9 | 0.8 | 1.5 | 49 |
| EXAMPLE 27-4 | 33.0 | 56.2 | 10.0 | 0.8 | 32.7 | 55.6 | 9.9 | 0.8 | 2.0 | 53 |
| EXAMPLE 27-5 | 33.0 | 56.2 | 10.0 | 0.8 | 32.7 | 55.6 | 9.9 | 0.8 | 3.0 | 58 |
| EXAMPLE 27-6 | 33.0 | 56.2 | 10.0 | 0.8 | 32.7 | 55.6 | 9.9 | 0.8 | 4.0 | 67 |
| EXAMPLE 28-1 | 25.6 | 43.6 | 30.0 | 0.8 | 25.3 | 43.2 | 29.7 | 0.8 | 1.0 | 41 |
| EXAMPLE 28-2 | 25.6 | 43.6 | 30.0 | 0.8 | 25.3 | 43.2 | 29.7 | 0.8 | 1.2 | 44 |
| EXAMPLE 28-3 | 25.6 | 43.6 | 30.0 | 0.8 | 25.3 | 43.2 | 29.7 | 0.8 | 1.5 | 46 |
| EXAMPLE 28-4 | 25.6 | 43.6 | 30.0 | 0.8 | 25.3 | 43.2 | 29.7 | 0.8 | 2.0 | 50 |
| EXAMPLE 28-5 | 25.6 | 43.6 | 30.0 | 0.8 | 25.3 | 43.2 | 29.7 | 0.8 | 3.0 | 53 |
| EXAMPLE 28-6 | 25.6 | 43.6 | 30.0 | 0.8 | 25.3 | 43.2 | 29.7 | 0.8 | 4.0 | 57 |

$\frac{Co}{Sn+Co} = 37$ wt %

The analysis of the composition and the measurement of the half-width of a diffraction peak having a broad half-width observed within a range of 2θ=20° to 50° were performed on the anode active materials of Examples 27-1 through 27-6 and 28-1 through 28-6 as in the case of Examples 23-1 through 23-7. The results are shown in Table 30. Further, when the XPS measurement was performed, and the obtained peaks were analyzed, as in the case of Examples 23-1 through 23-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured as in the case of Examples 23-1 through 23-7. The results are shown in Table 30.

It was obvious from Table 30 that in Examples 27-1 through 27-6 and 28-1 through 28-6, the larger the half-width was, the more the capacity retention ratio was improved. In other words, it was found out that when the half-width of the diffraction peak had a larger reactive phase, the cycle characteristics could be improved.

Examples 29-1 Through 29-9

Secondary batteries were formed as in the case of Examples 23-1 through 23-7, except that anode active materials in which the material ratio of cobalt, tin, iron and carbon was changed as shown in Table 31 were synthesized. More specifically, the material ratio of iron was changed within a range from 0.1 wt % to 7.0 wt % inclusive. The Co/(Sn+Co) ratio was fixed to 37 wt %, and the material ratio of carbon was fixed to 20 wt %.

TABLE 31

| | MATERIAL RATIO (WT %) | | | | ANALYTICAL VALUE (WT %) | | | | HALF-WIDTH (°) | INITIAL CHARGE CAPACITY (mAh/cm³) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|---|
| | Co | Sn | C | Fe | Co | Sn | C | Fe | | | | | |
| EXAMPLE 29-1 | 29.6 | 50.3 | 20 | 0.1 | 29.3 | 49.8 | 19.8 | 0.1 | 48 | 525 | 140 | 98 | 70 |
| EXAMPLE 29-2 | 29.5 | 50.3 | 20 | 0.2 | 29.2 | 49.8 | 19.8 | 0.2 | 48 | 523 | 140 | 98 | 70 |
| EXAMPLE 29-3 | 29.5 | 50.2 | 20 | 0.3 | 29.2 | 49.7 | 19.8 | 0.3 | 48 | 520 | 139 | 100 | 72 |
| EXAMPLE 23-5 | 29.3 | 49.9 | 20 | 0.8 | 29.0 | 49.4 | 19.8 | 0.8 | 48 | 518 | 139 | 101 | 73 |
| EXAMPLE 29-4 | 29.2 | 49.8 | 20 | 1.0 | 28.9 | 49.3 | 19.8 | 1.0 | 48 | 517 | 139 | 103 | 74 |
| EXAMPLE 29-5 | 28.5 | 48.5 | 20 | 3.0 | 28.2 | 48.0 | 19.8 | 3.0 | 48 | 506 | 138 | 105 | 76 |
| EXAMPLE 29-6 | 27.8 | 47.3 | 20 | 5.0 | 27.5 | 46.8 | 19.8 | 5.0 | 48 | 491 | 131 | 102 | 78 |
| EXAMPLE 29-7 | 27.4 | 46.6 | 20 | 6.0 | 27.1 | 46.2 | 19.8 | 5.9 | 48 | 476 | 127 | 100 | 79 |
| EXAMPLE 29-8 | 27.2 | 46.3 | 20 | 6.5 | 26.9 | 45.8 | 19.8 | 6.4 | 48 | 452 | 117 | 94 | 80 |
| EXAMPLE 29-9 | 27.0 | 46.0 | 20 | 7.0 | 26.7 | 45.5 | 19.8 | 6.9 | 48 | 411 | 109 | 88 | 81 |

$\frac{Co}{Sn+Co} = 37$ wt %

The analysis of the composition and the measurement of the half-width of a diffraction peak having a broad half-width observed within a range of 2θ=20° to 50° were performed on the anode active materials of Examples 29-1 through 29-9 as in the case of Examples 23-1 through 23-7. The results are shown in Table 31. Further, when the XPS measurement was performed, and the obtained peaks were analyzed, as in the case of Examples 23-1 through 23-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element.

Moreover, the initial charge capacities and the cycle characteristics of the secondary batteries were measured. The results are shown in Table 31 and FIG. 24.

Figure 24:
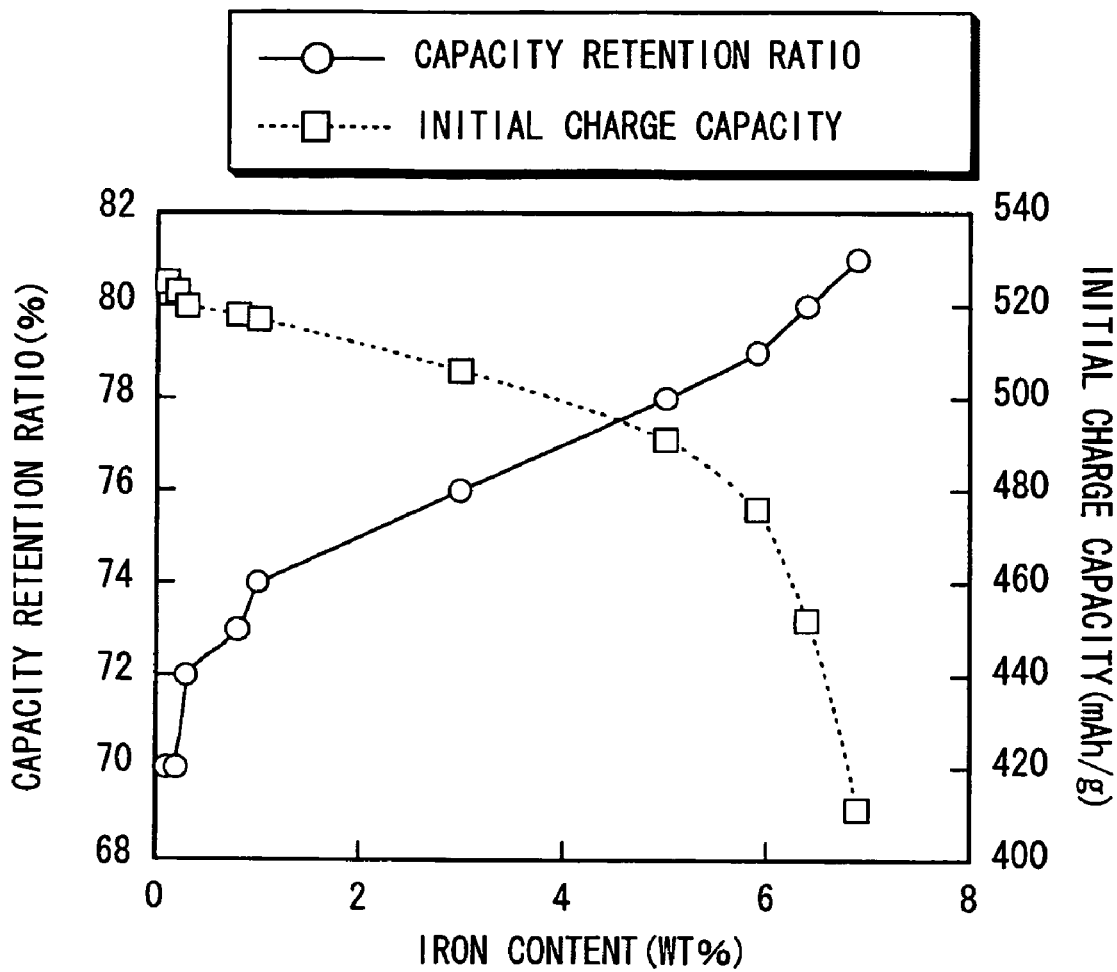
FIG. 24 is a plot showing a relationship between the iron content in an anode active material, a capacity retention ratio and an initial charge capacity.

It was obvious from Table 31 and FIG. 24 that in Examples 29-3 through 29-7 in which the iron content was within a range from 0.3 wt % to 5.9 wt % inclusive, the capacity retention ratio could be improved, compared to Examples 29-1 and 29-2 in which the iron content was less than 0.3 wt %, and the initial charge capacity could be increased, compared to Examples 29-8 and 29-9 in which the iron content was larger than 5.9 wt %.

In other words, it was found out that when the iron content was within a range from 0.3 wt % to 5.9 wt % inclusive, the capacity and the cycle characteristics could be improved.

Examples 30-1 Through 30-11

Anode active materials and secondary batteries were formed as in the case of Examples 23-1 through 23-7, except that silicon powder was further used as a material, and the material ratio of cobalt, tin, iron, carbon and silicon was changed as shown in Table 32. More specifically, the material ratio of the silicon powder was changed within a range from 0.3 wt % to 10.0 wt % inclusive, and the Co/(Sn+Co) ratio, the material ratio of iron and the material ratio of carbon were fixed. The analysis of the composition was preformed on the secondary batteries of Examples 30-1 through 30-11 as in the case of Examples 23-1 through 23-7. The results are shown in Table 32. The silicon content was measured by ICP emission spectrometry. Moreover, when the XPS measurement was performed, and the obtained peaks were analyzed, as in the case of Examples 23-1 through 23-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured. The results are shown in Table 33.

TABLE 32

| | MATERIAL RATIO (WT %) | | | | | | ANALYTICAL VALUE (WT%) | | | | | |
|---|---|---|---|---|---|---|---|---|---|---|---|---|
| | Co | Sn | C | Fe | Si | Sn + Si | Co | Sn | C | Fe | Si | Sn + |
| EXAMPLE 23-5 | 29.3 | 49.9 | 20.0 | 0.8 | 0 | 49.9 | 29.0 | 49.4 | 19.8 | 0.8 | 0 | 49.4 |
| EXAMPLE 30-1 | 29.2 | 49.7 | 20.0 | 0.8 | 0.3 | 50.0 | 28.9 | 49.2 | 19.8 | 0.8 | 0.3 | 49.5 |
| EXAMPLE 30-2 | 29.1 | 49.6 | 20.0 | 0.8 | 0.5 | 50.1 | 28.8 | 49.1 | 19.8 | 0.8 | 0.5 | 49.6 |
| EXAMPLE 30-3 | 28.9 | 49.3 | 20.0 | 0.8 | 1.0 | 50.3 | 28.6 | 48.8 | 19.8 | 0.8 | 1.0 | 49.8 |
| EXAMPLE 30-4 | 28.6 | 48.6 | 20.0 | 0.8 | 2.0 | 50.6 | 28.3 | 48.1 | 19.8 | 0.8 | 2.0 | 50.1 |
| EXAMPLE 30-5 | 27.8 | 47.4 | 20.0 | 0.8 | 4.0 | 51.4 | 27.5 | 46.9 | 19.8 | 0.8 | 4.0 | 50.9 |
| EXAMPLE 30-6 | 27.1 | 46.1 | 20.0 | 0.8 | 6.0 | 52.1 | 26.8 | 45.7 | 19.8 | 0.8 | 5.9 | 51.6 |
| EXAMPLE 30-7 | 26.7 | 45.5 | 20.0 | 0.8 | 7.0 | 52.5 | 26.4 | 45.0 | 19.8 | 0.8 | 6.9 | 52.0 |
| EXAMPLE 30-8 | 26.3 | 44.9 | 20.0 | 0.8 | 8.0 | 52.9 | 26.1 | 44.4 | 19.8 | 0.8 | 7.9 | 52.3 |
| EXAMPLE 30-9 | 26.2 | 44.5 | 20.0 | 0.8 | 8.5 | 53.0 | 25.9 | 44.1 | 19.8 | 0.8 | 8.4 | 52.5 |
| EXAMPLE 30-10 | 26.0 | 44.2 | 20.0 | 0.8 | 9.0 | 53.2 | 25.7 | 43.8 | 19.8 | 0.8 | 8.9 | 52.7 |
| EXAMPLE 30-11 | 25.6 | 43.6 | 20.0 | 0.8 | 10.0 | 53.6 | 25.3 | 43.2 | 19.8 | 0.8 | 9.9 | 53.1 |

$$\frac{Co}{Sn+Co} = 37 \text{ wt }\%$$

TABLE 33

| | INITIAL CHARGE CAPACITY (mAh/g) | DISCHARGE CAPACITY IN SECOND CYCLE (mAh/cm$^3$) | DISCHARGE CAPACITY IN 300TH CYCLE (mAh/cm$^3$) | CAPACITY RETENTION RATIO (%) |
|---|---|---|---|---|
| EXAMPLE 23-5 | 518 | 139 | 101 | 73 |
| EXAMPLE 30-1 | 519 | 140 | 102 | 73 |
| EXAMPLE 30-2 | 525 | 142 | 100 | 71 |
| EXAMPLE 30-3 | 544 | 144 | 101 | 70 |
| EXAMPLE 30-4 | 556 | 146 | 99 | 68 |
| EXAMPLE 30-5 | 570 | 147 | 98 | 67 |
| EXAMPLE 30-6 | 586 | 152 | 101 | 66 |
| EXAMPLE 30-7 | 603 | 156 | 101 | 65 |
| EXAMPLE 30-8 | 614 | 158 | 93 | 59 |
| EXAMPLE 30-9 | 630 | 158 | 66 | 42 |
| EXAMPLE 30-10 | 653 | 160 | 42 | 26 |
| EXAMPLE 30-11 | 680 | 162 | 19 | 12 |

It was obvious from Tables 32 and 33 that in Examples 30-1 through 30-11 in which silicon was included, the initial charge capacity could be improved, compared to Example 23-5 in which no silicon was included. However, there was a tendency that the capacity retention ration declined with increasing the silicon content.

In other words, it was found out that when silicon was included in the anode active material, the capacity could be improved, and the silicon content was preferably within a range from 0.5 wt % to 7.9 wt % inclusive.

of C1s in the anode active material were obtained, and the peak P3 was obtained in a region lower that 284.5 eV in each example. In other words, it was confirmed that at least a part of carbon included in the anode active material was coupled to another element. Moreover, the initial charge capacities and the cycle characteristics of the secondary batteries were measured in the same manner. The results are shown in Table 34 and FIG. 25.

TABLE 34

|  | MATERIAL RATIO (WT %) | | | | | ANALYTICAL VALUE (WT %) | | | | | INITIAL CHARGE CAPACITY | DISCHARGE CAPACITY IN SECOND CYCLE | DISCHARGE CAPACITY IN 300TH CYCLE | CAPACITY RETENTION RATIO |
|---|---|---|---|---|---|---|---|---|---|---|---|---|---|---|
|  | Co | Sn | C | Fe | Ti | Co | Sn | C | Fe | Ti | (mAh/g) | (mAh/cm$^3$) | (mAh/cm$^3$) | (%) |
| EXAMPLE 31-1 | 27.7 | 51.5 | 20.0 | 0.8 | 0 | 27.4 | 51.0 | 19.8 | 0.8 | 0 | 525 | 139 | 101 | 73 |
| EXAMPLE 31-2 | 27.3 | 50.7 | 20.0 | 0.8 | 1.2 | 27.0 | 50.2 | 19.8 | 0.8 | 1.2 | 541 | 142 | 104 | 74 |
| EXAMPLE 31-3 | 26.9 | 49.9 | 20.0 | 0.8 | 2.4 | 26.6 | 49.4 | 19.8 | 0.8 | 2.4 | 550 | 145 | 117 | 81 |
| EXAMPLE 31-4 | 26.3 | 48.9 | 20.0 | 0.8 | 4.0 | 26.1 | 48.4 | 19.8 | 0.8 | 4.0 | 555 | 146 | 126 | 86 |
| EXAMPLE 31-5 | 25.9 | 48.2 | 20.0 | 0.8 | 5.1 | 25.7 | 47.7 | 19.8 | 0.8 | 5.0 | 56.2 | 146 | 128 | 88 |
| EXAMPLE 31-6 | 25.1 | 46.6 | 20.0 | 0.8 | 7.5 | 24.8 | 46.1 | 19.8 | 0.8 | 7.4 | 568 | 147 | 128 | 87 |
| EXAMPLE 31-7 | 24.2 | 45.0 | 20.0 | 0.8 | 10.0 | 24.0 | 44.5 | 19.8 | 0.8 | 9.9 | 565 | 146 | 128 | 88 |
| EXAMPLE 31-8 | 23.2 | 43.0 | 20.0 | 0.8 | 13.0 | 22.9 | 42.6 | 19.8 | 0.8 | 12.9 | 559 | 142 | 124 | 87 |
| EXAMPLE 31-9 | 22.5 | 41.7 | 20.0 | 0.8 | 15.0 | 22.2 | 41.3 | 19.8 | 0.8 | 14.9 | 535 | 140 | 115 | 82 |
| EXAMPLE 31-10 | 22.1 | 41.1 | 20.0 | 0.8 | 16.0 | 21.9 | 40.7 | 19.8 | 0.8 | 15.8 | 494 | 129 | 92 | 71 |

$\frac{Co}{Sn+Co} = 35$ wt %

Examples 31-1 Through 31-10

In Example 31-1, an anode active material was synthesized, and a secondary battery was formed as in the case of Examples 23-1 through 23-7, except that the material ratio of cobalt, tin, iron and carbon was changed as shown in Table 34. In Examples 31-2 through 31-10, anode active materials were synthesized, and secondary batteries were formed as in the case of Examples 23-1 through 23-7, except that cobalt powder, tin powder, iron powder, carbon powder and titanium powder were prepared as materials, and the material ratio of them was changed as shown in Table 34. More specifically, the material ratio of titanium was changed within a range from 0 wt % to 16.0 wt % inclusive, and the Co/(Sn+Co) ratio, the material ratio of iron and the material ratio of carbon were fixed. Moreover, the anode active materials were synthesized through alloying the cobalt powder, the tin powder, the iron powder and the titanium powder to form cobalt-tin-iron-titanium alloy powder, and then mixing the carbon powder to the alloy powder. The analysis of the composition was performed on the anode active materials of Examples 31-1 through 31-10 as in the case of Examples 23-1 through 23-7. The results are shown in Table 34. The titanium content was measured by ICP emission spectrometry. Further, when the XPS measurement was performed, and the obtained peaks were analyzed, as in the case of Examples 23-1 through 23-7, the peak P2 of surface contamination carbon and the peak P3

Figure 25:
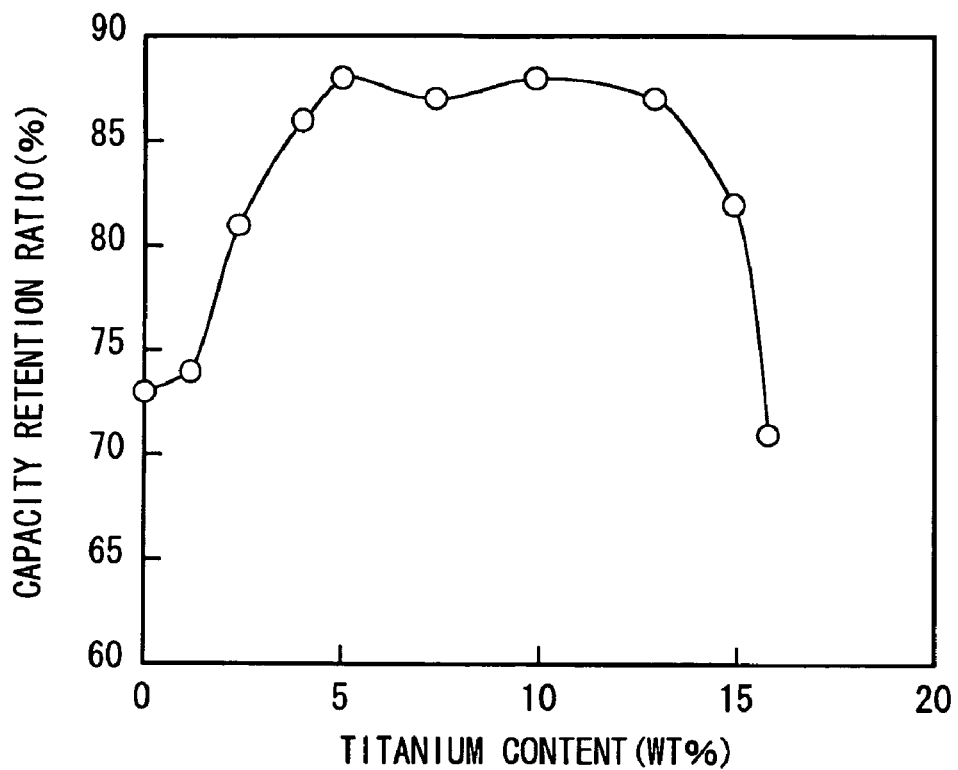
FIG. 25 is another plot showing a relationship between the titanium content in an anode active material and a capacity retention ratio.

It was obvious from Table 34 and FIG. 25 that in Examples 31-2 through 31-9 in which titanium was included within a range of 14.9 wt % or less, the capacity retention ratio could be improved, compared to Example 31-1 in which no titanium was included, and Example 31-10 in which titanium exceeding 14.9 wt % was included. Moreover, when the titanium content was equal to or higher than 2.4 wt %, more specifically within a range from 4.0 wt % to 12.9 wt % inclusive, a higher value could be obtained.

In other words, it was found out that when titanium of 14.9 wt % or less was included in the anode active material, the cycle characteristics could be further improved, and specifically titanium was more preferably included within a range from 4.0 wt % to 12.9 wt % inclusive.

Examples 32-1 Through 32-9

Anode active materials were synthesized, and secondary batteries were formed as in the case of Examples 23-1 through 23-7, except that cobalt powder, tin powder, iron powder, carbon powder and bismuth powder were prepared as materials, and the material ratio of them was changed as shown in Table 35. More specifically, the material ratio of bismuth was changed within a range from 1.2 wt % to 16.0 wt % inclusive, and the Co/(Sn+Co) ratio, the material ratio of iron and the material ratio of carbon were fixed. Moreover, the anode active materials were synthesized through alloying the cobalt powder, the tin powder, the iron powder and the bismuth powder to form cobalt-tin-iron-bismuth alloy powder, and then mixing carbon powder to the alloy powder. The analysis of the composition was performed on the anode active materials as in the case of Examples 23-1 through 23-7. The results are shown in Table 35. The bismuth content was measured by ICP emission spectrometry. Further, when the XPS measurement was performed, and the obtained peaks were analyzed, as in the case of Examples 23-1 through 23-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured in the same manner. The results are shown in Table 35 and FIG. 26.

lium powder, phosphorus powder, or aluminum powder and phosphorus powder were used as materials, and the material ratio of cobalt, tin, iron, carbon, and molybdenum, niobium, aluminum, germanium, indium, gallium, phosphorus, or aluminum and phosphorus was changed as shown in Table 36. More specifically, the material ratio of molybdenum, niobium, aluminum, germanium, indium, gallium, phosphorus, or aluminum and phosphorus was 3.0 wt %, 4.0 wt %, 5.0 wt % or 6.0 wt %, and the Co/(Sn+Co) ratio was fixed to 35 wt %, and the material ratio of iron was fixed to 0.8 wt %. Moreover, the anode active material were synthesized through alloying the cobalt powder, the tin powder and the iron powder to form cobalt-tin-iron alloy powder, and then mixing the carbon powder, and the molybdenum powder, the niobium powder, the aluminum powder, the germanium powder, the indium powder, the gallium powder, the phosphorus powder, or the aluminum powder and the phosphorus powder to the alloy

TABLE 35

| | MATERIAL RATIO (WT %) | | | | | ANALYTICAL VALUE (WT %) | | | | | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|---|---|
| | Co | Sn | C | Fe | Bi | Co | Sn | C | Fe | Bi | | | | |
| EXAMPLE 31-1 | 27.7 | 51.5 | 20.0 | 0.8 | 0 | 27.4 | 51.0 | 19.8 | 0.8 | 0 | 525 | 139 | 101 | 73 |
| EXAMPLE 32-1 | 27.3 | 50.7 | 20.0 | 0.8 | 1.2 | 27.0 | 50.2 | 19.8 | 0.8 | 1.2 | 520 | 137 | 99 | 74 |
| EXAMPLE 32-2 | 26.9 | 49.9 | 20.0 | 0.8 | 2.4 | 26.6 | 49.4 | 19.8 | 0.8 | 2.4 | 519 | 137 | 104 | 76 |
| EXAMPLE 32-3 | 26.3 | 48.9 | 20.0 | 0.8 | 4.0 | 26.1 | 48.4 | 19.8 | 0.8 | 4.0 | 519 | 137 | 108 | 79 |
| EXAMPLE 32-4 | 25.9 | 48.2 | 20.0 | 0.8 | 5.1 | 25.7 | 47.7 | 19.8 | 0.8 | 5.0 | 515 | 138 | 117 | 85 |
| EXAMPLE 32-5 | 25.1 | 46.6 | 20.0 | 0.8 | 7.5 | 24.8 | 46.1 | 19.8 | 0.8 | 7.4 | 512 | 136 | 120 | 88 |
| EXAMPLE 32-6 | 24.2 | 45.0 | 20.0 | 0.8 | 10.0 | 24.0 | 44.5 | 19.8 | 0.8 | 9.9 | 509 | 136 | 122 | 90 |
| EXAMPLE 32-7 | 23.2 | 43.0 | 20.0 | 0.8 | 13.0 | 22.9 | 42.6 | 19.8 | 0.8 | 12.9 | 505 | 135 | 120 | 89 |
| EXAMPLE 32-8 | 22.5 | 41.7 | 20.0 | 0.8 | 15.0 | 22.2 | 41.3 | 19.8 | 0.8 | 14.9 | 503 | 135 | 115 | 85 |
| EXAMPLE 32.9 | 22.1 | 41.1 | 20.0 | 0.8 | 16.0 | 21.9 | 40.7 | 19.8 | 0.8 | 15.8 | 492 | 130 | 91 | 70 |

$$\frac{Co}{Sn+Co} = 35 \text{ wt \%}$$

Figure 26:
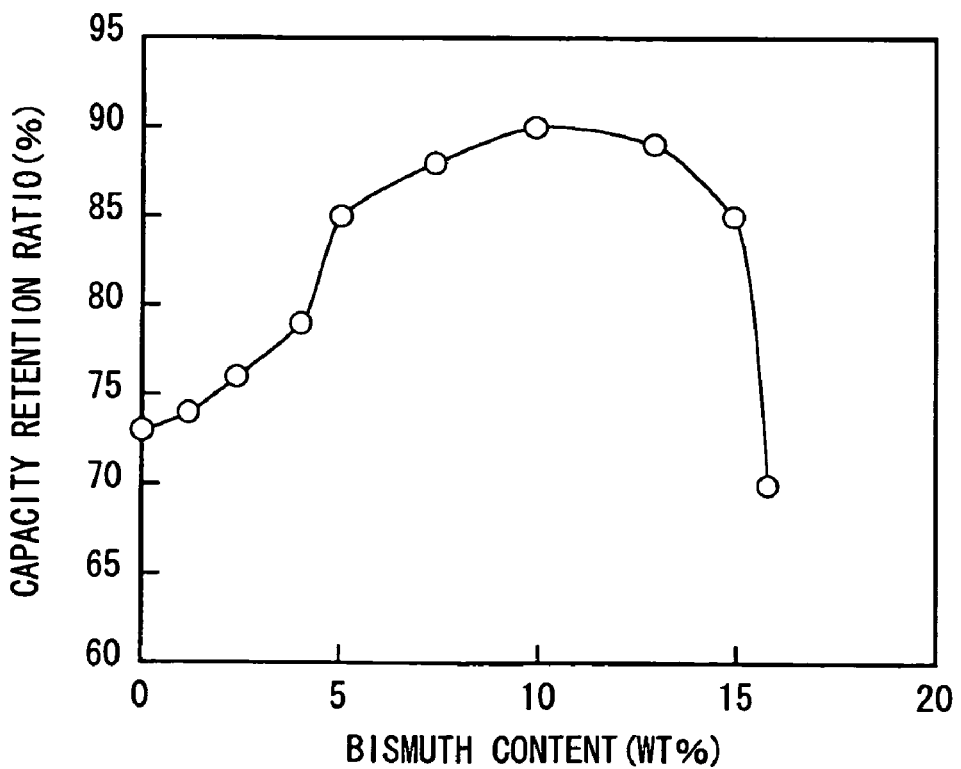
FIG. 26 is another plot showing a relationship between the bismuth content in an anode active material and a capacity retention ratio.

As shown in Table 35 and FIG. 26, in Examples 32-1 through 32-9 in which bismuth was added, the same results as those in Examples 31-2 through 31-10 in which titanium was added were obtained. In other words, it was found out that in the case where bismuth was included in the anode active material within a range from 14.9 wt % or less, the cycle characteristics can be further improved, and bismuth was more preferably included within a range of 4.0 wt % or more.

Examples 33-1 Through 33-14

Anode active materials were synthesized, and secondary batteries were formed as in the case of Examples 23-1 through 23-7, except that cobalt powder, tin powder, iron powder, carbon powder, and molybdenum powder, niobium powder, aluminum powder, germanium powder, indium powder, gallium powder, phosphorus powder, or aluminum powder and phosphorus powder were used as materials, and the material ratio of cobalt, tin, iron, carbon, and molybdenum, niobium, aluminum, germanium, indium, gallium, phosphorus, or aluminum and phosphorus was changed as shown in Table 36. The analysis of the composition was performed on the anode active materials of Examples 33-1 through 33-14 as in the case of Examples 23-1 through 23-7. The results are shown in Table 36. The contents of molybdenum, niobium, aluminum, germanium, indium, gallium and phosphorus were measured by ICP emission spectrometry. Further when the XPS measurement was performed, and the obtained peaks were analyzed, as in the case of Examples 23-1 through 23-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured in the same manner. The results are shown in Table 37.

TABLE 36

| | MATERIAL RATIO (WT %) | | | | | | | | | | |
|---|---|---|---|---|---|---|---|---|---|---|---|
| | Co | Sn | C | Fe | Mo | Nb | Al | Ge | In | Ga | P |
| EXAMPLE 31-1 | 27.7 | 51.5 | 20 | 0.8 | — | — | — | — | — | — | — |
| EXAMPLE 33-1 | 26.3 | 48.9 | 20 | 0.8 | 4.0 | — | — | — | — | — | — |
| EXAMPLE 33-2 | 26.3 | 48.9 | 18 | 0.8 | 6.0 | — | — | — | — | — | — |
| EXAMPLE 33-3 | 26.3 | 48.9 | 20 | 0.8 | — | 4.0 | — | — | — | — | — |
| EXAMPLE 33-4 | 26.7 | 49.5 | 18 | 0.8 | — | 5.0 | — | — | — | — | — |
| EXAMPLE 33-5 | 26.0 | 48.2 | 19 | 0.8 | — | 6.0 | — | — | — | — | — |
| EXAMPLE 33-6 | 27.0 | 50.2 | 18 | 0.8 | — | — | 4.0 | — | — | — | — |
| EXAMPLE 33-7 | 25.6 | 47.6 | 20 | 0.8 | — | — | 6.0 | — | — | — | — |
| EXAMPLE 33-8 | 25.6 | 47.6 | 20 | 0.8 | — | — | — | 6.0 | — | — | — |
| EXAMPLE 33-9 | 27.4 | 50.8 | 18 | 0.8 | — | — | — | — | 3.0 | — | — |
| EXAMPLE 33-10 | 27.0 | 50.2 | 18 | 0.8 | — | — | — | — | 4.0 | — | — |
| EXAMPLE 33-11 | 25.6 | 47.6 | 20 | 0.8 | — | — | — | — | 6.0 | — | — |
| EXAMPLE 33-12 | 25.6 | 47.6 | 20 | 0.8 | — | — | — | — | — | 6.0 | — |
| EXAMPLE 33-13 | 27.4 | 50.8 | 18 | 0.8 | — | — | — | — | — | — | 3.0 |
| EXAMPLE 33-14 | 25.6 | 47.6 | 20 | 0.8 | — | — | 4.0 | — | — | — | 2.0 |

| | ANALYTICAL VALUE (WT %) | | | | | | | | | | |
|---|---|---|---|---|---|---|---|---|---|---|---|
| | Co | Sn | C | Fe | Mo | Nb | Al | Ge | In | Ga | P |
| EXAMPLE 31-1 | 27.4 | 51.0 | 19.8 | 0.8 | — | — | — | — | — | — | — |
| EXAMPLE 33-1 | 26.1 | 48.4 | 19.8 | 0.8 | 4.0 | — | — | — | — | — | — |
| EXAMPLE 33-2 | 26.1 | 48.4 | 17.8 | 0.8 | 5.9 | — | — | — | — | — | — |
| EXAMPLE 33-3 | 26.1 | 48.4 | 19.8 | 0.8 | — | 4.0 | — | — | — | — | — |
| EXAMPLE 33-4 | 26.4 | 49.0 | 17.8 | 0.8 | — | 5.0 | — | — | — | — | — |
| EXAMPLE 33-5 | 25.7 | 47.7 | 18.8 | 0.8 | — | 5.9 | — | — | — | — | — |
| EXAMPLE 33-6 | 26.7 | 49.7 | 17.8 | 0.8 | — | — | 4.0 | — | — | — | — |
| EXAMPLE 33-7 | 25.4 | 47.1 | 19.8 | 0.8 | — | — | 5.9 | — | — | — | — |
| EXAMPLE 33-8 | 25.4 | 47.1 | 19.8 | 0.8 | — | — | — | 5.9 | — | — | — |
| EXAMPLE 33-9 | 27.1 | 50.3 | 17.8 | 0.8 | — | — | — | — | 3.0 | — | — |
| EXAMPLE 33-10 | 26.7 | 49.7 | 17.8 | 0.8 | — | — | — | — | 4.0 | — | — |
| EXAMPLE 33-11 | 25.4 | 47.1 | 19.8 | 0.8 | — | — | — | — | 5.9 | — | — |
| EXAMPLE 33-12 | 25.4 | 47.1 | 19.8 | 0.8 | — | — | — | — | — | 5.9 | — |
| EXAMPLE 33-13 | 27.1 | 50.3 | 17.8 | 0.8 | — | — | — | — | — | — | 3.0 |
| EXAMPLE 33-14 | 25.4 | 47.1 | 19.8 | 0.8 | — | — | 3.9 | — | — | — | 1.9 |

$$\frac{Co}{Sn+Co} = 35 \text{ wt \%}$$

TABLE 37

|  | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|
| EXAMPLE 31-1 | 525 | 139 | 101 | 73 |
| EXAMPLE 33-1 | 505 | 136 | 112 | 82 |
| EXAMPLE 33-2 | 503 | 138 | 115 | 83 |
| EXAMPLE 33-3 | 531 | 140 | 120 | 86 |
| EXAMPLE 33-4 | 526 | 139 | 118 | 85 |
| EXAMPLE 33-5 | 527 | 138 | 117 | 85 |
| EXAMPLE 33-6 | 551 | 141 | 114 | 81 |
| EXAMPLE 33-7 | 547 | 143 | 120 | 84 |
| EXAMPLE 33-8 | 536 | 142 | 118 | 83 |
| EXAMPLE 33-9 | 536 | 139 | 114 | 82 |
| EXAMPLE 33-10 | 539 | 139 | 115 | 83 |
| EXAMPLE 33-11 | 544 | 144 | 124 | 86 |
| EXAMPLE 33-12 | 519 | 137 | 115 | 84 |
| EXAMPLE 33-13 | 535 | 141 | 114 | 81 |
| EXAMPLE 33-14 | 554 | 146 | 117 | 80 |

As shown in Tables 36 and 37, in Examples 33-1 through 33-14, the cycle characteristics could be improved as in the case of Examples 31-2 through 31-10 and 32-1 through 32-9. In other words, it was found out that when the anode active material included at least one kind selected from the group consisting of molybdenum, niobium, aluminum, germanium, indium, gallium and phosphorus, the cycle characteristics could be further improved.

Examples 34-1~34-8

Anode active materials were synthesized, and secondary batteries were formed as in the case of Examples 23-1 through 23-7, except that cobalt powder, tin powder, iron powder, carbon powder, silicon powder, titanium powder and indium powder were prepared as materials, and the material ratio of them was changed as shown in Table 38. More specifically, the material ratio of titanium, or titanium and indium was changed within a range from 0 wt % to 10.0 wt % inclusive, and the Co/(Sn+Co) ratio, the material ratio of iron, the material ratio of carbon and the material ratio of silicon were fixed.

Moreover, the anode active materials were synthesized through alloying the cobalt powder, the tin powder, the iron powder and titanium powder, or the cobalt powder, the tin powder, the iron powder, the titanium powder and the indium powder to form cobalt-tin-iron-titanium alloy powder, or cobalt-tin-iron-titanium-indium alloy powder, and then mixing the carbon powder and the silicon powder to the alloy powder. The analysis of the composition was performed on the anode active materials of Examples 34-1 through 34-8 as in the case of Examples 23-1 through 23-7. The results are shown in Table 39. Further, when the XPS measurement was performed, and the obtained peaks were analyzed, as in the case of Examples 23-1 through 23-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element. Moreover, the initial charge capacities and the cycle characteristics of the secondary batteries were measured in the same manner. The results are shown in Table 39.

TABLE 38

| | MATERIAL RATIO (WT %) | | | | | | | ANALYTICAL VALUE (WT %) | | | | | | |
|---|---|---|---|---|---|---|---|---|---|---|---|---|---|---|
| | Co | Sn | C | Fe | Si | Ti | In | Co | Sn | C | Fe | Si | Ti | In |
| EXAMPLE 31-1 | 27.7 | 51.5 | 20.0 | 0.8 | — | — | — | 27.4 | 51.0 | 19.8 | 0.8 | — | — | — |
| EXAMPLE 34-1 | 27.4 | 50.8 | 18.0 | 0.8 | 3.0 | — | — | 27.1 | 50.3 | 17.8 | 0.8 | 3.0 | — | — |
| EXAMPLE 34-2 | 26.0 | 48.2 | 18.0 | 0.8 | 3.0 | 4.0 | — | 25.7 | 47.7 | 17.8 | 0.8 | 3.0 | 4.0 | — |
| EXAMPLE 34-3 | 25.6 | 47.5 | 18.0 | 0.8 | 3.0 | 5.1 | — | 25.3 | 47.0 | 17.8 | 0.8 | 3.0 | 5.0 | — |
| EXAMPLE 34-4 | 24.7 | 46.0 | 18.0 | 0.8 | 3.0 | 7.5 | — | 24.5 | 45.5 | 17.8 | 0.8 | 3.0 | 7.4 | — |
| EXAMPLE 34-5 | 26.0 | 48.2 | 18.0 | 0.8 | 3.0 | 2.6 | 1.4 | 25.7 | 47.7 | 17.8 | 0.8 | 3.0 | 2.6 | 1.4 |
| EXAMPLE 34-6 | 25.6 | 47.5 | 18.0 | 0.8 | 3.0 | 3.7 | 1.4 | 25.3 | 47.0 | 17.8 | 0.8 | 3.0 | 3.7 | 1.4 |
| EXAMPLE 34-7 | 24.7 | 46.0 | 18.0 | 0.8 | 3.0 | 6.1 | 1.4 | 24.5 | 45.5 | 17.8 | 0.8 | 3.0 | 6.0 | 1.4 |
| EXAMPLE 34-8 | 23.9 | 4.43 | 18.0 | 0.8 | 3.0 | 8.6 | 1.4 | 23.6 | 43.9 | 17.8 | 0.8 | 3.0 | 8.4 | 1.4 |

$$\frac{Co}{Sn+Co} = 35 \text{ wt \%}$$

TABLE 39

|  | INITIAL CHARGE CAPACITY (mAh/g) | DISCHARGE CAPACITY IN SECOND CYCLE (mAh/cm$^3$) | DISCHARGE CAPACITY IN 300TH CYCLE (mAh/cm$^3$) | CAPACITY RETENTION RATIO (%) |
|---|---|---|---|---|
| EXAMPLE 31-1 | 525 | 139 | 101 | 73 |
| EXAMPLE 34-1 | 563 | 147 | 100 | 68 |
| EXAMPLE 34-2 | 587 | 148 | 114 | 77 |
| EXAMPLE 34-3 | 594 | 149 | 118 | 79 |
| EXAMPLE 34-4 | 597 | 150 | 117 | 78 |
| EXAMPLE 34-5 | 583 | 147 | 116 | 79 |
| EXAMPLE 34-6 | 592 | 149 | 116 | 78 |
| EXAMPLE 34-7 | 594 | 149 | 118 | 79 |
| EXAMPLE 34-8 | 587 | 148 | 112 | 76 |

It was obvious from Tables 38 and 39 that in Examples 34-2 through 34-8 in which in addition to silicon, titanium, or titanium and indium were added, the initial charge capacity and the capacity retention ratio could be further improved, compared to Examples 31-1 and 34-1 in which they were not included.

In other words, it was found out that when at least one kind selected from the group consisting of titanium, molybdenum, niobium, aluminum, germanium, indium, gallium, phosphorus and bismuth, and silicon were included in the anode active material, the capacity and the cycle characteristics could be further improved.

Examples 35-1 Through 35-8

Anode active materials were synthesized as in the case of Examples 23-1 through 23-7, except that cobalt powder, tin powder, iron powder, carbon powder, silicon powder and titanium powder were prepared as materials, and after the cobalt powder, the tin powder and the iron powder, or the cobalt powder, the tin powder, the iron powder and the titanium powder were alloyed to form cobalt-tin-iron alloy powder or cobalt-tin-iron-titanium alloy powder, the carbon powder, or the carbon powder and the silicon powder were mixed to the alloy powder. At that time, the material ratio was changed as shown in Table 40. Moreover, cylindrical secondary batteries shown in FIG. 1 were formed as in the case of Examples 23-1 through 23-7, except that the anode active materials were used, and the composition of the electrolyte solution was changed in Examples 35-1 through 35-4 and Examples 35-5 through 35-8. At that time, in Examples 35-1 through 35-4, an electrolyte solution in which LiPF$_6$ as the electrolyte salt was dissolved in a mixed solvent including ethylene carbonate, propylene carbonate and dimethyl carbonate at a mass ratio of ethylene carbonate:propylene carbonate:dimethyl carbonate=30:10:60 at a ratio of 1 mol/l was used, and in Examples 35-5 through 35-8, an electrolyte solution in which LiPF$_6$ as the electrolyte salt was dissolved in a mixed solvent including 4-fluoro-1,3-dioxolane-2-one, ethylene carbonate, propylene carbonate and dimethyl carbonate at a mass ratio of 4-fluoro-1,3-dioxolane-2-one:ethylene carbonate:propylene carbonate:dimethyl carbonate=20:10:10:60 at a ratio of 1 mol/l was used. The same anode active material was used in Examples 35-1 and 35-5, Examples 35-2 and 35-6, Examples 35-3 and 35-7 and Examples 35-4 and 35-8.

TABLE 40

|  | MATERIAL RATIO (WT %) | | | | | | ANALYTICAL VALUE (WT %) | | | | | | SOLVENT | CAPACITY RETENTION RATIO (%) |
|---|---|---|---|---|---|---|---|---|---|---|---|---|---|---|
|  | Co | Sn | C | Fe | Si | Ti | Co | Sn | C | Fe | Si | Ti | | |
| EXAMPLE 35-1 | 29.9 | 49.7 | 19.6 | 0.8 | — | — | 29.8 | 49.5 | 19.5 | 0.8 | — | — | EC + PC + DMC | 73 |
| EXAMPLE 35-2 | 28.7 | 47.7 | 18.8 | 0.8 | 4.0 | — | 28.6 | 47.5 | 18.7 | 0.8 | 4.0 | — | EC + PC + DMC | 67 |
| EXAMPLE 35-3 | 28.7 | 47.7 | 18.8 | 0.8 | — | 4.0 | 28.6 | 47.5 | 18.7 | 0.8 | — | 4.0 | EC + PC + DMC | 83 |
| EXAMPLE 35-4 | 28.1 | 46.7 | 18.4 | 0.8 | 4.0 | 2.0 | 28.0 | 46.5 | 18.2 | 0.8 | 4.0 | 2.0 | EC + PC + DMC | 74 |
| EXAMPLE 35-5 | 29.9 | 49.7 | 19.6 | 0.8 | — | — | 29.8 | 49.5 | 19.5 | 0.8 | — | — | FEC + EC + PC + DMC | 87 |
| EXAMPLE 35-6 | 28.7 | 47.7 | 18.8 | 0.8 | 4.0 | — | 28.6 | 47.5 | 18.7 | 0.8 | 4.0 | — | FEC + EC + PC + DMC | 80 |
| EXAMPLE 35-7 | 28.7 | 47.7 | 18.8 | 0.8 | — | 4.0 | 28.6 | 47.5 | 18.7 | 0.8 | — | 4.0 | FEC + EC + PC + DMC | 89 |
| EXAMPLE 35-8 | 28.1 | 46.7 | 18.4 | 0.8 | 4.0 | 2.0 | 28.0 | 46.5 | 18.2 | 0.8 | 4.0 | 2.0 | FEC + EC + PC + DMC | 87 |

EC: ethylene carbonate
PC: propylene carbonate
DMC: dimethyl carbonate
FEC: 4-fluoro-1,3-dioxolane-2-one $$\frac{Co}{Sn+Co} = 37.5 \text{ wt \%}$$

The analysis of the composition was performed on the anode active materials of Examples 35-1 through 35-8 as in the case of Examples 23-1 through 23-7. The results are shown in Table 40. Further, when the XPS measurement was performed, and the obtained peaks were analyzed, as in the case of Examples 23-1 through 23-7, the peak P2 of surface contamination carbon and the peak P3 of C1s in the anode active material were obtained, and the peak P3 was obtained in a region lower than 284.5 eV in each example. In other words, it was confirmed that at least a part of carbon included in the anode active material was coupled to another element.

Moreover, the cycle characteristics of the secondary batteries were measured in the same manner. The results are shown in Table 40.

It was obvious from Table 40 that in Examples 35-5 through 35-8 in which 4-fluoro-1,3-dioxolane-2-one was used as a solvent, the capacity retention ratio could be improved, compared to Examples 35-1 through 35-4 in which 4-fluoro-1,3-dioxolane-2-one was not used.

Examples 36-1 Through 36-18

Cylindrical secondary batteries were formed as in the case of Examples 35-1 and 35-5, except that the composition of the solvent was changed as shown in Table 41. The cycle characteristics of the secondary batteries of Examples 36-1 through 36-18 were measured as in the case of Examples 23-1 through 23-7. The results are shown in Table 41.

be improved irrespective of the composition of the solvent, and specifically when the content of 4-fluoro-1,3-dioxolane-2-one was within a range from 0.1 wt % to 80 wt % inclusive, a higher effect could be obtained.

Examples 37-1 Through 37-6

Cylindrical secondary batteries were formed as in the case of 35-5, except that instead of 4-fluoro-1,3-dioxolane-2-one, another derivative of a cyclic carbonate including a halogen atom was used. At that time, in Example 37-1, 4-difluoro-1,3-dioxolane-2-one was used, in Example 37-2, 4-difluoro-5-fluoro-1,3-dioxolane-2-one was used, in Examples 37-3, 4-chloro-1,3-dioxolane-2-one was used, in Example 37-4, 4-bromo-1,3-dioxolane-2-one was used, in Example 37-5, 4-iodo-1,3-dioxolane-2-one was used, and in Example 37-6, 4-fluoromethyl-1,3-dioxolane-2-one was used.

TABLE 41

| | MATERIAL RATIO (WT %) | | | | ANALYTICAL VALUE (WT %) | | | | SOLVENT (WT %) | | | | CAPACITY RETENTION RATIO |
|---|---|---|---|---|---|---|---|---|---|---|---|---|---|
| | Co | Sn | C | Fe | Co | Sn | C | Fe | FEC | EC | PC | DMC | (%) |
| EXAMPLE 35-1 | 29.9 | 49.7 | 19.6 | 0.8 | 29.8 | 49.5 | 19.5 | 0.8 | 0 | 30.0 | 10.0 | 60.0 | 73 |
| EXAMPLE 36-1 | 29.9 | 49.7 | 19.6 | 0.8 | 29.8 | 49.5 | 19.5 | 0.8 | 0.1 | 29.9 | 10.0 | 60.0 | 74 |
| EXAMPLE 36-2 | 29.9 | 49.7 | 19.6 | 0.8 | 29.8 | 49.5 | 19.5 | 0.8 | 0.5 | 29.5 | 10.0 | 60.0 | 78 |
| EXAMPLE 36-3 | 29.9 | 49.7 | 19.6 | 0.8 | 29.8 | 49.5 | 19.5 | 0.8 | 1.0 | 29.0 | 10.0 | 60.0 | 80 |
| EXAMPLE 36-4 | 29.9 | 49.7 | 19.6 | 0.8 | 29.8 | 49.5 | 19.5 | 0.8 | 5.0 | 25.0 | 10.0 | 60.0 | 82 |
| EXAMPLE 36-5 | 29.9 | 49.7 | 19.6 | 0.8 | 29.8 | 49.5 | 19.5 | 0.8 | 10.0 | 20.0 | 10.0 | 60.0 | 85 |
| EXAMPLE 36-6 | 29.9 | 49.7 | 19.6 | 0.8 | 29.8 | 49.5 | 19.5 | 0.8 | 15.0 | 15.0 | 10.0 | 60.0 | 86 |
| EXAMPLE 35-5 | 29.9 | 49.7 | 19.6 | 0.8 | 29.8 | 49.5 | 19.5 | 0.8 | 20.0 | 10.0 | 10.0 | 60.0 | 87 |
| EXAMPLE 36-7 | 29.9 | 49.7 | 19.6 | 0.8 | 29.8 | 49.5 | 19.5 | 0.8 | 20.0 | 20.0 | 0 | 60.0 | 88 |
| EXAMPLE 36-8 | 29.9 | 49.7 | 19.6 | 0.8 | 29.8 | 49.5 | 19.5 | 0.8 | 25.0 | 5.0 | 10.0 | 60.0 | 89 |
| EXAMPLE 36-9 | 29.9 | 49.7 | 19.6 | 0.8 | 29.8 | 49.5 | 19.5 | 0.8 | 30.0 | 0 | 10.0 | 60.0 | 90 |
| EXAMPLE 36-10 | 29.9 | 49.7 | 19.6 | 0.8 | 29.8 | 49.5 | 19.5 | 0.8 | 30.0 | 10.0 | 0 | 60.0 | 91 |
| EXAMPLE 36-11 | 29.9 | 49.7 | 19.6 | 0.8 | 29.8 | 49.5 | 19.5 | 0.8 | 35.0 | 0 | 5.0 | 60.0 | 92 |
| EXAMPLE 36-12 | 29.9 | 49.7 | 19.6 | 0.8 | 29.8 | 49.5 | 19.5 | 0.8 | 40.0 | 0 | 0 | 60.0 | 94 |
| EXAMPLE 36-13 | 29.9 | 49.7 | 19.6 | 0.8 | 29.8 | 49.5 | 19.5 | 0.8 | 50.0 | 0 | 0 | 50.0 | 91 |
| EXAMPLE 36-14 | 29.9 | 49.7 | 19.6 | 0.8 | 29.8 | 49.5 | 19.5 | 0.8 | 60.0 | 0 | 0 | 40.0 | 88 |
| EXAMPLE 36-15 | 29.9 | 49.7 | 19.6 | 0.8 | 29.8 | 49.5 | 19.5 | 0.8 | 65.0 | 0 | 0 | 35.0 | 85 |
| EXAMPLE 36-16 | 29.9 | 49.7 | 19.6 | 0.8 | 29.8 | 49.5 | 19.5 | 0.8 | 70.0 | 0 | 0 | 30.0 | 82 |
| EXAMPLE 36-17 | 29.9 | 49.7 | 19.6 | 0.8 | 29.8 | 49.5 | 19.5 | 0.8 | 80.0 | 0 | 0 | 20.0 | 76 |
| EXAMPLE 36-18 | 29.9 | 49.7 | 19.6 | 0.8 | 29.8 | 49.5 | 19.5 | 0.8 | 90.0 | 0 | 0 | 10.0 | 54 |

EC: ethylene carbonate
PC: propylene carbonate
DMC: dimethyl carbonate
FEC: 4-fluoro-1,3-dioxolane-2-one $$\frac{Co}{Sn+Co} = 37.5 \text{ wt \%}$$

It was obvious from Table 41 that as the content of 4-fluoro-1,3-dioxolane-2-one increased, the capacity retention ratio increased to a maximum value, then decreased.

In other words, it was found out that when 4-fluoro-1,3-dioxolane-2-one was included, the cycle characteristics could The cycle characteristics of the secondary batteries of Examples 37-1 through 37-6 were measured as in the case of Examples 23-1 through 23-7. The results are shown in Table 42.

TABLE 42

| | MATERIAL RATIO (WT %) | | | | ANALYTICAL VALUE (WT %) | | | | | CAPACITY RETENTION RATIO |
|---|---|---|---|---|---|---|---|---|---|---|
| | Co | Sn | C | Fe | Co | Sn | C | Fe | SOLVENT | (%) |
| EXAMPLE 35-1 | 29.9 | 49.7 | 19.6 | 0.8 | 29.8 | 49.5 | 19.5 | 0.8 | EC + PC + DMC | 73 |
| EXAMPLE 35-5 | 29.9 | 49.7 | 19.6 | 0.8 | 29.8 | 49.5 | 19.5 | 0.8 | FEC + EC + PC + DMC | 87 |
| EXAMPLE 37-1 | 29.9 | 49.7 | 19.6 | 0.8 | 29.8 | 49.5 | 19.5 | 0.8 | DFEC + EC + PC + DMC | 80 |
| EXAMPLE 37-2 | 29.9 | 49.7 | 19.6 | 0.8 | 29.8 | 49.5 | 19.5 | 0.8 | tri-FEC + EC + PC + DMC | 77 |
| EXAMPLE 37-3 | 29.9 | 49.7 | 19.6 | 0.8 | 29.8 | 49.5 | 19.5 | 0.8 | Cl-EC + EC + PC + DMC | 82 |
| EXAMPLE 37-4 | 29.9 | 49.7 | 19.6 | 0.8 | 29.8 | 49.5 | 19.5 | 0.8 | Br-EC + EC + PC + DMC | 74 |

TABLE 42-continued

| | MATERIAL RATIO (WT %) | | | | ANALYTICAL VALUE (WT %) | | | | | CAPACITY RETENTION RATIO |
|---|---|---|---|---|---|---|---|---|---|---|
| | Co | Sn | C | Fe | Co | Sn | C | Fe | SOLVENT | (%) |
| EXAMPLE 37-5 | 29.9 | 49.7 | 19.6 | 0.8 | 29.8 | 49.5 | 19.5 | 0.8 | I-EC + EC + PC + DMC | 74 |
| EXAMPLE 37-6 | 29.9 | 49.7 | 19.6 | 0.8 | 29.8 | 49.5 | 19.5 | 0.8 | F-PC + EC + PC + DMC | 83 |

EC: ethylene carbonate
Tri-FEC: 4-dlifluoro-5-fluoro-1,3-dioxolane-2-one
PC: propylene carbonate
DMC: dimethyl carbonate
FEC: 4-fluoro-1,3-dioxolane-2-one
I-EC: 4-iodo-1,3-dioxolane-2-one
DFEC: 4-difluoro-1,3-dioxolane-2-one
F-PC: 4-fluoromethyl-1,3-dioxolane-2-one
Cl-EC 4-chloro-1,3-dioxolane-2-one
Br-EC 4-bromo-1,3-dioxolane-2-one $$\frac{Co}{Sn+Co} = 37.5 \text{ wt \%}$$

It was obvious from Table 42 that even if another derivative of a cyclic carbonate including a halogen atom was used, the cycle characteristics could be improved as in the case of Example 35-5. However, the capacity retention ratio was specifically high in Example 35-5 in which 4-fluoro-1,3-dioxolane-2-one was used. In other words, it was found out that when a derivative of a cyclic carbonate including a halogen atom was included, the cycle characteristics could be improved, and when 4-fluoro-1,3-dioxolane-2-one was included as the derivative, it is specifically effective at improving the cycle characteristics.

Examples 38-1 Through 38-7

Coin type secondary batteries were formed as in the case of Examples 23-1 through 23-7, except that instead of the liquid electrolyte solution, an electrolyte layer made of a gel electrolyte was formed on the surfaces of the test electrode 61 and the counter electrode 63. In other words, anode active materials synthesized through mixing cobalt, tin, iron and carbon at the same material ratios as those in Examples 23-1 through 23-7 as shown in Table 43 were used for the test electrode 61. Moreover, the electrolyte layer was formed through the following steps. At first, a copolymer of vinylidene fluoride and hexafluoropropylene as a high molecular weight compound, and diethyl carbonate as a mixed solvent were mixed to an electrolyte solution formed through mixing ethylene carbonate and propylene carbonate as solvents and LiPF$_6$ as the electrolyte salt at a mass ratio of ethylene carbonate:propylene carbonate:LiPF$_6$=11.5:11.5:4 so as to have a mass ratio of the electrolyte solution:the high molecular weight compound:the mixed solvent=27:10:60, thereby a precursor solution was formed. The molecular weight of the copolymer of vinylidene fluoride and hexafluoropropylene was 600000. The obtained precursor solution was uniformly applied to the facing surfaces of the test electrode 61 and the counter electrode 63, and they were left for 6 hours at a room temperature to volatilize diethyl carbonate, thereby the gel electrolyte layer was formed.

TABLE 43

| | MATERIAL RATIO (WT %) | | | | ANALYTICAL VALUE (WT %) | | | | HALF-WIDTH (°) | INITIAL CHARGE CAPACITY (mAh/cm³) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|---|
| | Co | Sn | C | Fe | Co | Sn | C | Fe | | | | | |
| EXAMPLE 38-1 | 33.0 | 56.2 | 10.0 | 0.8 | 32.7 | 55.6 | 9.9 | 0.8 | 3.5 | 470 | 97 | 59 | 61 |
| EXAMPLE 38-2 | 32.3 | 54.9 | 12.0 | 0.8 | 31.9 | 54.4 | 11.9 | 0.8 | 3.8 | 476 | 102 | 66 | 65 |
| EXAMPLE 38-3 | 31.2 | 53.0 | 15.0 | 0.8 | 30.8 | 52.5 | 14.9 | 0.8 | 4.3 | 480 | 104 | 69 | 66 |
| EXAMPLE 38-4 | 30.4 | 51.8 | 17.0 | 0.8 | 30.1 | 51.3 | 16.8 | 0.8 | 4.5 | 485 | 108 | 76 | 70 |
| EXAMPLE 38-5 | 29.3 | 49.9 | 20.0 | 0.8 | 29.0 | 49.4 | 19.8 | 0.8 | 4.8 | 492 | 111 | 82 | 74 |
| EXAMPLE 38-6 | 27.5 | 46.7 | 25.0 | 0.8 | 27.2 | 46.3 | 24.8 | 0.8 | 5.1 | 500 | 111 | 80 | 72 |
| EXAMPLE 38-7 | 25.6 | 43.6 | 30.0 | 0.8 | 25.3 | 43.2 | 29.7 | 0.8 | 5.4 | 485 | 100 | 65 | 65 |
| COMPARATIVE EXAMPLE 38-1 | 36.7 | 62.5 | 0 | 0.8 | 36.3 | 61.9 | 0 | 0.8 | 0.2 | 427 | 77 | 0 | 0 |
| COMPARATIVE EXAMPLE 38-2 | 36.3 | 61.9 | 1.0 | 0.8 | 36.0 | 61.2 | 1.0 | 0.8 | 0.5 | 429 | 79 | 0 | 0 |
| COMPARATIVE EXAMPLE 38-3 | 34.9 | 59.3 | 5.0 | 0.8 | 34.5 | 58.8 | 5.0 | 0.8 | 2.0 | 451 | 90 | 0 | 0 |
| COMPARATIVE EXAMPLE 38-4 | 33.7 | 57.5 | 8.0 | 0.8 | 33.4 | 56.9 | 7.9 | 0.8 | 3.0 | 464 | 93 | 18 | 19 |
| COMPARATIVE EXAMPLE 38-5 | 21.9 | 37.3 | 40.0 | 0.8 | 21.7 | 36.9 | 39.6 | 0.8 | 5.5 | 435 | 80 | 34 | 43 |
| COMPARATIVE EXAMPLE 38-6 | 18.2 | 31.0 | 50.0 | 0.8 | 18.0 | 30.7 | 49.5 | 0.8 | 5.5 | 389 | 71 | 27 | 38 |

$$\frac{Co}{Sn+Co} = 37 \text{ wt \%}$$

The initial charge capacities of the obtained coin type secondary batteries were measured as in the case of Examples 23-1 through 23-7. The results are shown in Table 43 and FIG. 27.

Moreover, secondary batteries shown in FIGS. 3 and 4 were formed. At first, the cathode 33 and the anode 34 were formed as in the case of Examples 23-1 through 23-7, and the cathode lead 31 and the anode lead 32 were attached.

Next, the above-described precursor solution was uniformly applied to the cathode 33 and the anode 34, and they were left for 6 hours at a room temperature to volatilize diethyl carbonate, thereby the gel electrolyte layer 36 was formed.

After that, the cathode 33 and the anode 34 were laminated with the separator 35 in between so that the surfaces of the cathode 33 and the anode 34 on which the electrolyte layer 36 was formed faced each other, thereby a laminate was formed, and the laminate was spirally wound to form the spirally wound electrode body 30.

The obtained spirally wound electrode body 30 was vacuum-sealed in the package member 40 made of a damp-proof aluminum laminate film so as to form the secondary battery shown in FIGS. 3 and 4.

The cycle characteristics of the secondary batteries were measured as in the case of Examples 23-1 through 23-7. The results are shown in Table 43 and FIG. 27.

As Comparative Examples 38-1 through 38-6 relative to Examples 38-1 through 38-7, secondary batteries were formed as in the case of Examples 23-1 through 23-7, except that anode active materials synthesized through mixing cobalt, tin, iron and carbon at a material ratio shown in Table 43, that is, anode active materials synthesized as in the case of Comparative Examples 23-1 through 23-6 were used.

The initial charge capacities and the cycle characteristics of the obtained secondary batteries of Comparative Examples 38-1 through 38-6 were measured. The results are shown in Table 43 and FIG. 27.

Figure 27:
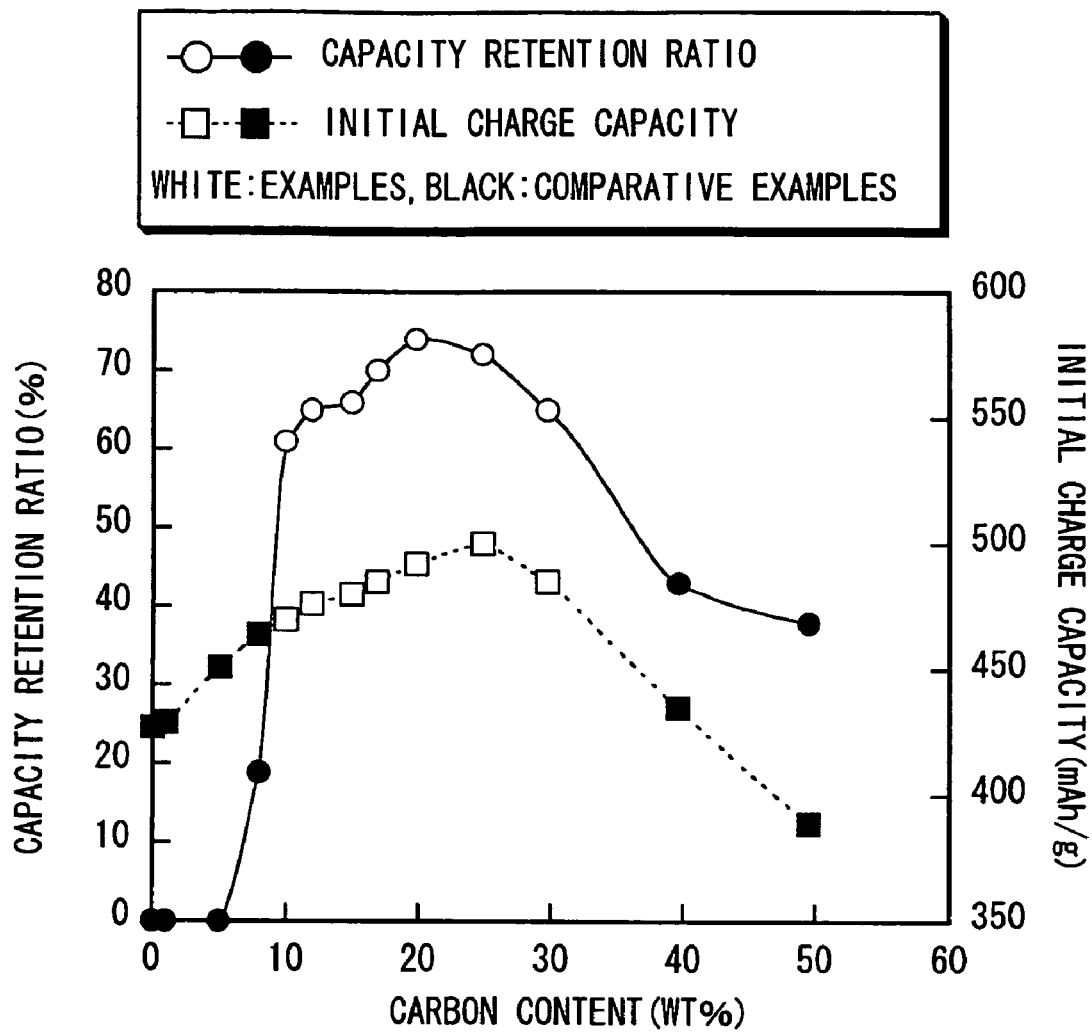
FIG. 27 is another plot showing a relationship between the carbon content in an anode active material, a capacity retention ratio and an initial charge capacity.

It was obvious from Table 43 and FIG. 27 that the same results as those in Examples 23-1 through 23-7 were obtained. In other words, it was found out that even if the gel electrolyte was used, in the case where the carbon content was within a range from 9.9 wt % to 29.7 wt % inclusive, the capacity and the cycle characteristics could be improved, and the carbon content was more preferably within a range from 14.9 wt % to 29.7 wt %, and more preferably within a range from 16.8 wt % to 24.8 wt %.

Examples 39-1 through 39-9, 40-1 through 40-9 and 41-1 through 41-9

As Examples 39-1 through 39-9, secondary batteries were formed as in the case of Examples 38-1 through 38-7, except that as shown in Table 44, anode active materials in which the material ratio of carbon was fixed to 10 wt %, and the material ratio of iron was fixed to 0.8 wt %, and the Co/(Sn+Co) ratio was changed within a range from 30 wt % to 70 wt % inclusive, that is, anode active materials synthesized as in the case of Examples 24-1 through 24-9 were used. Moreover, as Comparative Examples 39-1 through 39-4 relative to Examples 39-1 through 39-9, secondary batteries were formed as in the case of Examples 39-1 through 39-9, except that as shown in Table 44, anode active materials in which the material ratio of carbon was fixed to 10 wt %, and the material ratio of iron was fixed to 0.8 wt %, and the Co/(Sn+Co) ratio was 28 wt %, 25 wt %, 20 wt % and 75 wt %, that is, anode active materials synthesized as in the case of Comparative Examples 24-1 through 24-4 were used.

TABLE 44

| | MATERIAL RATIO (WT %) | | | | ANALYTICAL VALUE (WT %) | | | | $\frac{Co}{Sn+Co}$ | HALF-WIDTH (°) | INITIAL CHARGE CAPACITY (mAh/g) | DISCHARGE CAPACITY IN SECOND CYCLE (mAh/cm$^3$) | DISCHARGE CAPACITY IN 300TH CYCLE (mAh/cm$^3$) | CAPACITY RETENTION RATIO (%) |
|---|---|---|---|---|---|---|---|---|---|---|---|---|---|---|
| | Co | Sn | C | Fe | Co | Sn | C | Fe | | | | | | |
| EXAMPLE 39-1 | 62.4 | 26.8 | 10 | 0.8 | 61.8 | 26.5 | 9.9 | 0.8 | 70 | 3.8 | 348 | 77 | 55 | 72 |
| EXAMPLE 39-2 | 58.0 | 31.2 | 10 | 0.8 | 57.4 | 30.9 | 9.9 | 0.8 | 65 | 3.8 | 359 | 80 | 57 | 71 |
| EXAMPLE 39-3 | 53.5 | 35.7 | 10 | 0.8 | 53.0 | 35.3 | 9.9 | 0.8 | 60 | 3.7 | 377 | 82 | 57 | 70 |
| EXAMPLE 39-4 | 49.1 | 40.1 | 10 | 0.8 | 48.6 | 39.7 | 9.9 | 0.8 | 55 | 3.7 | 396 | 83 | 57 | 69 |
| EXAMPLE 39-5 | 44.6 | 44.6 | 10 | 0.8 | 44.2 | 44.2 | 9.9 | 0.8 | 50 | 3.6 | 426 | 85 | 57 | 67 |
| EXAMPLE 39-6 | 40.1 | 49.1 | 10 | 0.8 | 39.7 | 48.6 | 9.9 | 0.8 | 45 | 3.6 | 453 | 90 | 57 | 64 |
| EXAMPLE 39-7 | 35.7 | 53.5 | 10 | 0.8 | 35.3 | 53.0 | 9.9 | 0.8 | 40 | 3.5 | 460 | 94 | 58 | 62 |
| EXAMPLE 39-1 | 33.0 | 56.2 | 10 | 0.8 | 32.7 | 55.6 | 9.9 | 0.8 | 37 | 3.5 | 470 | 97 | 59 | 61 |
| EXAMPLE 39-8 | 29.4 | 59.8 | 10 | 0.8 | 29.1 | 59.2 | 9.9 | 0.8 | 33 | 3.4 | 501 | 96 | 57 | 59 |
| EXAMPLE 39-9 | 26.8 | 62.4 | 10 | 0.8 | 26.5 | 61.8 | 9.9 | 0.8 | 30 | 3.3 | 527 | 95 | 54 | 57 |
| COMPARATIVE EXAMPLE 39-1 | 25.0 | 64.2 | 10 | 0.8 | 24.7 | 63.6 | 9.9 | 0.8 | 28 | 3.2 | 534 | 95 | 17 | 18 |
| COMPARATIVE EXAMPLE 39-2 | 22.3 | 66.9 | 10 | 0.8 | 22.1 | 66.2 | 9.9 | 0.8 | 25 | 3.0 | 540 | 92 | 0 | 0 |

TABLE 44-continued

| | MATERIAL RATIO (WT %) | | | | ANALYTICAL VALUE (WT %) | | | | $\frac{Co}{Sn+Co}$ | HALF-WIDTH (°) | INITIAL CHARGE CAPACITY (mAh/g) | DISCHARGE CAPACITY IN SECOND CYCLE (mAh/cm$^3$) | DISCHARGE CAPACITY IN 300TH CYCLE (mAh/cm$^3$) | CAPACITY RETENTION RATIO (%) |
|---|---|---|---|---|---|---|---|---|---|---|---|---|---|---|
| | Co | Sn | C | Fe | Co | Sn | C | Fe | | | | | | |
| COMPARATIVE EXAMPLE 39-3 | 17.8 | 71.4 | 10 | 0.8 | 17.7 | 70.6 | 9.9 | 0.8 | 20 | 2.8 | 558 | 87 | 0 | 0 |
| COMPARATIVE EXAMPLE 39-4 | 66.9 | 22.3 | 10 | 0.8 | 66.2 | 22.1 | 9.9 | 0.8 | 75 | 3.8 | 264 | 60 | 44 | 74 |

As Examples 40-1 through 40-9, secondary batteries were formed as in the case of Examples 38-1 through 38-7, except that as shown in Table 45, anode active materials in which the material ratio of carbon was fixed to 20 wt %, and the material ratio of iron was fixed to 0.8 wt %, and the Co/(Sn+Co) ratio was changed within a range from 30 wt % to 70 wt % inclusive, that is, anode active materials synthesized as in the case of Examples 25-1 through 25-9 were used. Moreover, as Comparative Examples 40-1 through 40-4 relative to Examples 40-1 through 40-9, secondary batteries were formed as in the case of Examples 40-1 through 40-9, except that as shown in Table 45, anode active materials in which the material ratio of carbon was fixed to 20 wt %, and the material ratio of iron was fixed to 0.8 wt %, and the Co/(Sn+Co) ratio was 28 wt %, 25 wt %, 20 wt % or 75 wt %, that is, anode active materials synthesized as in the case of Comparative Examples 25-1 through 25-4 were used.

TABLE 45

| | MATERIAL RATIO (WT %) | | | | ANALYTICAL VALUE (WT %) | | | | $\frac{Co}{Sn+Co}$ | HALF-WIDTH (°) | INITIAL CHARGE CAPACITY (mAh/g) | DISCHARGE CAPACITY IN SECOND CYCLE (mAh/cm$^3$) | DISCHARGE CAPACITY IN 300TH CYCLE (mAh/cm$^3$) | CAPACITY RETENTION RATIO (%) |
|---|---|---|---|---|---|---|---|---|---|---|---|---|---|---|
| | Co | Sn | C | Fe | Co | Sn | C | Fe | | | | | | |
| EXAMPLE 40-1 | 55.4 | 23.8 | 20 | 0.8 | 54.9 | 23.5 | 19.8 | 0.8 | 70 | 5.0 | 349 | 78 | 69 | 88 |
| EXAMPLE 40-2 | 51.5 | 27.7 | 20 | 0.8 | 51.0 | 27.4 | 19.8 | 0.8 | 65 | 5.0 | 360 | 80 | 70 | 87 |
| EXAMPLE 40-3 | 47.5 | 31.7 | 20 | 0.8 | 47.0 | 31.4 | 19.8 | 0.8 | 60 | 4.9 | 378 | 85 | 73 | 86 |
| EXAMPLE 40-4 | 43.6 | 35.6 | 20 | 0.8 | 43.1 | 35.3 | 19.8 | 0.8 | 55 | 4.9 | 395 | 89 | 75 | 85 |
| EXAMPLE 40-5 | 39.6 | 39.6 | 20 | 0.8 | 39.2 | 39.2 | 19.8 | 0.8 | 50 | 4.9 | 424 | 94 | 79 | 84 |
| EXAMPLE 40-6 | 35.6 | 43.6 | 20 | 0.8 | 35.3 | 43.1 | 19.8 | 0.8 | 45 | 4.8 | 451 | 102 | 80 | 79 |
| EXAMPLE 40-7 | 31.7 | 47.5 | 20 | 0.8 | 31.4 | 47.0 | 19.8 | 0.8 | 40 | 4.8 | 476 | 106 | 80 | 75 |
| EXAMPLE 38-5 | 29.3 | 49.9 | 20 | 0.8 | 29.0 | 49.4 | 19.8 | 0.8 | 37 | 4.8 | 493 | 111 | 82 | 74 |
| EXAMPLE 40-8 | 26.1 | 53.1 | 20 | 0.8 | 25.9 | 52.5 | 19.8 | 0.8 | 33 | 4.6 | 515 | 111 | 77 | 69 |
| EXAMPLE 40-9 | 23.8 | 55.4 | 20 | 0.8 | 23.5 | 54.9 | 19.8 | 0.8 | 30 | 4.5 | 527 | 116 | 73 | 63 |
| COMPARATIVE EXAMPLE 40-1 | 22.2 | 57.0 | 20 | 0.8 | 22.0 | 56.5 | 19.8 | 0.8 | 28 | 4.4 | 534 | 110 | 39 | 35 |
| COMPARATIVE EXAMPLE 40-2 | 19.8 | 59.4 | 20 | 0.8 | 19.6 | 58.8 | 19.8 | 0.8 | 25 | 4.2 | 542 | 105 | 25 | 24 |
| COMPARATIVE EXAMPLE 40-3 | 15.8 | 63.4 | 20 | 0.8 | 15.7 | 62.7 | 19.8 | 0.8 | 20 | 4.0 | 551 | 97 | 0 | 0 |
| COMPARATIVE EXAMPLE 40-4 | 59.4 | 19.8 | 20 | 0.8 | 58.8 | 19.6 | 19.8 | 0.8 | 75 | 5.0 | 246 | 44 | 39 | 89 |

As Examples 41-1 through 41-9, secondary batteries were formed as in the case of Examples 38-1 through 38-7, except that as shown in Table 46, anode active materials in which the material ratio of carbon was fixed to 30 wt %, and the material ratio of iron was fixed to 0.8 wt %, and the Co/(Sn+Co) ratio was changed within a range from 30 wt % to 70 wt % inclusive, that is, anode active materials synthesized as in the case of Examples 26-1 through 26-9 were used. Moreover, Comparative Examples 41-1 through 41-4 relative to Examples 41-1 through 41-9, secondary batteries were formed as in the case of Examples 41-1 through 41-9, except that as shown in Table 46, anode active materials in which the material ratio was fixed to 30 wt %, the material ratio of iron was fixed to 0.8 wt %, and the Co/(Sn+Co) ratio was 28 wt %, 25 wt %, 20 wt % and 75 wt %, that is, anode active materials synthesized as in the case of Comparative Examples 26-1 through 26-4 were used.

through 23-7. The results are shown in Tables 44 through 46 and FIGS. 28 through 30.

Figure 28:
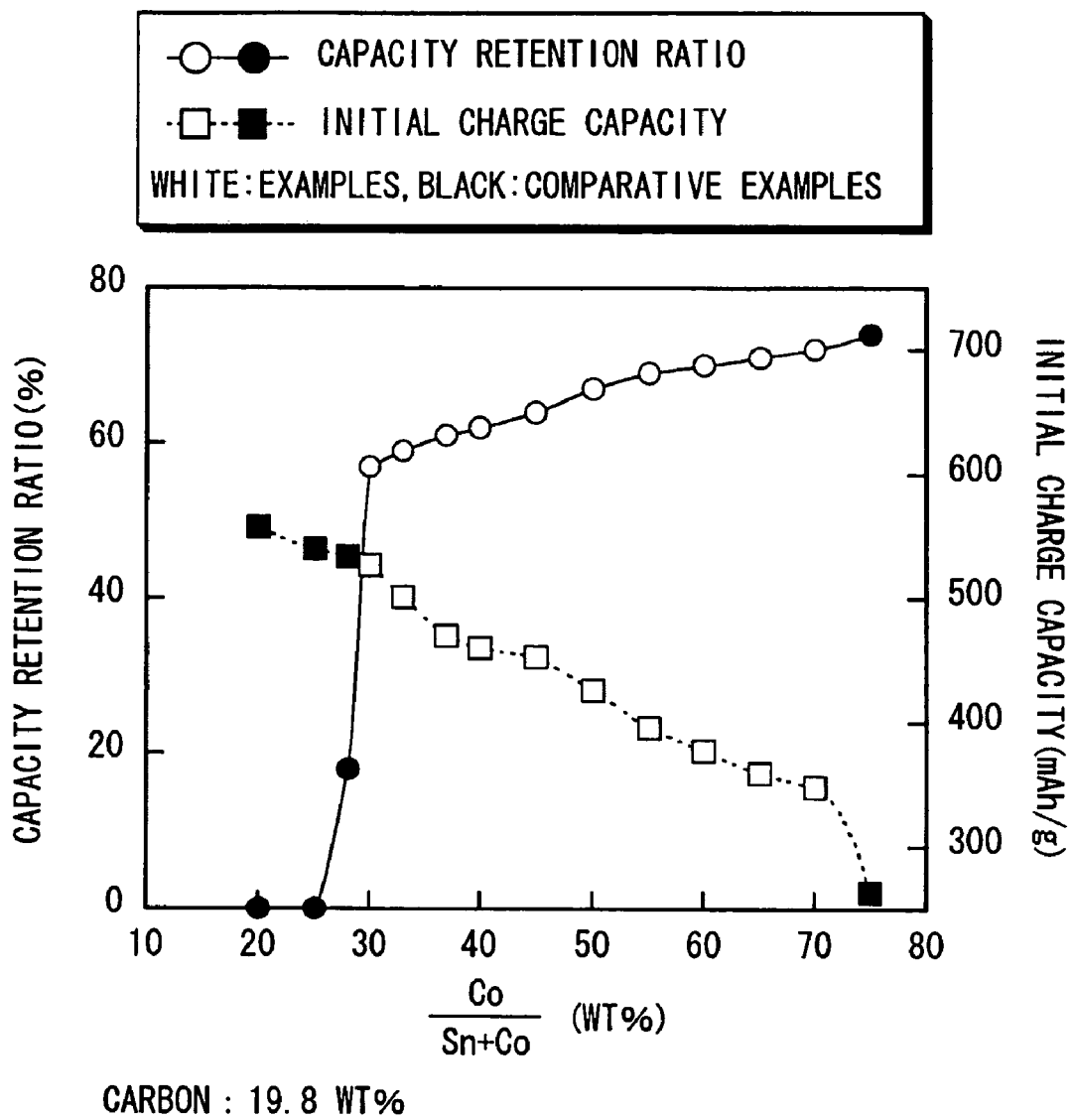
FIG. 28 is another plot showing a relationship between the ratio of cobalt to the total of tin and cobalt in an anode active material, a capacity retention ratio and an initial charge capacity.
Figure 29:
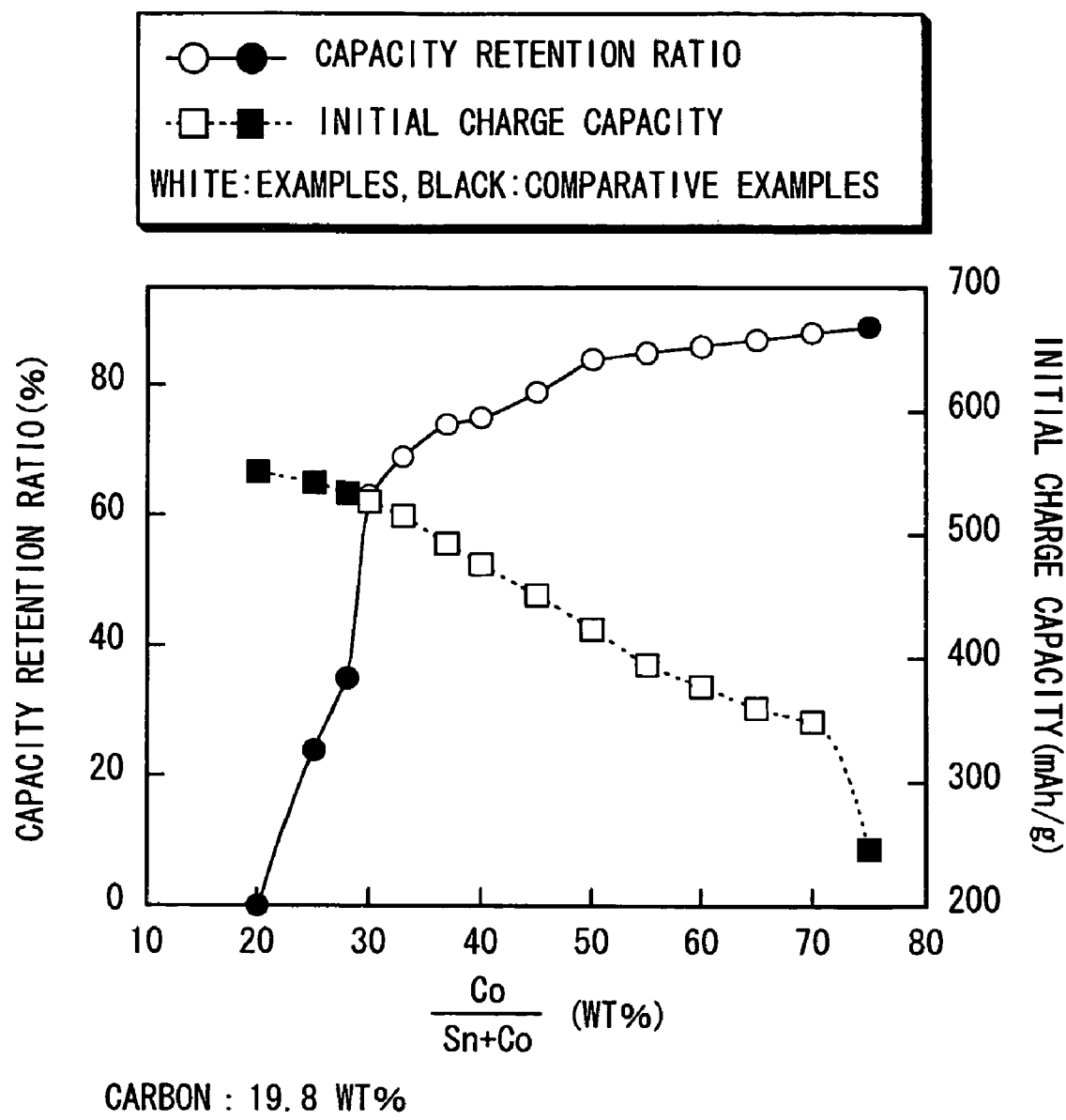
FIG. 29 is another plot showing a relationship between the ratio of cobalt to the total of tin and cobalt in an anode active material, a capacity retention ratio and an initial charge capacity.
Figure 30:
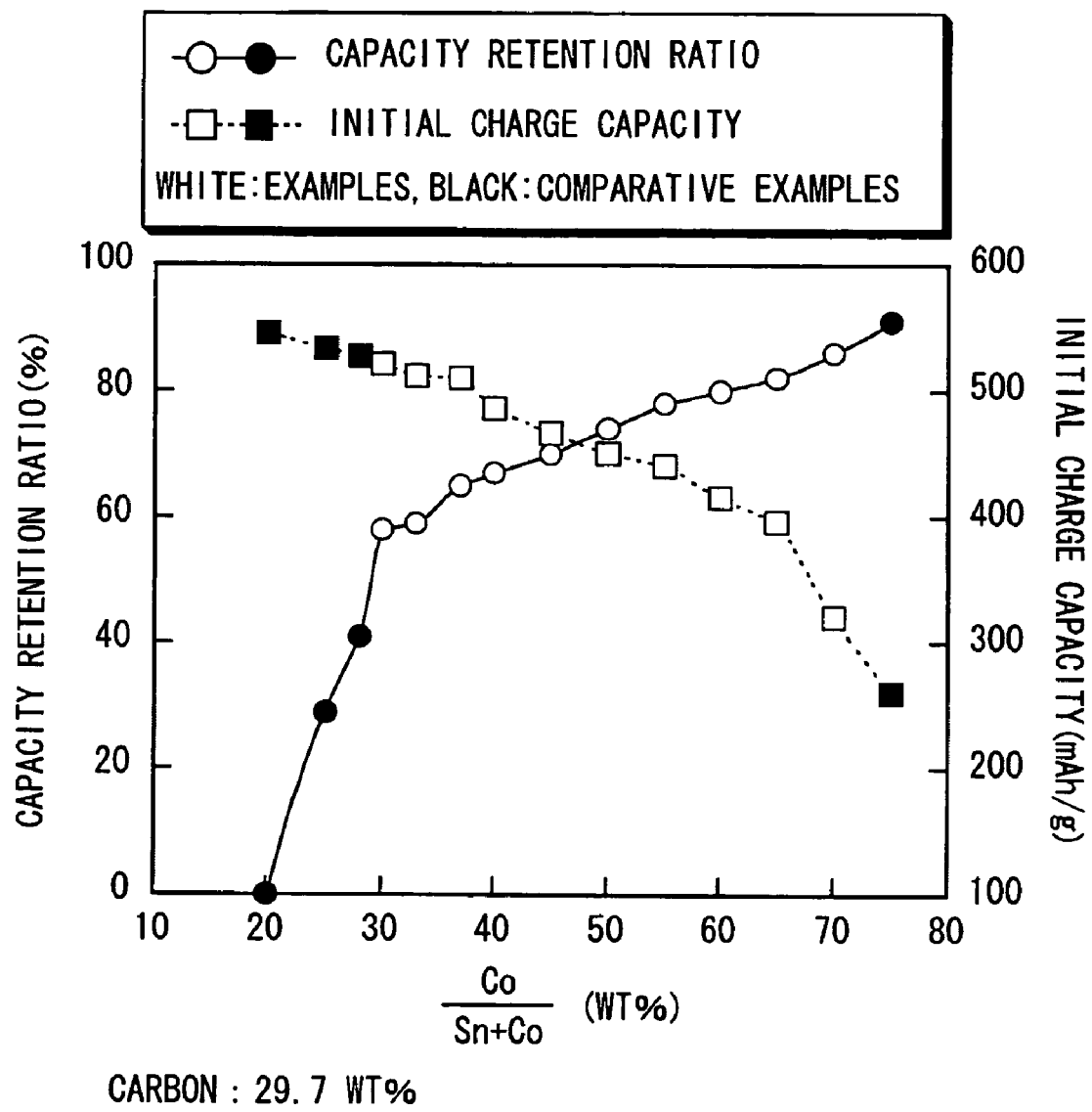
FIG. 30 is another plot showing a relationship between the ratio of cobalt to the total of tin and cobalt in an anode active material, a capacity retention ratio and an initial charge capacity.

It was obvious from Tables 44 through 46 and FIGS. 28 through 30 that the same results as those in Examples 24-1 through 24-9, 25-1 through 25-9 and 26-1 through 26-9 were obtained. In other words, it was found out that in the case where the Co/(Sn+Co) ratio was within a range from 30 wt % to 70 wt % inclusive, even if the gel electrolyte was used, the capacity and the cycle characteristics could be improved. Moreover, it was found out that the Co/(Sn+Co) ratio was more preferably 60 wt % or less.

Examples 42-1 Through 42-9

Secondary batteries were formed as in the case of Examples 38-1 through 38-9, except that as shown in Table

TABLE 46

| | MATERIAL RATIO (WT %) | | | | ANALYTICAL VALUE (WT %) | | | | $\frac{Co}{Sn+Co}$ | HALF-WIDTH (°) | INITIAL CHARGE CAPACITY (mAh/g) | DISCHARGE CAPACITY IN SECOND CYCLE (mAh/cm$^3$) | DISCHARGE CAPACITY IN 300TH CYCLE (mAh/cm$^3$) | CAPACITY RETENTION RATIO (%) |
|---|---|---|---|---|---|---|---|---|---|---|---|---|---|---|
| | Co | Sn | C | Fe | Co | Sn | C | Fe | | | | | | |
| EXAMPLE 41-1 | 48.4 | 20.8 | 30 | 0.8 | 48.0 | 20.6 | 29.7 | 0.8 | 70 | 6.0 | 321 | 65 | 56 | 86 |
| EXAMPLE 41-2 | 45.0 | 24.2 | 30 | 0.8 | 44.5 | 24.0 | 29.7 | 0.8 | 65 | 5.9 | 397 | 84 | 69 | 82 |
| EXAMPLE 41-3 | 41.5 | 27.7 | 30 | 0.8 | 41.1 | 27.4 | 29.7 | 0.8 | 60 | 5.8 | 416 | 88 | 70 | 80 |
| EXAMPLE 41-4 | 38.1 | 31.1 | 30 | 0.8 | 37.7 | 30.8 | 29.7 | 0.8 | 55 | 5.7 | 441 | 93 | 72 | 78 |
| EXAMPLE 41-5 | 34.6 | 34.6 | 30 | 0.8 | 34.3 | 34.3 | 29.7 | 0.8 | 50 | 5.6 | 451 | 97 | 72 | 74 |
| EXAMPLE 41-6 | 31.1 | 38.1 | 30 | 0.8 | 30.8 | 37.7 | 29.7 | 0.8 | 45 | 5.5 | 467 | 99 | 69 | 70 |
| EXAMPLE 41-7 | 27.7 | 41.5 | 30 | 0.8 | 27.4 | 41.1 | 29.7 | 0.8 | 40 | 5.4 | 486 | 101 | 68 | 67 |
| EXAMPLE 38-7 | 25.6 | 43.6 | 30 | 0.8 | 25.3 | 43.2 | 29.7 | 0.8 | 37 | 5.4 | 510 | 102 | 65 | 65 |
| EXAMPLE 41-8 | 22.8 | 46.4 | 30 | 0.8 | 22.6 | 45.9 | 29.7 | 0.8 | 33 | 5.3 | 512 | 106 | 62 | 59 |
| EXAMPLE 41-9 | 20.8 | 48.4 | 30 | 0.8 | 20.6 | 48.0 | 29.7 | 0.8 | 30 | 5.2 | 521 | 108 | 63 | 58 |
| COMPARATIVE EXAMPLE 41-1 | 19.4 | 49.8 | 30 | 0.8 | 19.2 | 49.3 | 29.7 | 0.8 | 28 | 5.2 | 528 | 102 | 42 | 41 |
| COMPARATIVE EXAMPLE 41-2 | 17.3 | 51.9 | 30 | 0.8 | 17.1 | 51.4 | 29.7 | 0.8 | 25 | 5.1 | 534 | 95 | 28 | 29 |
| COMPARATIVE EXAMPLE 41-3 | 13.8 | 55.4 | 30 | 0.8 | 13.7 | 54.8 | 29.7 | 0.8 | 20 | 5.1 | 546 | 86 | 0 | 0 |
| COMPARATIVE EXAMPLE 41-4 | 51.9 | 17.3 | 30 | 0.8 | 51.4 | 17.1 | 29.7 | 0.8 | 75 | 6.1 | 261 | 54 | 49 | 91 |

The initial capacities and the cycle characteristics of the obtained secondary batteries of Examples 39-1 through 39-9, 40-1 through 40-9 and 41-1 through 41-9 and Comparative Examples 39-1 through 39-4, 40-1 through 40-4 and 41-1 through 41-4 were measured as in the case of Examples 23-1

47, anode active materials in which the Co/(Sn+Co) ratio and the material ratio of carbon were fixed, and the material ratio of iron was changed within a range from 0.1 wt % to 7.0 wt % inclusive, that is, anode active materials synthesized as in the case of Examples 29-1 through 29-9.

TABLE 47

|  | MATERIAL RATIO (WT %) | | | | ANALYTICAL VALUE (WT %) | | | | HALF-WIDTH (°) | INITIAL CHARGE CAPACITY (mAh/cm³) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|---|
|  | Co | Sn | C | Fe | Co | Sn | C | Fe | | | | | |
| EXAMPLE 42-1 | 29.6 | 50.3 | 20 | 0.1 | 29.3 | 49.8 | 19.8 | 0.1 | 4.8 | 500 | 112 | 80 | 71 |
| EXAMPLE 42-2 | 29.5 | 50.3 | 20 | 0.2 | 29.2 | 49.8 | 19.8 | 0.2 | 4.8 | 496 | 112 | 80 | 71 |
| EXAMPLE 42-3 | 29.5 | 50.2 | 20 | 0.3 | 29.2 | 49.7 | 19.8 | 0.3 | 4.8 | 494 | 111 | 80 | 72 |
| EXM4PLE 38-5 | 29.3 | 49.9 | 20 | 0.8 | 29.0 | 49.4 | 19.8 | 0.8 | 4.8 | 493 | 111 | 82 | 74 |
| EXAMPLE 42-4 | 29.2 | 49.8 | 20 | 1.0 | 28.9 | 49.3 | 19.8 | 1.0 | 4.8 | 490 | 111 | 83 | 75 |
| EXAMPLE 42-5 | 28.5 | 48.5 | 20 | 3.0 | 28.2 | 48.0 | 19.8 | 3.0 | 4.8 | 487 | 110 | 84 | 76 |
| EXAMPLE 42-6 | 27.8 | 47.3 | 20 | 5.0 | 27.5 | 46.8 | 19.8 | 5.0 | 4.8 | 479 | 108 | 83 | 77 |
| EXAMPLE 42-7 | 27.4 | 46.6 | 20 | 6.0 | 27.1 | 46.2 | 19.8 | 5.9 | 4.8 | 453 | 104 | 81 | 78 |
| EXAMPLE 42-8 | 27.2 | 46.3 | 20 | 6.5 | 26.9 | 45.8 | 19.8 | 6.4 | 4.8 | 441 | 102 | 81 | 79 |
| EXAMPLE 42-9 | 27.0 | 46.0 | 20 | 7.0 | 26.7 | 45.5 | 19.8 | 6.9 | 4.8 | 403 | 97 | 78 | 80 |

$$\frac{Co}{Sn + Co} = 37 \text{ wt \%}$$

The charge capacities and the cycle characteristics of the secondary batteries of Examples 42-1 through 42-9 were measured as in the case of Examples 23-1 through 23-7. The results are shown in Table 47 and FIG. 31.

Figure 31:
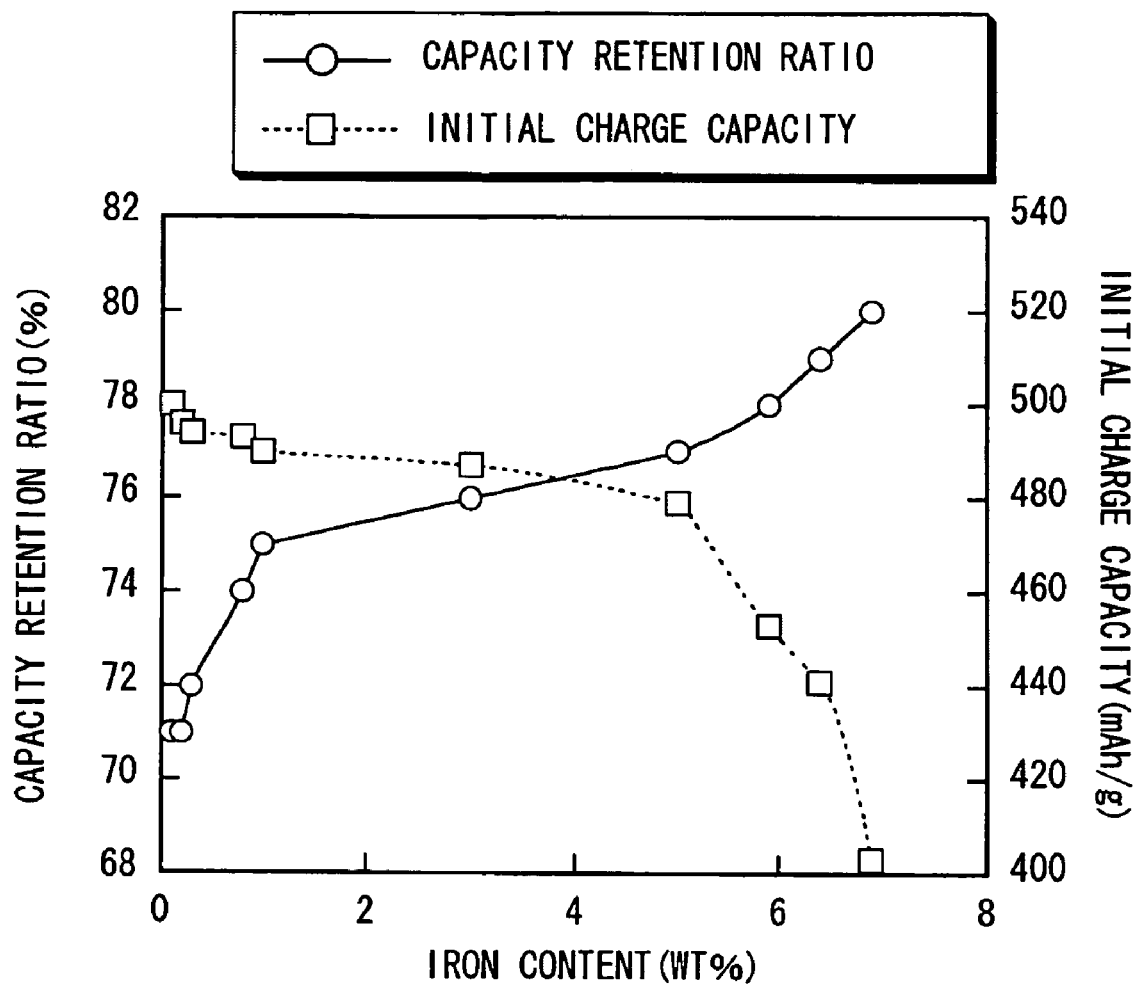
FIG. 31 is another plot showing a relationship between the iron content in an anode active material, a capacity retention ratio and an initial charge capacity.

It was obvious from Table 47 and FIG. 31 that the same results as those in Examples 29-1 through 29-9 were obtained. In other words, it was found out that in the case where the iron content was within a range from 0.4 wt % to 5.9 wt % inclusive, even if the gel electrolyte was used, the capacity and the cycle characteristics could be improved.

Examples 43-1 Through 43-11

Secondary batteries were formed as in the case of Examples 38-1 through 38-7, except that as shown in Table 48, anode active materials in which the material ratio of silicon powder was changed within a range from 0.3 wt % to 10 wt % inclusive, and the Co/(Sn+Co) ratio, the material ratio of iron and the material ratio of carbon were fixed, that is, anode active materials synthesized as in the case of Examples 30-1 through 30-11 were used.

The initial charge capacities and the cycle characteristics of the obtained secondary batteries of Examples 43-1 through 43-11 were measured as in the case of Examples 23-1 through 23-7. The results are shown in Table 49.

TABLE 48

|  | MATERIAL RATIO (WT %) | | | | | | ANALYTICAL VALUE (WT%) | | | | | |
|---|---|---|---|---|---|---|---|---|---|---|---|---|
|  | Co | Sn | C | Fe | Si | Sn + Si | Co | Sn | C | Fe | Si | Sn + |
| EXAMPLE 38-5 | 29.3 | 49.9 | 20.0 | 0.8 | 0 | 49.9 | 29.0 | 49.4 | 19.8 | 0.8 | 0 | 49.4 |
| EXAMPLE 43-1 | 29.2 | 49.7 | 20.0 | 0.8 | 0.3 | 50.0 | 28.9 | 49.2 | 19.8 | 0.8 | 0.3 | 49.5 |
| EXAMPLE 43-2 | 29.1 | 49.6 | 20.0 | 0.8 | 0.5 | 50.1 | 28.8 | 49.1 | 19.8 | 0.8 | 0.5 | 49.6 |
| EXAMPLE 43-3 | 28.9 | 49.3 | 20.0 | 0.8 | 1.0 | 50.3 | 28.6 | 48.8 | 19.8 | 0.8 | 1.0 | 49.8 |
| EXAMPLE 43-4 | 28.6 | 48.6 | 20.0 | 0.8 | 2.0 | 50.6 | 28.3 | 48.1 | 19.8 | 0.8 | 2.0 | 50.1 |
| EXAMPLE 43-5 | 27.8 | 47.4 | 20.0 | 0.8 | 4.0 | 51.4 | 27.5 | 46.9 | 19.8 | 0.8 | 4.0 | 50.9 |
| EXAMPLE 43-6 | 27.1 | 46.1 | 20.0 | 0.8 | 6.0 | 52.1 | 26.8 | 45.7 | 19.8 | 0.8 | 5.9 | 51.6 |
| EXAMPLE 43-7 | 26.7 | 45.5 | 20.0 | 0.8 | 7.0 | 52.5 | 26.4 | 45.0 | 19.8 | 0.8 | 6.9 | 52.0 |
| EXAMPLE 43-8 | 26.3 | 44.9 | 20.0 | 0.8 | 8.0 | 52.9 | 26.1 | 44.4 | 19.8 | 0.8 | 7.9 | 52.3 |
| EXAMPLE 43-9 | 26.2 | 44.5 | 20.0 | 0.8 | 8.5 | 53.0 | 25.9 | 44.1 | 19.8 | 0.8 | 8.4 | 52.5 |
| EXAMPLE 43-10 | 26.0 | 44.2 | 20.0 | 0.8 | 9.0 | 53.2 | 25.7 | 43.8 | 19.8 | 0.8 | 8.9 | 52.7 |
| EXAMPLE 43-11 | 25.6 | 43.6 | 20.0 | 0.8 | 10.0 | 53.6 | 25.3 | 43.2 | 19.8 | 0.8 | 9.9 | 53.1 |

$$\frac{Co}{Sn + Co} = 37 \text{ wt \%}$$

TABLE 49

|  | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|
| EXAMPLE 38-5 | 492 | 111 | 82 | 74 |
| EXAMPLE 43-1 | 493 | 112 | 81 | 72 |
| EXAMPLE 43-2 | 499 | 115 | 81 | 70 |
| EXAMPLE 43-3 | 517 | 116 | 80 | 69 |
| EXAMPLE 43-4 | 528 | 117 | 78 | 67 |

TABLE 49-continued

|  | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|
| EXAMPLE 43-5 | 542 | 118 | 78 | 66 |
| EXAMPLE 43-6 | 557 | 122 | 79 | 65 |
| EXAMPLE 43-7 | 573 | 125 | 79 | 63 |
| EXAMPLE 43-8 | 583 | 126 | 73 | 58 |
| EXAMPLE 43-9 | 599 | 126 | 51 | 40 |
| EXAMPLE 43-10 | 620 | 129 | 30 | 23 |
| EXAMPLE 43-11 | 646 | 131 | 16 | 12 |

It was obvious from Tables 48 and 49 that the same results as those in Examples 30-1 through 30-11 were obtained. In other words, it was found out that even if the gel electrolyte was used, when silicon was included in the anode active material, the capacity could be improved, and the silicon content was preferably within a range from 0.5 wt % to 7.9 wt % inclusive.

Examples 44-1 Through 44-10

Secondary batteries were formed as in the case of Examples 38-1 through 38-7, except that as shown in Table 50, anode active materials in which the material ratio of titanium was changed within a range from 0 wt % to 16 wt % inclusive, and the Co/(Sn+Co) ratio, the material ratio of iron and the material ratio of carbon were fixed, that is, anode active materials synthesized as in the case of Examples 31-1 through 31-10 were used.

Figure 32:
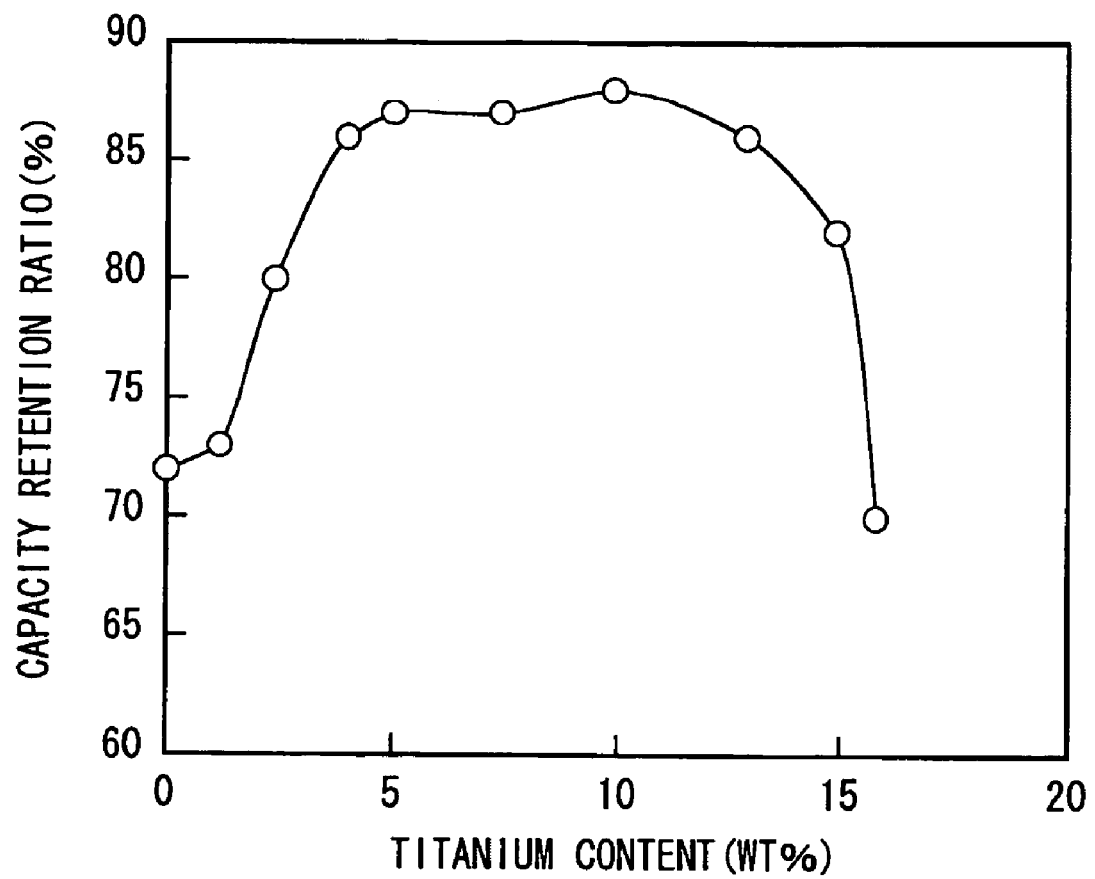
FIG. 32 is another plot showing a relationship between the titanium content in an anode active material and a capacity retention ratio.

It was obvious from Table 50 and FIG. 32 that the same results as those in Examples 31-1 through 31-10 were obtained. In other words, it was found out that even if the gel electrolyte was used, when the titanium was included in the anode active material within a range of 14.9 wt % or less, the cycle characteristics could be further improved, and the content of titanium was more preferably within a range of 2.4 wt % or more, and more preferably within a range from 4.0 wt % to 12.9 wt % inclusive.

Examples 45-1 Through 45-8

Secondary batteries were formed as in the case of Examples 38-1 through 38-7, except that as shown in Table 51, anode active materials in which the material ratio of titanium and indium was changed within a range from 0 wt % to 10.0 wt % inclusive, and the Co/(Sn+Co) ratio, the material ratio of iron, the material ratio of carbon and the material ratio of silicon were fixed, that is, anode active materials synthesized as in the case of Examples 34-1 through 34-8 were used.

TABLE 50

|  | MATERIAL RATIO (WT %) | | | | | ANALYTICAL VALUE (WT %) | | | | | INITIAL CHARGE CAPACITY (mAh/g) | DISCHARGE CAPACITY IN SECOND CYCLE (mAh/cm³) | DISCHARGE CAPACITY IN 300TH CYCLE (mAh/cm³) | CAPACITY RETENTION RATIO (%) |
|---|---|---|---|---|---|---|---|---|---|---|---|---|---|---|
|  | Co | Sn | C | Fe | Ti | Co | Sn | C | Fe | Ti |  |  |  |  |
| EXAMPLE 44-1 | 27.7 | 51.5 | 20.0 | 0.8 | 0 | 27.4 | 51.0 | 19.8 | 0.8 | 0 | 499 | 111 | 80 | 72 |
| EXAMPLE 44-2 | 27.3 | 50.7 | 20.0 | 0.8 | 1.2 | 27.0 | 50.2 | 19.8 | 0.8 | 1.2 | 514 | 114 | 83 | 73 |
| EXAMPLE 44-3 | 26.9 | 49.9 | 20.0 | 0.8 | 2.4 | 26.6 | 49.4 | 19.8 | 0.8 | 2.4 | 523 | 116 | 93 | 80 |
| EXAMPLE 44-4 | 26.3 | 48.9 | 20.0 | 0.8 | 4.0 | 26.1 | 48.4 | 19.8 | 0.8 | 4.0 | 527 | 117 | 100 | 86 |
| EXAMPLE 44-5 | 25.9 | 48.2 | 20.0 | 0.8 | 5.1 | 25.7 | 47.7 | 19.8 | 0.8 | 5.0 | 534 | 117 | 102 | 87 |
| EXAMPLE 44-6 | 25.1 | 46.6 | 20.0 | 0.8 | 7.5 | 24.8 | 46.1 | 19.8 | 0.8 | 7.4 | 540 | 118 | 102 | 87 |
| EXAMPLE 44-7 | 24.2 | 45.0 | 20.0 | 0.8 | 10.0 | 24.0 | 44.5 | 19.8 | 0.8 | 9.9 | 537 | 117 | 103 | 88 |
| EXAMPLE 44-8 | 23.2 | 43.0 | 20.0 | 0.8 | 13.0 | 22.9 | 42.6 | 198 | 0.8 | 12.9 | 531 | 114 | 98 | 86 |
| EXAMPLE 44-9 | 22.5 | 41.7 | 20.0 | 0.8 | 15.0 | 22.2 | 41.3 | 19.8 | 0.8 | 14.9 | 508 | 112 | 92 | 82 |
| EXAMPLE 44-10 | 22.1 | 41.1 | 20.0 | 0.8 | 16.0 | 21.9 | 40.7 | 19.8 | 0.8 | 15.8 | 469 | 103 | 72 | 70 |

$\dfrac{Co}{Sn+Co} = 35$ wt %

The initial charge capacities and the cycle characteristics of the obtained secondary batteries of Examples 44-1 through 44-10 were measured as in the case of Examples 23-1 through 23-7. The results are shown in Table 50 and FIG. 32.

The initial charge capacities and the cycle characteristics of the secondary batteries of Examples 45-1 through 45-8 were measured as in the case of Examples 23-1 through 23-7. The results are shown in Table 52.

TABLE 51

| | MATERIAL RATIO (WT %) | | | | | | | ANALYTICAL VALUE (WT %) | | | | | | |
|---|---|---|---|---|---|---|---|---|---|---|---|---|---|---|
| | Co | Sn | C | Fe | Si | Ti | In | Co | Sn | C | Fe | Si | Ti | In |
| EXAMPLE 44-1 | 27.7 | 51.5 | 20.0 | 0.8 | — | — | — | 27.4 | 51.0 | 19.8 | 0.8 | — | — | — |
| EXAMPLE 45-1 | 27.4 | 50.8 | 18.0 | 0.8 | 3.0 | — | — | 27.1 | 50.3 | 17.8 | 0.8 | 3.0 | — | — |
| EXAMPLE 45-2 | 26.0 | 48.2 | 18.0 | 0.8 | 3.0 | 4.0 | — | 25.7 | 47.7 | 17.8 | 0.8 | 3.0 | 4.0 | — |
| EXAMPLE 45-3 | 25.6 | 47.5 | 18.0 | 0.8 | 3.0 | 5.1 | — | 25.3 | 47.0 | 17.8 | 0.8 | 3.0 | 5.0 | — |
| EXAMPLE 45-4 | 24.7 | 46.0 | 18.0 | 0.8 | 3.0 | 7.5 | — | 24.5 | 45.5 | 17.8 | 0.8 | 3.0 | 7.4 | — |
| EXAMPLE 45-5 | 26.0 | 48.2 | 18.0 | 0.8 | 3.0 | 2.6 | 1.4 | 25.7 | 47.7 | 17.8 | 0.8 | 3.0 | 2.6 | 1.4 |
| EXAMPLE 45-6 | 25.6 | 47.5 | 18.0 | 0.8 | 3.0 | 3.7 | 1.4 | 25.3 | 47.0 | 17.8 | 0.8 | 3.0 | 3.7 | 1.4 |
| EXAMPLE 45-7 | 24.7 | 46.0 | 18.0 | 0.8 | 3.0 | 6.1 | 1.4 | 24.5 | 45.5 | 17.8 | 0.8 | 3.0 | 6.0 | 1.4 |
| EXAMPLE 45-8 | 23.9 | 44.3 | 18.0 | 0.8 | 3.0 | 8.6 | 1.4 | 23.6 | 43.9 | 17.8 | 0.8 | 3.0 | 8.4 | 1.4 |

$\frac{Co}{Sn+Co} = 35$ wt %

TABLE 52

| | INITIAL CHARGE CAPACITY (mAh/g) | DISCHARGE CAPACITY IN SECOND CYCLE (mAh/cm$^3$) | DISCHARGE CAPACITY IN 300TH CYCLE (mAh/cm$^3$) | CAPACITY RETENTION RATIO (%) |
|---|---|---|---|---|
| EXAMPLE 44-1 | 499 | 111 | 80 | 72 |
| EXAMPLE 45-1 | 532 | 118 | 79 | 67 |
| EXAMPLE 45-2 | 556 | 118 | 92 | 78 |
| EXAMPLE 45-3 | 562 | 119 | 95 | 80 |
| EXAMPLE 45-4 | 568 | 120 | 95 | 79 |
| EXAMPLE 45-5 | 555 | 119 | 95 | 80 |
| EXAMPLE 45-6 | 563 | 120 | 96 | 80 |
| EXAMPLE 45-7 | 562 | 120 | 97 | 81 |
| EXAMPLE 45-8 | 557 | 119 | 89 | 75 |

It was obvious from Tables 51 and 52 that the same results as those in Examples 34-1 through 34-8 were obtained. In other words, it was found out that even if the gel electrolyte was used, when at least one kind selected from the group consisting of titanium, molybdenum, niobium, aluminum, germanium, indium, gallium, phosphorus and bismuth, and silicon were included in the anode active material, the capacity and the cycle characteristics could be further improved.

Examples 46-1 Through 46-3

Secondary batteries were formed as in the case of Example 38-5, except that a solvent in which 4-fluoro-1,3-dioxolane-2-one, ethylene carbonate and propylene carbonate were mixed at a mass ratio of 4-fluoro-1,3-dioxolane-2-one:ethylene carbonate:propylene carbonate=1:10.5:11.5, 5:6.5:11.5 or 10:1.5:11.5 was used.

The cycle characteristics of the obtained secondary batteries of Examples 46-1 through 46-3 were measured as in the case of Examples 23-1 through 23-7. The results are shown in Table 53.

TABLE 53

| | MATERIAL RATIO (WT %) | | | | ANALYTICAL VALUE (WT %) | | | | SOLVENT (WT %) | | | CAPACITY RETENTION RATIO (%) |
|---|---|---|---|---|---|---|---|---|---|---|---|---|
| | Co | Sn | C | Fe | Co | Sn | C | Fe | FEC | EC | PC | |
| EXAMPLE 38-5 | 29.3 | 49.9 | 20.0 | 0.8 | 29.0 | 49.4 | 19.8 | 0.8 | 0 | 11.5 | 11.5 | 74 |
| EXAMPLE 46-1 | 29.3 | 49.9 | 20.0 | 0.8 | 29.0 | 49.4 | 19.8 | 0.8 | 1 | 10.5 | 11.5 | 76 |
| EXAMPLE 46-2 | 29.3 | 49.9 | 20.0 | 0.8 | 29.0 | 49.4 | 19.8 | 0.8 | 5 | 6.5 | 11.5 | 85 |
| EXAMPLE 46-3 | 29.3 | 49.9 | 20.0 | 0.8 | 29.0 | 49.4 | 19.8 | 0.8 | 10 | 1.5 | 11.5 | 91 |

EC: ethylene carbonate
PC: propylene carbonate
FEC: 4-fluoro-1,3-dioxolane-2-one
$\frac{Co}{Sn+Co} = 37$ wt %

It was obvious from Table 53 that in Examples 46-1 through 46-3 in which 4-fluoro-1,3-dioxolane-2-one was used in the solvent, the capacity retention ratio could be improved, compared to Example 38-5 in which 4-fluoro-1,3-dioxolane-2-one was not used. In other words, it was found out that even if the gel electrolyte was used, when a cyclic carbonate including a halogen atom was included in the solvent, the cycle characteristics could be further improved.

Although the invention is described referring to the embodiments and the examples, the invention is not limited to the embodiments and the examples, and can be variously modified. For example, in the above-described embodiments and the above-described examples, the invention is described referring to the secondary batteries with a coin shape, a sheet shape and a spirally winding structure; however, the invention can be applied to a secondary battery with any other shape using a button-shaped package member, a prismatic-shaped package member or the like, and a secondary battery having a laminate structure in which a plurality of cathodes and a plurality of anodes are laminated.

Moreover, in the embodiments and the examples, the case where lithium was used as an electrode reactant is described; however, the invention can be applied to the case where any other Group 1 element such as sodium (Na) or potassium (K) in the long form of the periodic table of the elements, a Group 2 element such as magnesium or calcium (Ca) in the long form of the periodic table of the elements, other light metal such as aluminum, or an alloy including lithium or any of the above-described materials is used, as long as the materials can react with the anode active material, and the same effects can be obtained. At this time, a cathode active material capable of inserting and extracting the electrode reactant, a nonaqueous solvent or the like is selected according to the electrode reactant.

It should be understood by those skilled in the art that various modifications, combinations, sub-combinations and alterations may occur depending on design requirements and other factors insofar as they are within the scope of the appended claims or the equivalents thereof.

What is claimed is:

1. An anode active material, comprising:
   a CoSnC containing material,
   wherein,
      the CoSnC containing material includes carbon which is within a range of 14.9 wt % to 29.7 wt %, and the ratio of cobalt to the total of tin and cobalt is within a range of 30 wt % to 70 wt %.

2. An anode active material according to claim 1, wherein the is peak of the carbon is obtained in a region lower than 284.5 eV by X-ray photoelectron spectroscopy.

3. An anode active material according to claim 1, wherein the anode active material includes a reactive phase which can react with lithium, and of which the half-width of a diffraction peak obtained by X-ray diffraction is 1.0° or more.

4. An anode active material according to claim 1, further comprising: silicon (Si) as an element.

5. An anode active material according to claim 4, wherein the silicon content is within a range of 0.5 wt % to 7.9 wt %.

6. An anode active material according to claim 1, further comprising:
   at least one element selected from the group consisting of indium (In), niobium (Nb), germanium (Ge), titanium (Ti), molybdenum (Mo), aluminum (Al), phosphorus (P), gallium (Ga) and bismuth (Bi) and the element is 14.9 wt % or less.

7. An anode active material according to claim 6, wherein at least one element selected from the group consisting of indium (In), niobium (Nb), germanium (Ge), titanium (Ti), molybdenum (Mo), aluminum (Al), phosphorus (P), gallium (Ga) and bismuth (Bi) and the element is 2.4 wt % or more.

8. An anode active material according to claim 1, further comprising: silicon within a range of 0.5 wt % to 7.9 wt %, and at least element selected from the group consisting of indium (In), niobium (Nb), germanium (Ge), titanium (Ti), molybdenum (Mo), aluminum (Al), phosphorus (P), gallium (Ga) and bismuth (Bi) within a range of 2.4 wt % to 14.9 wt %.

9. An anode active material according to claim 1, further comprising iron (Fe) as an element.

10. A battery, comprising:
    a cathode;
    an anode; and
    an electrolyte,
    wherein,
       the anode includes an anode active material which includes CoSnC containing material, and
       the carbon content in the anode active material is within a range of 14.9 wt % to 29.7 wt %, and the ratio of cobalt to the total of tin and cobalt is within a range of 30 wt % to 70 wt %.

11. A battery according to claim 10, wherein in the anode active material, the is peak of the carbon is obtained in a region lower than 284.5 eV by X-ray photoelectron spectroscopy.

12. A battery according to claim 10, wherein the anode active material includes a reactive phase which can react with lithium, and of which the half-width of a diffraction peak obtained by X-ray diffraction is 1.0° or more.

13. A battery according to claim 10, wherein the anode active material further includes silicon (Si) as an element.

14. A battery according to claim 13, wherein the silicon content in the anode active material is within a range of 0.5 wt % to 7.9 wt %.

15. A battery according to claim 10, wherein the anode active material further includes at least one element selected from the group consisting of indium (In), niobium (Nb), germanium (Ge), titanium (Ti), molybdenum (Mo), aluminum (Al), phosphorus (P), gallium (Ga) and bismuth (Bi) within a range of 14.9 wt % or less.

16. A battery according to claim 15, wherein the anode active material includes at least one element selected from the group consisting of indium (In), niobium (Nb), germanium (Ge), titanium (Ti), molybdenum (Mo), aluminum (Al), phosphorus (P), gallium (Ga) and bismuth (Bi) and the element is 2.4 wt % or more.

17. A battery according to claim 10, wherein the anode active material further includes silicon within a range of 0.5 wt % to 7.9 wt %, and at least one element selected from the group consisting of indium (In), niobium (Nb), germanium (Ge), titanium (Ti), molybdenum (Mo), aluminum (Al), phosphorus (P), gallium (Ga) and bismuth (Bi) within a range of 2.4 wt % to 14.9 wt %.

18. A battery according to claim 10, wherein the anode active material further includes iron (Fe) as an element.

19. A battery according to claim 10, wherein the electrolyte includes a derivative of a cyclic carbonate having a halogen atom.

* * * * *